(12) United States Patent
Chong et al.

(10) Patent No.: US 10,276,061 B2
(45) Date of Patent: Apr. 30, 2019

(54) INTEGRATED DEVELOPMENT ENVIRONMENT FOR VISUAL AND TEXT CODING

(71) Applicant: Neuron Fuel, Inc., Mountain View, CA (US)

(72) Inventors: Kelvin Voon-Kit Chong, Mountain View, CA (US); Srinivas A. Mandyam, Los Altos, CA (US); Krishna Vedati, Los Altos, CA (US)

(73) Assignee: NEURON FUEL, INC., Mountain View, CA (US)

( * ) Notice: Subject to any disclaimer, the term of this patent is extended or adjusted under 35 U.S.C. 154(b) by 205 days.

(21) Appl. No.: 14/503,058

(22) Filed: Sep. 30, 2014

(65) Prior Publication Data

US 2016/0093232 A1    Mar. 31, 2016

(51) Int. Cl.
G06F 9/44      (2018.01)
G09B 19/00     (2006.01)
G09B 19/06     (2006.01)

(52) U.S. Cl.
CPC ......... *G09B 19/0053* (2013.01); *G09B 19/06* (2013.01)

(58) Field of Classification Search
CPC ................................................ G09B 19/0053
See application file for complete search history.

(56) References Cited

U.S. PATENT DOCUMENTS

| | | |
|---|---|---|
| 3,905,128 A | 9/1975 | Koizumi et al. |
| 4,328,396 A | 5/1982 | Theis |
| 4,395,236 A | 7/1983 | Gotthold |
| 4,539,436 A | 9/1985 | Theis |
| 4,692,817 A | 9/1987 | Theis |
| 5,087,205 A | 2/1992 | Chen |
| 5,325,534 A | 6/1994 | Galy et al. |
| 5,386,568 A | 1/1995 | Wold et al. |
| 5,442,759 A | 8/1995 | Chiang et al. |
| 5,517,663 A | 5/1996 | Kahn |
| 5,535,422 A | 7/1996 | Chiang et al. |
| 5,576,946 A | 11/1996 | Bender et al. |
| 5,583,983 A | 12/1996 | Schmitter |
| 5,740,318 A | 4/1998 | Naito et al. |
| 5,742,836 A | 4/1998 | Turpin et al. |
| 5,745,738 A | 4/1998 | Ricard |
| 5,758,023 A | 5/1998 | Bordeaux |
| 5,760,788 A | 6/1998 | Chainini |
| 5,774,851 A | 6/1998 | Miyashiba et al. |

(Continued)

OTHER PUBLICATIONS

ElectricSparx, 'Comment Block Edited' Apr. 22, 2008, Scratch projects, <http://scratch.mit.edu/projects/147451/>.

(Continued)

*Primary Examiner* — Li B. Zhen
*Assistant Examiner* — Mohammad H Kabir
(74) *Attorney, Agent, or Firm* — Greeenberg Traurig, LLP

(57) ABSTRACT

Among other things, embodiments of the present disclosure provide an integrated developer environment that allows users to develop software applications using both visual blocks and text coding, and to seamlessly transition between visual and text coding as desired. This not only provides a powerful tool for sophisticated software developers to quickly develop and debug applications, but also helps newer programmers learn the principles of software development by allowing them to easily transition between the underlying text code associated with visual blocks and vice versa.

22 Claims, 56 Drawing Sheets

(56) References Cited

U.S. PATENT DOCUMENTS

| | | | |
|---|---|---|---|
| 5,787,422 A * | 7/1998 | Tukey | G06F 17/30707 |
| 5,794,195 A | 8/1998 | Hormann et al. | |
| 5,862,379 A | 1/1999 | Rubin et al. | |
| 6,149,441 A | 11/2000 | Pellegrino et al. | |
| 6,201,948 B1 | 3/2001 | Cook et al. | |
| 6,324,498 B1 | 11/2001 | Wajda | |
| 6,438,521 B1 | 8/2002 | Yamada et al. | |
| 6,468,085 B1 | 10/2002 | Bergan et al. | |
| 6,493,869 B1 | 12/2002 | Kwiatkowski et al. | |
| 6,690,914 B2 | 2/2004 | Ramachandran et al. | |
| 6,865,368 B2 | 3/2005 | Hoyashita et al. | |
| 6,892,361 B2 | 5/2005 | Kandogan | |
| 7,077,806 B2 | 7/2006 | Ackermann et al. | |
| 7,134,090 B2 | 11/2006 | Kodosky et al. | |
| 7,152,229 B2 | 12/2006 | Chong et al. | |
| 7,174,534 B2 | 2/2007 | Chong et al. | |
| 7,370,315 B1 * | 5/2008 | Lovell | G06F 8/33 |
| | | | 715/763 |
| 7,630,898 B1 | 12/2009 | Davis et al. | |
| 7,644,262 B1 | 1/2010 | Bromley et al. | |
| 7,685,565 B1 * | 3/2010 | Kawachiya | G06F 9/4431 |
| | | | 717/110 |
| 7,849,043 B2 | 12/2010 | Woolf et al. | |
| 7,954,084 B2 | 5/2011 | Arcaro et al. | |
| 8,185,832 B2 | 5/2012 | Kodosky et al. | |
| 8,230,059 B1 | 7/2012 | Santos et al. | |
| 8,239,840 B1 * | 8/2012 | Czymontek | G06F 8/34 |
| | | | 717/125 |
| 8,266,585 B2 * | 9/2012 | Funt | G06F 8/33 |
| | | | 717/106 |
| 8,397,172 B2 | 3/2013 | Kodosky et al. | |
| 8,412,652 B2 | 4/2013 | Yu et al. | |
| 8,467,954 B2 | 6/2013 | Kobuya et al. | |
| 8,554,130 B1 | 10/2013 | Jentzsch | |
| 8,714,986 B2 | 5/2014 | Dodelson et al. | |
| 8,750,782 B2 | 6/2014 | Scandura | |
| 8,924,926 B1 | 12/2014 | Fraser | |
| 9,595,202 B2 | 3/2017 | Chong et al. | |
| 9,595,205 B2 | 3/2017 | Chong et al. | |
| 9,612,826 B2 | 4/2017 | Leupold et al. | |
| 9,916,766 B2 | 8/2018 | Rodmell | |
| 2001/0039552 A1 | 11/2001 | Killi et al. | |
| 2001/0049084 A1 | 12/2001 | Mitry | |
| 2002/0022895 A1 | 2/2002 | Genise et al. | |
| 2002/0054149 A1 | 5/2002 | Genise et al. | |
| 2002/0087416 A1 | 7/2002 | Knutson | |
| 2002/0147964 A1 | 10/2002 | Cutler et al. | |
| 2003/0034998 A1 | 2/2003 | Kodosky et al. | |
| 2003/0229497 A1 | 12/2003 | Wilson et al. | |
| 2004/0039993 A1 * | 2/2004 | Kougiouris | G06F 17/211 |
| | | | 715/237 |
| 2004/0064314 A1 | 4/2004 | Aubert et al. | |
| 2004/0076941 A1 | 4/2004 | Cunningham et al. | |
| 2004/0078785 A1 | 4/2004 | Dutt et al. | |
| 2004/0209231 A1 | 10/2004 | Merritt | |
| 2004/0229194 A1 | 11/2004 | Yang | |
| 2004/0259060 A1 | 12/2004 | Kumar et al. | |
| 2005/0005266 A1 | 1/2005 | Datig | |
| 2005/0079477 A1 | 4/2005 | Diesel et al. | |
| 2005/0089825 A1 | 4/2005 | Zulferino | |
| 2005/0114776 A1 | 5/2005 | Wood et al. | |
| 2005/0120333 A1 | 6/2005 | Inoue et al. | |
| 2005/0147946 A1 | 7/2005 | Ramamurthy et al. | |
| 2005/0171768 A1 | 8/2005 | Gierach | |
| 2005/0175970 A1 | 8/2005 | Dunlap et al. | |
| 2006/0053372 A1 | 3/2006 | Adkins et al. | |
| 2006/0080099 A1 | 4/2006 | Thomas et al. | |
| 2006/0130007 A1 | 6/2006 | Ackerman | |
| 2006/0179420 A1 | 8/2006 | Ebrahimi | |
| 2006/0228689 A1 | 10/2006 | Rajaram | |
| 2006/0253508 A1 * | 11/2006 | Colton | G06F 8/52 |
| 2006/0259314 A1 | 11/2006 | Furman et al. | |
| 2006/0293941 A1 | 12/2006 | Ivanov et al. | |
| 2007/0130112 A1 | 6/2007 | Lin | |
| 2007/0130530 A1 | 6/2007 | Anderson et al. | |
| 2007/0168946 A1 | 7/2007 | Drissi et al. | |
| 2008/0009275 A1 | 1/2008 | Werner et al. | |
| 2008/0059484 A1 | 3/2008 | Packard et al. | |
| 2008/0305460 A1 | 12/2008 | Garg | |
| 2008/0320438 A1 * | 12/2008 | Funto | G06F 8/33 |
| | | | 717/106 |
| 2009/0070147 A1 | 3/2009 | Kashani et al. | |
| 2009/0138415 A1 | 5/2009 | Lancaster | |
| 2009/0311657 A1 | 12/2009 | Dodelson et al. | |
| 2010/0041007 A1 | 2/2010 | Wang | |
| 2010/0042969 A1 | 2/2010 | Ackerman | |
| 2010/0050151 A1 * | 2/2010 | Balasubramanian | G06F 8/33 |
| | | | 717/105 |
| 2010/0050154 A1 | 2/2010 | Balasubramanian | |
| 2010/0058212 A1 * | 3/2010 | Belitz | G01C 21/3682 |
| | | | 715/766 |
| 2010/0099954 A1 | 4/2010 | Dickinson et al. | |
| 2010/0227301 A1 | 9/2010 | Yu et al. | |
| 2011/0046941 A1 | 2/2011 | Johnson Manuel-Devados | |
| 2011/0047516 A1 | 2/2011 | Pavan et al. | |
| 2011/0081632 A1 | 4/2011 | Garg | |
| 2011/0125768 A1 * | 5/2011 | Shibao | G06F 17/30123 |
| | | | 707/756 |
| 2011/0136083 A1 | 6/2011 | Morris et al. | |
| 2011/0189645 A1 | 8/2011 | Leininger | |
| 2011/0270605 A1 | 11/2011 | Qin et al. | |
| 2011/0270873 A1 | 11/2011 | Somanchi et al. | |
| 2011/0294564 A1 | 12/2011 | Michelstein et al. | |
| 2011/0294565 A1 | 12/2011 | Michelstein et al. | |
| 2011/0304550 A1 * | 12/2011 | Romera Jolliff | G06F 3/016 |
| | | | 345/168 |
| 2012/0040326 A1 | 2/2012 | Larson-Rutter et al. | |
| 2012/0121025 A1 * | 5/2012 | Bonaparte | H04N 19/89 |
| | | | 375/240.27 |
| 2012/0124559 A1 | 5/2012 | Kondur | |
| 2012/0198419 A1 | 8/2012 | Neill et al. | |
| 2012/0323573 A1 | 12/2012 | Yoon et al. | |
| 2012/0329030 A1 | 12/2012 | Leininger et al. | |
| 2013/0006609 A1 | 1/2013 | Dhoolia et al. | |
| 2013/0130217 A1 | 5/2013 | Dohring et al. | |
| 2013/0239090 A1 * | 9/2013 | Hamlin | G06F 8/73 |
| | | | 717/123 |
| 2013/0311416 A1 | 11/2013 | Hua Liu et al. | |
| 2014/0057231 A1 | 2/2014 | Lutz et al. | |
| 2014/0113257 A1 | 4/2014 | Spiridonov et al. | |
| 2014/0129331 A1 * | 5/2014 | Spivack | G06Q 30/0269 |
| | | | 705/14.53 |
| 2014/0143172 A1 * | 5/2014 | Richter | G06Q 30/00 |
| | | | 705/342 |
| 2014/0170275 A1 | 6/2014 | Bordin | |
| 2014/0170606 A1 | 6/2014 | Chong et al. | |
| 2014/0170633 A1 | 6/2014 | Chong et al. | |
| 2014/0173563 A1 | 6/2014 | Dias et al. | |
| 2014/0287397 A1 | 9/2014 | Chong et al. | |
| 2014/0289142 A1 | 9/2014 | Gu | |
| 2014/0359558 A1 | 12/2014 | Chamberlain | |
| 2014/0373137 A1 * | 12/2014 | Muttik | G06F 21/57 |
| | | | 726/22 |
| 2014/0379602 A1 | 12/2014 | Nelson et al. | |
| 2015/0044642 A1 | 2/2015 | Resig | |
| 2015/0194147 A1 | 7/2015 | Yoon et al. | |
| 2015/0220312 A1 | 8/2015 | Jemiolo | |
| 2015/0235318 A1 | 8/2015 | Huan | |
| 2015/0347274 A1 * | 12/2015 | Taylor | G06F 11/362 |
| | | | 717/125 |
| 2016/0019800 A1 | 1/2016 | Rodmell | |
| 2016/0209908 A1 | 7/2016 | Zong et al. | |
| 2016/0364115 A1 | 12/2016 | Joung | |
| 2017/0186336 A1 | 6/2017 | Chong et al. | |
| 2017/0186337 A1 | 6/2017 | Chong et al. | |

OTHER PUBLICATIONS

Maloney, J., Resnick, M., Rusk, N., Silverman, B., Eastmond, E. (2010). The Scratch Programming Language and Environment

(56) References Cited

OTHER PUBLICATIONS

ACM Transactions on Computing Education, Nov. 2010. <http://scratch.mit.edu/info/research/>.
Non-Final Office Action dated Mar. 26, 2014 for U.S. Appl. No. 13/715,417, filed Dec. 14, 2012; pp. 1-10.
Creating Lego Mindstorms NXT Software Blocks. 2006 National Instruments Corporation. (obtained from ftp.ni.com) Aug. 3, 2016. 13 pp.
Systems and Methods for Goal-based Programming Instruction, U.S. Appl. No. 13/837,719, filed Mar. 15, 2013, Kelvin Chong, et al, U.S. Pat. No. 9,595,205, Mar. 14, 2017.
Systems and Methods for Goal-based Programming Instruction, U.S. Appl. No. 15/457,536, filed Mar. 13, 2017, Kelvin Chong, et al, Docketed New Case—Ready for Examination, Mar. 20, 2017.
Systems and Methods for Customized Lesson Creation and Application, U.S. Appl. No. 14/180,253, filed Feb. 13, 2014, Kelvin Chong, et al, Non Final Action dated, Jul. 11, 2017.
Programming Learning Center, U.S. Appl. No. 13/715,417, filed Dec. 14, 2012, Kelvin Chong, et al, U.S. Pat. No. 9,595,202, Mar. 14, 2017.
Programming Learning Center, U.S. Appl. No. 15/457,540, filed Mar. 13, 2017, Kelvin Chong, et al, Docketed New Case—Ready for Examination, Mar. 20, 2017.
Scratch 2.0—Scratch Wiki. Retrieved Oct. 20, 2017 from MIT [URL: https//wiki.scratch.mit.edu/wiki/Scratch 2.0].
Take Students from Scratch to Python with our new Block Trinkets—Trinket Blog. Retrieved Oct. 25, 2017 from blog.trinket.io [URL: https://blog.trinket.io/block-trinkets/].
Trinket Blog Page Mar. 10, 2016 [Retrieved Oct. 25, 2017 from Internet Archive Wayback Machine] [URL: https://web.archive.org/web/20160317091323/https://trinket.io/faq].

* cited by examiner

INTEGRATED DEVELOPMENT ENVIRONMENT FOR VISUAL AND TEXT CODING

CROSS-REFERENCE TO RELATED APPLICATIONS

The present application is related to U.S. patent application Ser. No. 14/180,253, filed Feb. 13, 2014 and entitled "SYSTEMS AND METHODS FOR CUSTOMIZED LESSON CREATION AND APPLICATION," and to U.S. patent application Ser. No. 13/837,719, filed Mar. 15, 2013 and entitled "SYSTEMS AND METHODS FOR GOAL-BASED PROGRAMMING INSTRUCTION," the disclosures of which are hereby incorporated herein by reference in their entirety.

BACKGROUND

Computers are ubiquitous and used for business, education, recreation and so on. Familiarity with the principles of computer programming and experience in computer programming is a useful skill. While familiarity with commonly used programming languages may be beyond the competency of many younger children, even at a young age children can learn the basic principles of computer programming.

SUMMARY

Among other things, embodiments of the present disclosure provide an integrated developer environment that allows users to develop software applications using both visual blocks and text coding, and to seamlessly transition between visual and text coding as desired.

A computer-implemented method according to various aspects of the present disclosure includes: retrieving, by a computer system from a data store, a file containing a plurality of software instructions; displaying the plurality of software instructions in an integrated developer environment (IDE) via a display screen of a user interface in communication with the computer system; generating, by the computer system, one or more visual code blocks, wherein each visual code block corresponds to one or more of the plurality of software instructions; displaying the one or more visual code blocks in the IDE via the display screen; receiving, via the user interface, a modification to the one or more visual code blocks; and modifying one or more of the plurality of software instructions to correspond to the modification to the one or more code blocks.

The present disclosure includes various methods, apparatuses (including computer systems) that perform such methods, and computer readable media containing instructions that, when executed by computing systems, cause the computing systems to perform such methods.

Other features will be apparent from the accompanying drawings and from the detailed description which follows.

BRIEF DESCRIPTION OF DRAWINGS

FIG. 11, FIG. 12 and FIG. 13 are simplified diagrams illustrating operation of a graphics user interface used to run lesson modules within a learning center runtime in accordance with an implementation.

FIGS. 27A-27F illustrate another example of providing a customized lesson plan based on an identified goal for the student.

DETAILED DESCRIPTION

Figure 1:
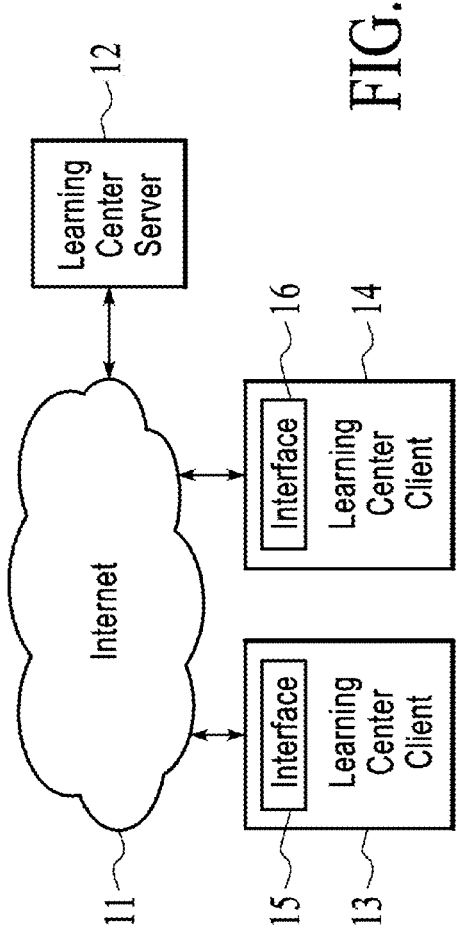
FIG. 1 is a simplified block diagram of a learning center that teaches basic programming principles in accordance with an implementation.

FIG. 1 is a simplified block diagram of a learning center that includes a learning center server 12 that can be accessed through the Internet 11 by multiple learning center clients. Multiple learning center clients are represented in FIG. 1 by a learning center client 13 and a learning center client 14. Learning center client may be implemented, for example, on a personal or laptop computer, a tablet computer, a smart phone, or any other computing device capable of accessing learning center server 12 through the internet 11. An interface 15 within learning center client 13 is, for example a web browser or specialty software that allows a user to interact with learning center 12 through internet 11. Likewise, an interface 16 within learning center client 14 is, for example a web browser or specialty software, such as an app, that allows a user to interact with learning center 12 through internet 11.

For example, the learning center integrates social learning and unique game mechanics with a guided curriculum to deliver a highly engaging and rewarding experience to children of all ages. The learning center allows children to perform creative activities such as write digital storybooks and scrapbooks, build video games, animate their favorite characters and share these with friends and family.

Figure 2:
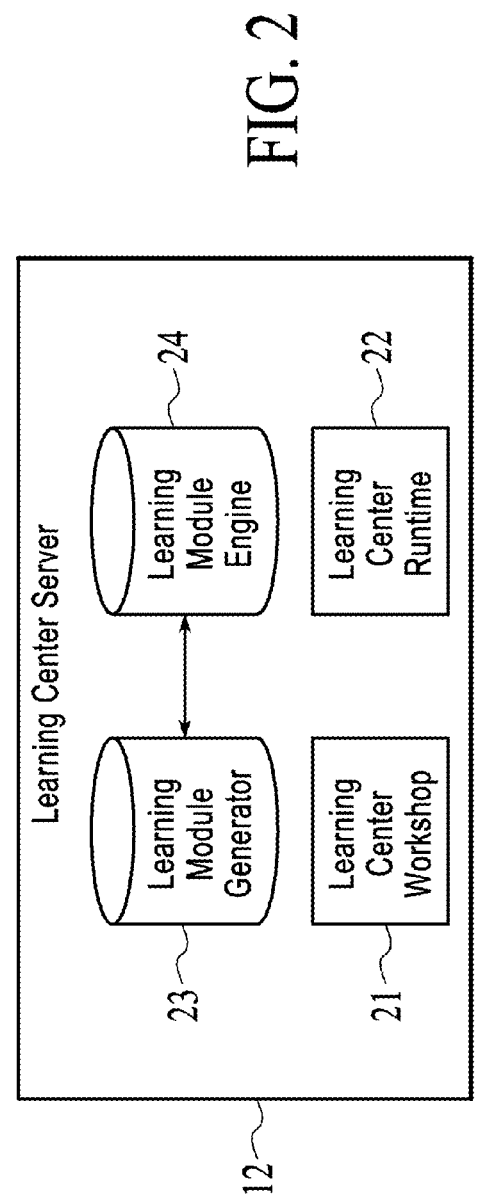
FIG. 2 is a simplified block diagram of a learning center server of the learning center shown in FIG. 1 in accordance with an implementation.

FIG. 2 is a simplified block diagram showing that learning center server 12 includes a learning center workshop 21, a learning center runtime 22, a learning module generator 23 and a learning module engine 24.

Learning center workshop 21 allows a user on a learning center client to build learning center programs visually using the interface for the learning center client. Learning center runtime 22 allows a user on a learning center client to run learning center programs.

Learning module generator 23 allows a user on a learning center client to generate learning modules from learning center programs. Learning module engine 24 allows a user on the learning center client to run learning modules and guides the user to build a learning center program. The learning module engine validates all known triggers and keeps parameters within a known range.

Table 1 below, sets out an example of a language specification for the learning center.

TABLE 1

```
<scripts> ::= <script> | <script> <scripts>
<script> ::= <entry-block> <blocks>
<blocks> ::= {empty} | <exit-block> | <inline-block> <blocks>
<inline-block> ::= <container-block> | <block>
<entry-block> ::= <label>
<exit-block> ::= <label>
<block> ::= <label>
<container-block> ::= <label> <containers>
<containers> ::= <container> | <container> <containers>
<container> ::= "{" <blocks> "}"
<label> ::= {string} <params>
<params> ::= {empty} | <param> <params>
```

TABLE 1-continued

```
<param> ::= {string} | {number} | {boolean} | <label-block>
<label-block> ::= {string} <params>
```

Table 2 below, sets out an example of language blocks for the learning center.

TABLE 2

```
CONTROL
on start
when {choice:keys} pressed
when actor clicked broadcast
{events} broadcast {events}
and wait
send message {events} to
{actor} with {string}
send message {events} to
{actor} with {string} and wait
received value
received source
when I receive {events}
clone startup
wait {number:1} secs
forever
repeat {number:10}
create clone of {actor}
name of last cloned actor
delete this clone
forever if {boolean}
if {boolean}
if {boolean} else wait
until {boolean} repeat
until {boolean} stop
{choice:stop}
stop script
stop all
MOTION
move {number:10} steps turn
CW {angle:15} degrees turn
CCW {angle:15} degrees
point in direction {angle:90} degrees
point towards {where}
go to x: {number:0} y: {number:0}'
blockMotionGoTowards
glide {number:1} secs to x: {number:0} y:
{number:0}
change x by {number:10}'
set x to {number:0} change
y by {number:10}' set y to
{number:0}
if on edge, bounce x position
y position direction
LOOKS
switch to costume {costumes}
next costume costume #
set label to {string:Hello}
say {string:Hello} for {number:2} secs
say {string:Hello}
think {string:Hmm} for {number:2} secs
think {string:Hmm}
change {choice:effect} effect by {number:25}
set {choice:effect} effect to {number:0}
clear graphic effects
change size by {number:10}
set size to {number:100}% size

show
hide
go to front
go to back
go back {number:1} layers
go forward {number:1} layers
switch to background {costumes}
next background
background #
SENSING touching
{where}? touching color {color}?
color {color} is touching {color}?
```

TABLE 2-continued

```
ask {string:What is your name} and wait
answer
mouse x mouse y
mouse down?
key {choice:keys} pressed?
distance to {whereall}?
reset timer
timer
{choice:spriteprop} of {whereall}
name of actor {number}
# of actors loudness
loud?
sensor {string:button pressed}?
sensor {string:button pressed}?
{choice:datetime} of date/time
screen left
screen right
screen top
screen bottom
SOUND
play sound {sounds}
play sound {sounds} until done
stop all sounds
play drum {choice:instrument} for {number:0.2} beats
rest for {number:0.2} beats
play note {number:60} for {number:0.5} beats set
instrument to {choice:instrument}
change volume by {number:-10}
set volume to {number:100}%
volume
change tempo by {number:20}
set tempo to {number:60} bpm
tempo
OPERATOR
{number} + {number}
{number} - {number}
{number} * {number}
{number} / {number}
pick random {number:1} to {number:10}
{string} < {string}
{string} = {string}
{string} > {string}
{boolean} and {boolean}
{boolean} or {boolean}
not {boolean}
join {string:hello} {string:world}
letter {number:1} of {any:world} length of
{string:world}
{number} mod {number}
round {number}
{choice:math} of {number:10}
{choice:constants}
PEN
clear
pen up
set pen color to {color}
change pen color by {number:10}
set pen color to {number:0}
change pen shade by {number:10} set
pen shade to {number:50} change pen
size by {number:1}
set pen size to {number:1}
stamp
set font to {choice:fontstyle} {choice:fontsize} {choice:font}
draw text {string}
when drawing actor redraw
actor
set fill color to {color}
no fill
draw bezier at x1:{number:0} y1:{number:0} to x2:{number:0} y2:
{number:0} with control points cx1:{number:0} cy1:{number:0} and
cx2:
{number:0} cy2:{number:0}'
draw point at x:{number:0} y:{number:0}
draw line from x1:{number:0} y1:{number:0} to x2:{number:0} y2:
{number:0}
draw rectangle at x:{number:0} y:{number:0} with width:{number:0}
height:{number:0}
draw triangle with points x1:{number:0} y1:{number:0} x2:{number:0}
y2:{number:0} x3:{number:0} y3:{number:0}
```

TABLE 2-continued

```
draw ellipse at x:{number:0} y:{number:0} with width:{number:0}
height:{number:0}
draw text {string} at x:{number:0} y:{number:0}
draw rectangle with width:{number:0} height:{number:0}'
draw ellipse with width:{number:0} height:{number:0}
PHYSICS
when actor collides
collided with {where}?
apply force {number:0}
apply impulse {number:0}
apply force {number:0} at {number:0}
degrees
apply impulse {number:0} at {number:0}
degrees
apply horizontal {number:0} and vertical
{number:0} force
apply horizontal {number:0} and vertical
{number:0} impulse apply torque
{number:0} set
static {boolean}
set shape to {choice:geometry}
set density to {number:10}
set friction to {number:0.5}
set restitution to {number:0.2}
set angular damping to {number:0} set angular
velocity to {number:0} set
linear damping to {number:0}
set linear velocity to {number:0} by {number:
0}
density friction
restitution
angular velocity inertia
is awake?
x linear velocity
y linear velocity
set gravity to {number:0} by {number:10}
start physics stop
physics
VARIABLES
set {properties} of {actor} to {string:0}
property {properties} of {actor}
set {variables} to {string:0}
change {variables} by {number:1}
show variable {variables}
hide variable {variables}
LISTS
add {string:thing} to {lists}
delete {choice:lastall} of {lists}
insert {string:thing} at {choice:lastany} of {lists}
replace item {choice:lastany} of {lists} with {string:thing}
item {choice:lastany} of {lists}
length of {lists}
{lists} contains {string:thing}
```

A user from a learning center client accesses learning center workshop 21 through an interface. For example, the interface is a web browser or a dedicated app located on a computing device such as a personal computer or a tablet. When learning is launched, a user can build a project, which is essentially a computer program. Learning center workshop 21 allows a user to construct a project (computer program) and save it. The computer program can be run using learning center runtime 22.

Upon entering learning center workshop 21, a user can elect to build a new computer program from scratch or open an existing computer program.

To build a computer program from scratch, the user utilizes blocks of programming instructions represented visually as building blocks within learning center workshop 21. The tools provided within learning center workshop 21 allow a user to create a scene that includes a background, main objects and actors. Learning center workshop 21 allows a user to add computer program logic to the actors and the background. The user acts by dragging and dropping visual blocks into code areas. The visual blocks snap into place to form logic sequences.

Learning center workshop 21 saves the computer program and all its assets as the computer program is being built. For example, learning center workshop 21 saves the computer program in a persistent format so that the computer program can be loaded later. This can be done, for example in a Javascript Object Notation (JSON) format, Extensible Markup Language (XML) or some other structured syntax. The computer program file may be stored on learning center server 12 and, in addition or instead of, stored on the learning center client used by the user.

Figure 3:
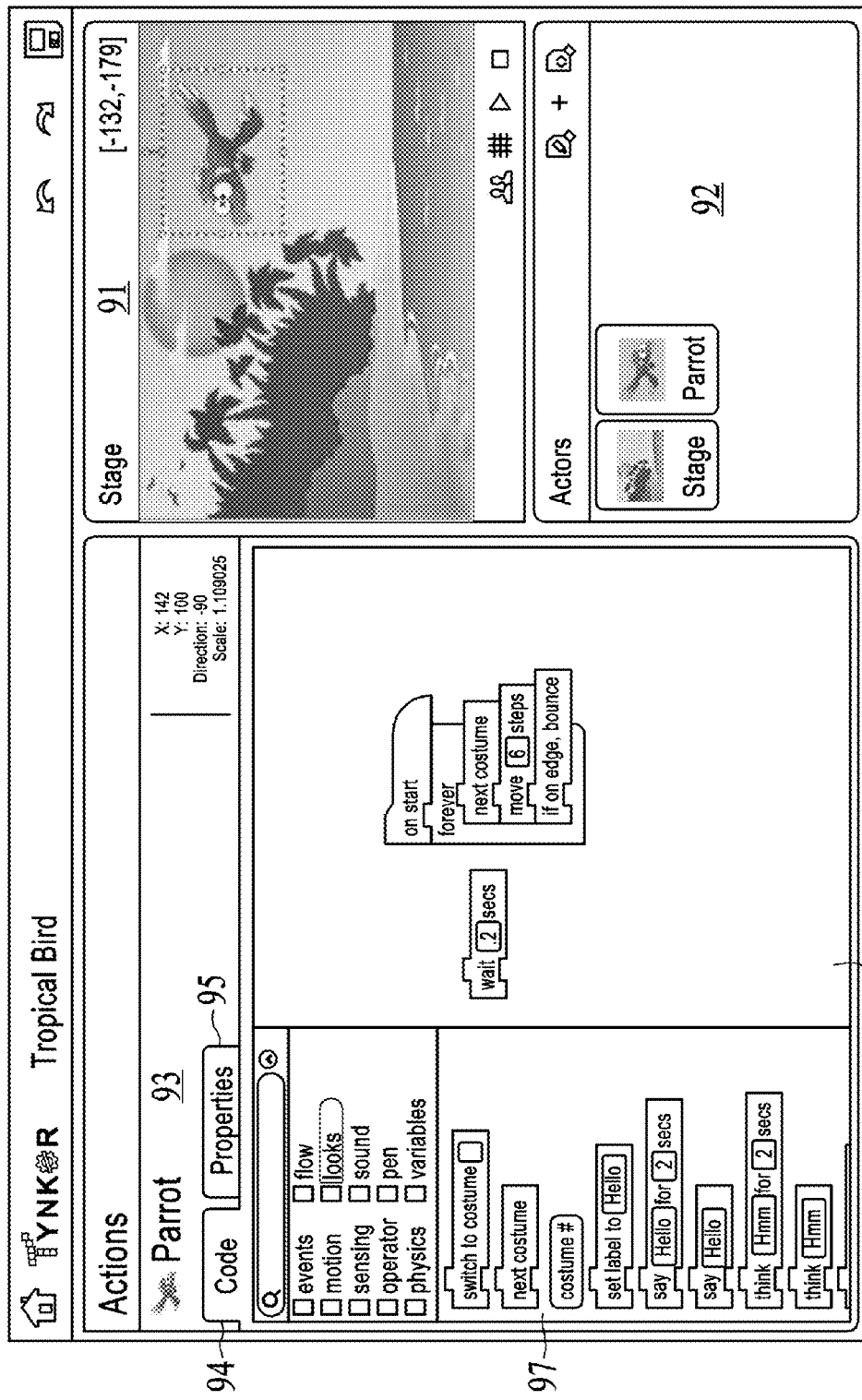
FIG. 3 is a simplified diagram illustrating operation of a graphics user interface used to program a project that runs within a learning center runtime for the learning center shown in FIG. 1 in accordance with an implementation.

FIG. 3 shows a user interface 90 for learning center workshop 21. An area 90 shows a stage area where selected stages and actors are displayed. An actor area 92 shows available actors that can be selected by a user. A horizontal bar 93 includes a code tab 94 and a properties tab 95. When code tab 94 is selected available code blocks are shown displayed and available in a code block area 97. The code blocks can be dragged and dropped by a user into work area 96 to form a computer program (project).

The flying bird project illustrated within interface 90 shown in FIG. 3 can be stored in file using language blocks for the learning center. For example, Table 3 below sets out contents for such a file.

TABLE 3

{"name":"Tropical Bird","description":"Help the tropical bird fly out to sea.","background":
{"scaleType":"stretch","width":-.-600,"height":-.-400, "canvasWidth":480,"canvasHeight":320,"currentBackground": 1,"scripts":[ ],"backgrounds":[{"name":"beach","img":"/assets/Images/Backgrounds/Outdoor/ 4fcf9088692f886b16000e53.jpg","cx":512,"cy":341.5}],"sounds":[ ],"documentation":
{"description":"","inboundEvents":[ ],"outboundEvents":[ ],"properFes":[ ]}},"sprites":[{"label":"Parrot","scripts":
[{"func":"registerFlagTrigger","id":6,"values":[ ],"containers":[ ],"next":{"func":"blockControlForever","id":7,"values":
[ ],"containers":[{"func":"blockLooksNextCostume","id":8,"values":[ ], "containers":[ ],"next":
{"func":"blockControlWait","id":9,"values":[{"type":"number","value":".2"}],"containers":[ ],"next":
{"func":"blockMotionMove","id":11,"values":[{"type":"number", "value":"6"}],"containers":[ ],"next":
{"func":"blockMotionBounceOnEdge","id":13,"values":[ ],"containers":[ ]}}}}}},"x":82,"y":43}],"costumes":
[{"name":"Bird 1","img":"/assets/user/50312c85692f88c95000006b.png"},{"name":"Bird 2","img":"/assets/user/ 50312caa692f88ba5000007f.png","cx":80.5,"cy":56.5},{"name":"Bird 3","img":"/assets/user/ 50312cb1692f88d550000075.png","cx":80.5,"cy":56.5},{"name":"Bird 4","img":"/assets/user/ 50312cb6692f88e050000078.png","cx":80.5,"cy":56.5}], "currentCostume":4,"sounds":[ ],"scale": 1.1090254493487,"x":142.77345132738003,"y":100.08159722222, "rotation":180,"rotateLock":
1,"isHidden":false,"volume":100,"locked":false,"physics":
{"isStatic":false,"isActive":true,"geometry":"circular","density":1, "friction":0.5, "restitution":0.2},"varDefaults":
{ },"variables":{"auto start":true,"distance":6} ,"lists":
{ },"classname":"Parrot","id":"50369e94692f885c770000c2", "documentation":{"description":"Parrot flies around and screeches.","inboundEvents":[{"name":"[registerFlagTrigger]", "description":"","visible":true}],"outboundEvents": [ ],"properties":
[{"name":"auto start","description":"If auto start=true, animate on start","visible":true},
{"name":"distance","description":"Speed of movement","visible":true}]}}],"models":[ ],"variables":{ },"lists":
{ },"physics":{"enabled":false,"gravity":{"x":0,"y":10}}}

A user can use learning center runtime 22, shown in FIG. 1, to run a computer program built in learning center workshop 21. For example, the interface by which the user accesses learning center runtime 22 is a web browser on a computing device such as a personal computer or a tablet or is an app running on a mobile phone or tablet computer. For example, the user may iterate through refining a computer program by making modifications such as adding and removing logic, changing the code blocks used and testing the computer program to see how the computer program runs.

Figure 4:
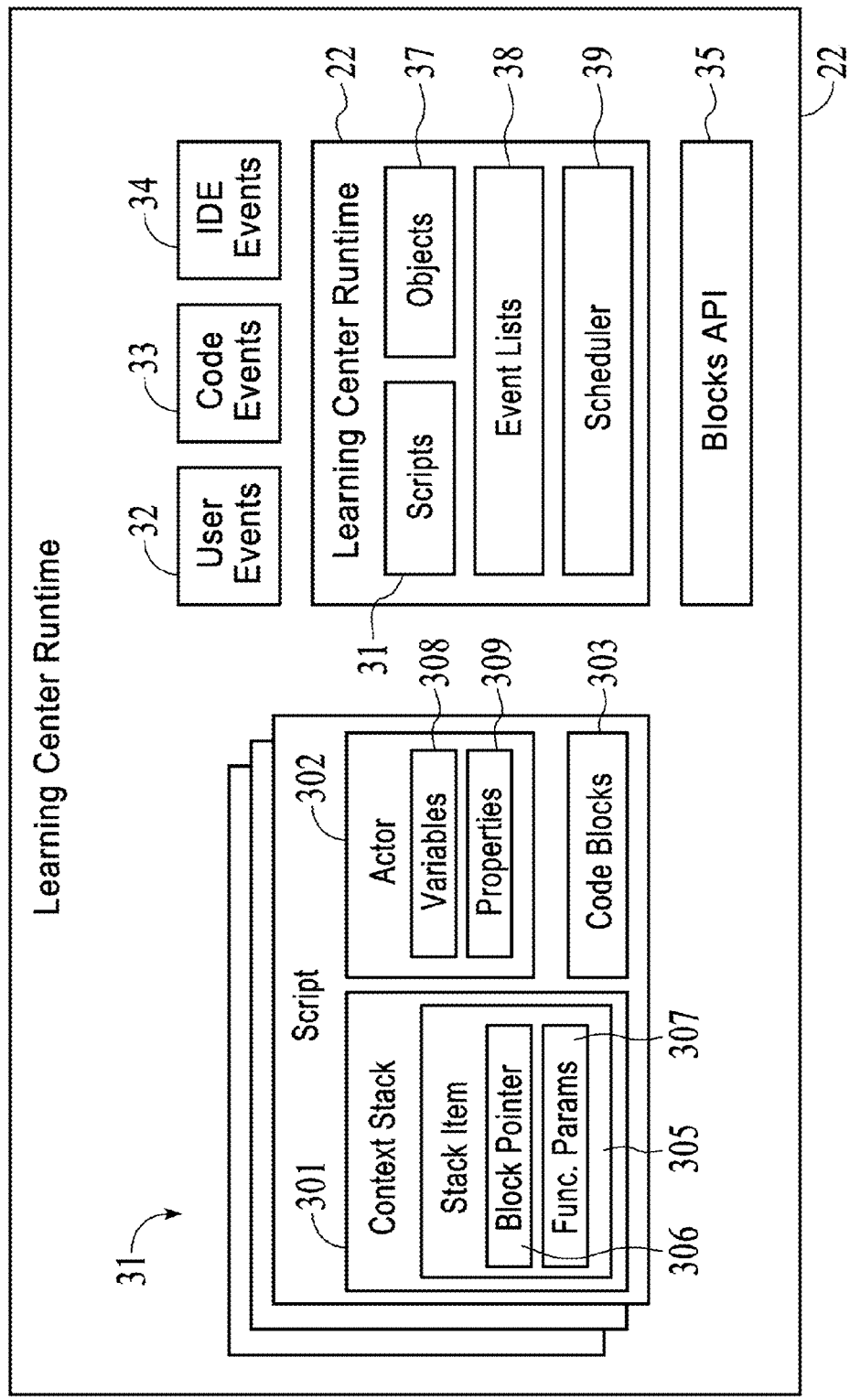
FIG. 4 is a simplified block of a learning center runtime for the learning center shown in FIG. 1 in accordance with an implementation.

FIG. 4 shows a simplified block diagram for learning center runtime 22. Learning center runtime 22 is shown to include scripts 31, objects 37, event lists 38 and a scheduler 39. User events 32, code events 33 and integrated development events (IDE) 34 are used to invoke learning center runtime 22. Learning center runtime 22 calls application programming interface (API) blocks. FIG. 4 also shows a script containing, for example, a context stack 301, an actor description 302 and code blocks 303. The context stack includes stack items represented by a stack item 305 having a block pointer 306 and function parameters 307. Actor description 302 includes variables 308 and properties 309.

Figure 20:
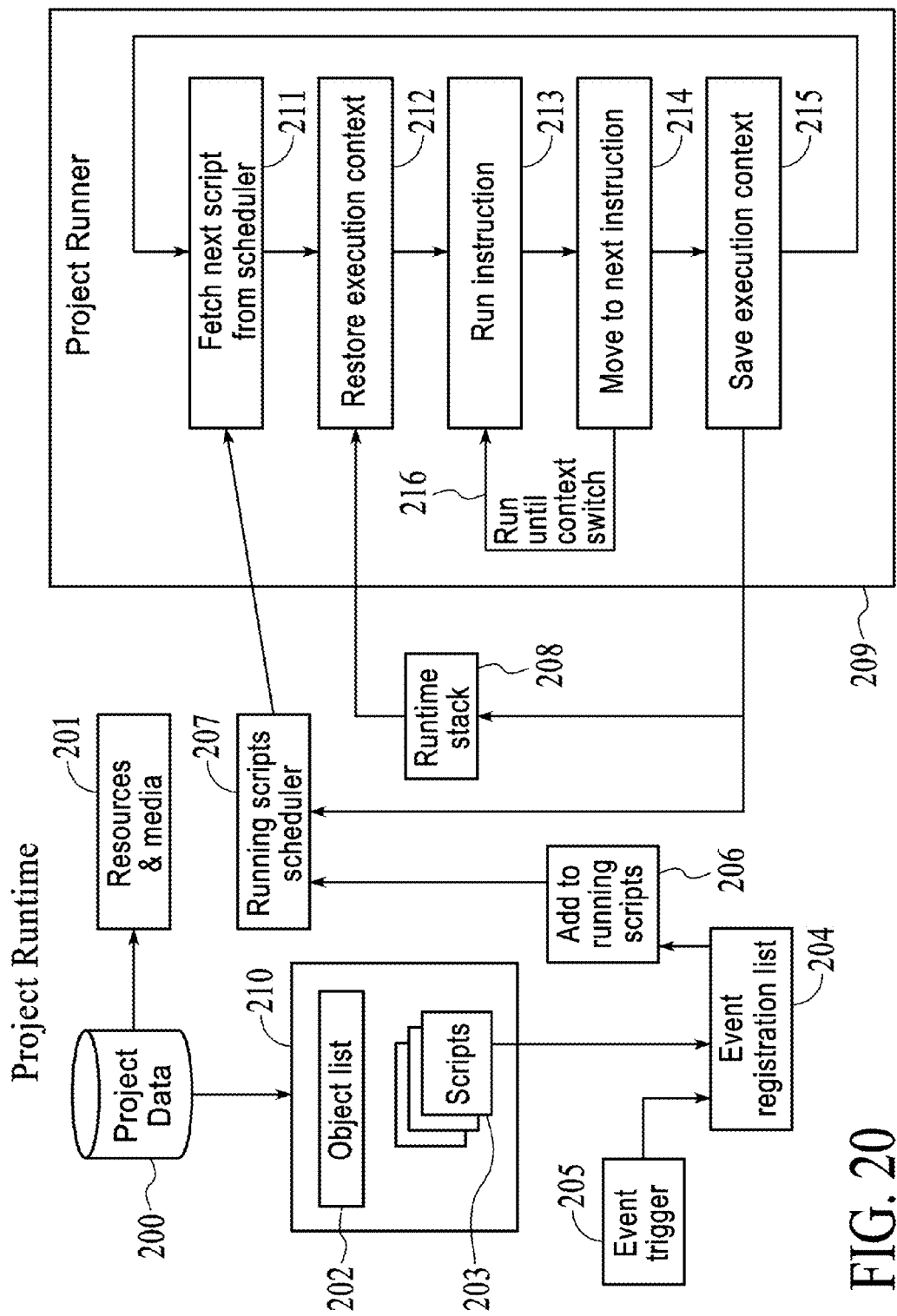
FIG. 20 is a block diagram illustrating a project runtime in accordance with an implementation.

FIG. 20 is a block diagram illustrating implementation of a project runtime. Project data 200 can utilize resources and media 201. When a project is loaded, the project is parsed and added to object lists for each object (actor). Each object entry in the object list maintains a reference to the scripts associated with an object (actor). The project resource and media pointers are referenced by various instructions in the scripts. A loaded project 210 includes, for example, an object list 202 and scripts 203.

Scripts are registered against specific event types (e.g. program start, key event, mouse event). As illustrated by arrow 206, an external trigger event 205 results in a script 203 that has been registered in event registrations list 204 being added to a scheduler 207, which is a list of running scripts. Run loop 209 picks up a script to execute from scheduler 207. The scripts are executed in parallel by scheduler 207. Scheduler 207 determines how to select the next script (e.g. round robin, priority queue, time queue). The execution context is restored from a runtime stack 208 specific to that script. The instruction is executed as a non-blocking process.

For example, within a project runner 209, in a block 211 a next script is fetched from the scheduler. In a block 212, execution context is restored for the fetched script. In a block 213 an instruction is run. In a block 214, context is moved to a next instruction. As illustrated by arrow 216, block 213 and block 214 are continued until there is a context switch. A context switches occurs, for example, when the script has executed a yield instruction, a time slice expires, user interrupts execution, etc. When there is a context switch, in a block 215, execution context is saved and context is returned to block 211. If the end of the script has not been reached, the script is retained in the scheduler 207. If the end of the script has been reached, the script is removed from runtime stack 208 and the list of running scripts within scheduler 207.

For example, for learning center runtime 22, scripts 31 are written using Javascript. Javascript is a single-threaded environment in a web browser. A sequence of instructions is executed sequentially until the sequence relinquishes control back to the web browser before other instruction sequences will execute. As a result, multiple Javascript sequences cannot run at the same time.

For example, the learning center represents instructions as blocks so that each block represents one instruction that executes atomically, that is without being interrupted by another block. Each block must relinquish control back to the web browser in a timely fashion. Scheduler 39, therefore, maintains a context for each script sequence. Scheduler 39 selects a script sequence, switches to that script's context and executes a predetermined number of blocks for each turn. Scheduler 39 then selects the next script sequence and repeats until all scheduled scripts have run their turn. At this point scheduler 39 relinquishes control back to the web browser. The web browser starts up another time slice where another script sequence is executed. As a result, multiple scripts 31 can be run at the same time.

Figure 5:
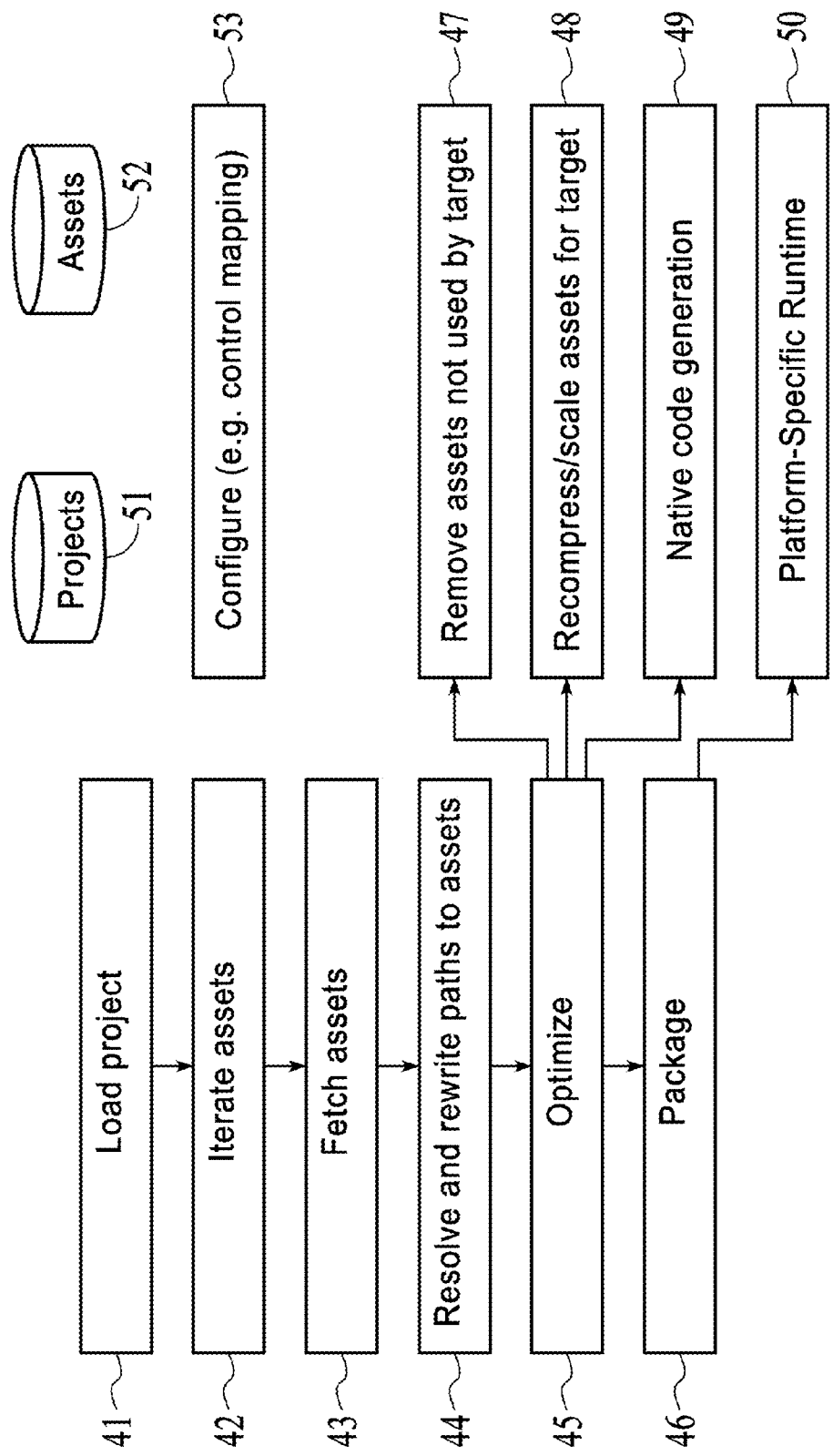
FIG. 5 is a simplified flowchart that describes publication to runtime of a project designed to run within a learning center runtime for the learning center shown in FIG. 1 in accordance with an implementation.

FIG. 5 is a simplified flowchart illustrating learning center workshop 21 publishing a project (learning center program) to learning center runtime 22. As illustrated in FIG. 5, storage for projects 51 and storage for assets 52 are accessed to obtain a project and associated assets. Also configuration (such as user input control mapping, display scaling, desired screen orientation) information 53 is also accessed.

In a block 41, a project is loaded. In a block 42, assets are iterated. In a block 43, assets are fetched from assets storage 52. In a block 44, paths to assets are resolved and rewritten. In a block 45, optimization is performed. For example, the optimization can include removing assets not used by a target, as shown in a block 47. Likewise, the optimization can include recompressing and/or scaling assets for the target, as shown in a block 48. Also, the optimization can include native code generation, as shown in a block 49.

In a block 46 the project is packaged based on a platform specific runtime, as illustrated by a block 50.

Once a computer program (project) is complete, a user can choose to create a lesson module based on the computer program. For example, the user can choose a create lesson option in learning center workshop 21 to activate learning module generator 23.

Learning module generator 23 includes a parser that parses through the computer program that the user built and generates a task list for the lesson module. For example, learning module generator 23 reads through the computer program, identifies all objects and identifies actions to recreate the computer program. Then, different kinds of steps are generated based on the results of parsing the computer program. A list of ordered steps are generated where complex tasks are outlined and grouped together.

Figure 6:
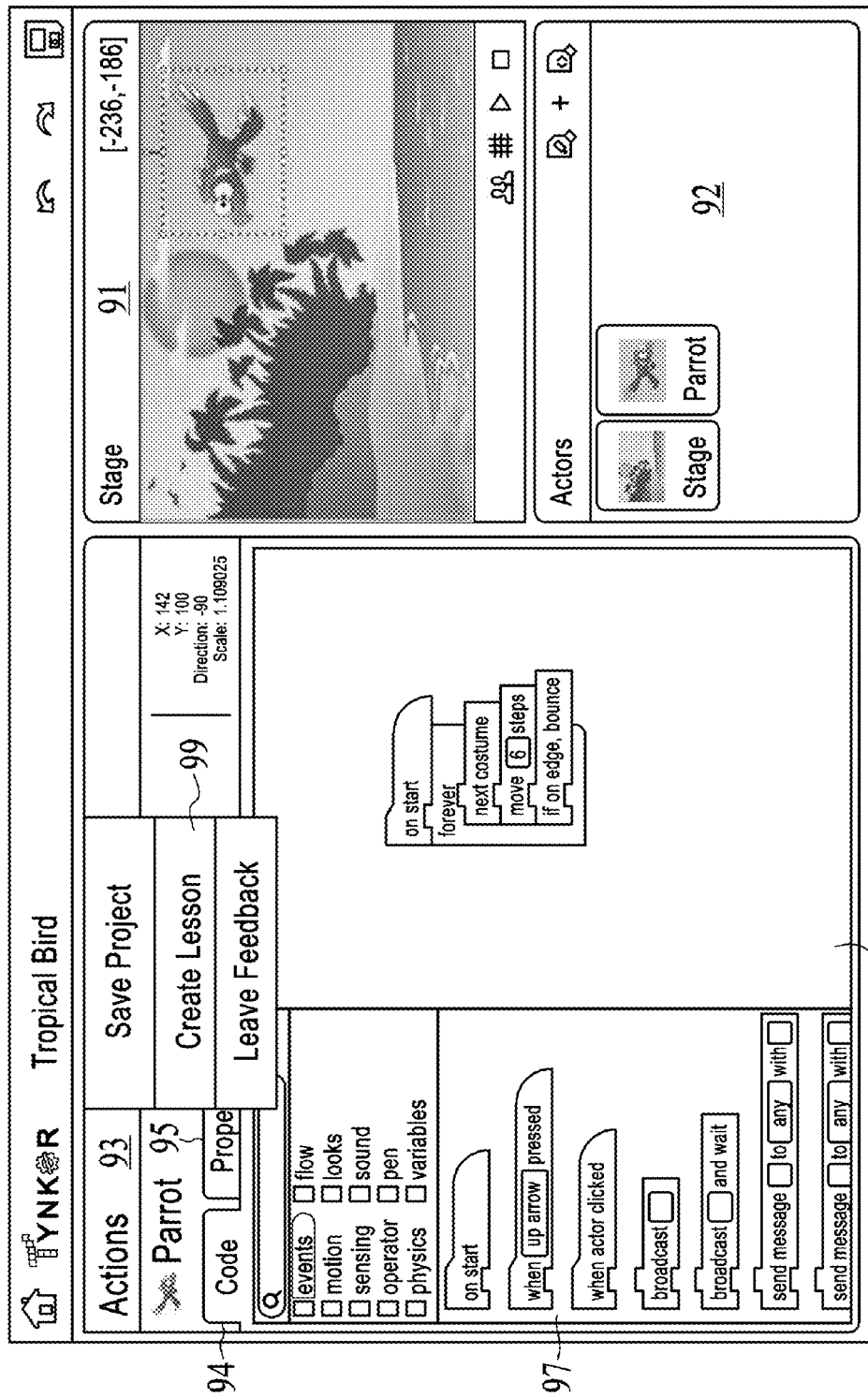
FIG. 6 and FIG. 7 are simplified diagrams illustrating operation of a graphics user interface used to generate lesson modules for a project designed to run within a learning center runtime in accordance with an implementation.

As shown in FIG. 6, a drop down menu 99 accessed by a user from the "Tropical Bird" label on the menu bar of user interface 90 includes a selection to "Create Lesson". As a result, learning module generator 23 (shown in FIG. 2) is invoked and generates a lesson module from the computer program (shown in Table 3) for the flying bird project.

Figure 7:
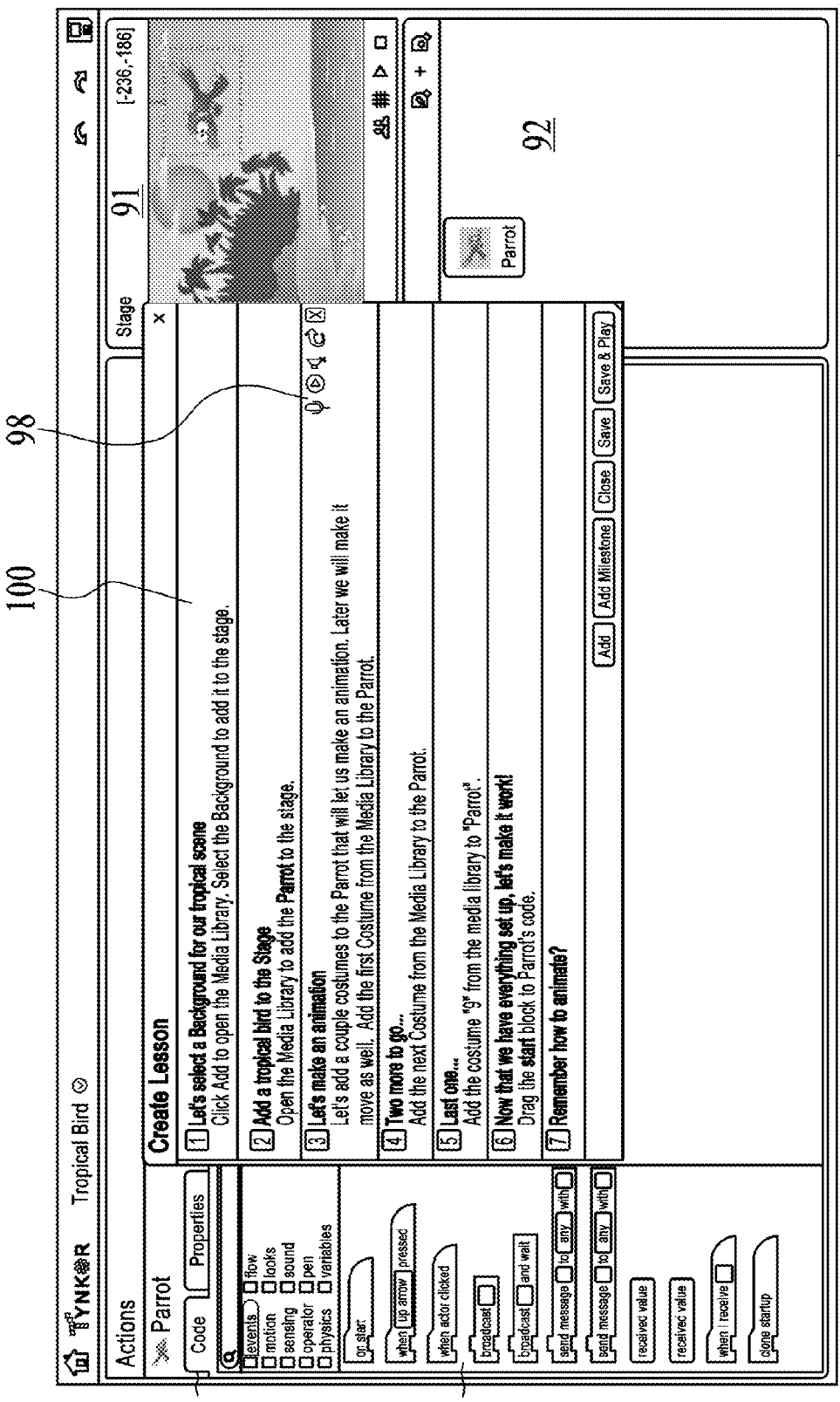

FIG. 7 shows in box 100, appearing as part of interface 90, lesson steps. As discussed above, the author of the lesson module can modify the lesson module generated by changing the order of steps, adding voice over by selecting a voice over button 98, and so on.

Figure 8:
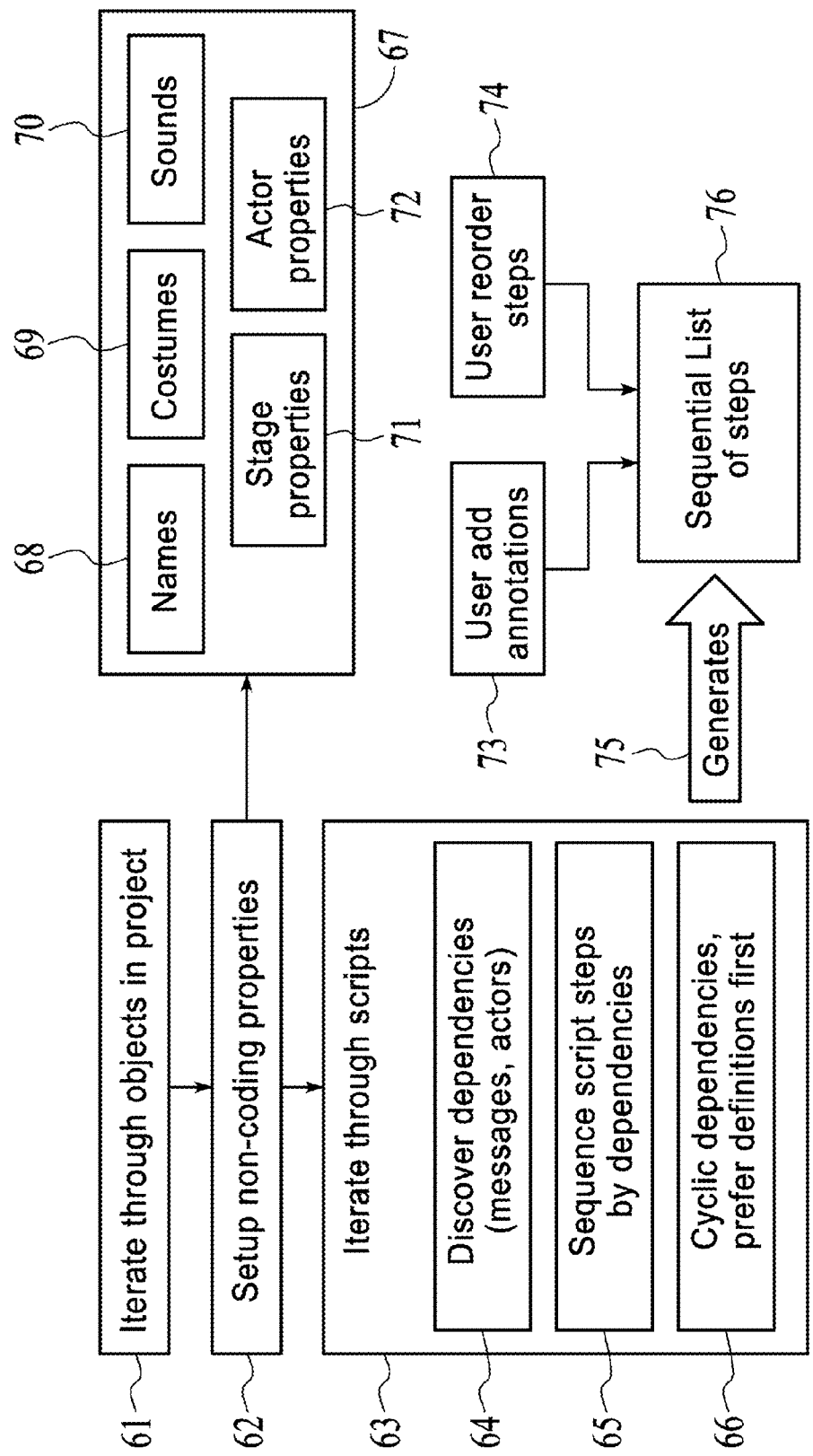
FIG. 8 and FIG. 9 are simplified flowcharts that describe generation of lesson modules for a project designed to run within a learning center runtime in accordance with an implementation.

FIG. 8 is a simplified flowchart showing how learning module generator 23 generates a lesson module from a computer program. In a block 61, learning module generator 23 iterates through objects in the project (computer program). In a block 62, learning module generator 23 sets up non-coding properties 67. Non-coding properties 67 include, for example, names 68, costumes 69, sounds 70, stage properties 71 and actor properties 72.

In a block 63, learning module generator 23 iterates through scripts. This is done, for example, to discover dependencies between messages and actors, etc., as shown in block 64, to sequence script steps by dependencies, as shown in block 65, and to determine cyclic dependencies and establish a preference for definitions, as shown in block 66.

As represented by arrow 75, learning module generator 23 then generates a sequential list of steps 76. As illustrated by block 73, a user can add notations to sequential list of steps 76. As illustrated by block 74, a user can reorder steps within sequential list of steps 76.

Once the list or ordered steps are generated, the user can customize the lesson module. For example, the user can change the order of steps so that the reconstruction of the steps of computer program occurs in a different order than the steps as they originally appeared in the in the computer program when authored. Learning module generator 23 is used to assure that dependencies between steps are accounted for.

For example, learning module generator 23 allows a user to add voice over in each step. The voice over is played back while the lesson module is being run within learning center runtime 22. Similarly, learning module generator 23 allows a user to add video in any step. The video is played back while the lesson module is being run within learning center runtime 22. Also, learning module generator 23 allows additional steps to be added in between the steps for the lesson module originally generated by learning module generator 23. For example, text for the lesson module can be customized. When the user has completed modifications, learning module generator 23 saves the workflow as a lesson module.

Figure 9:
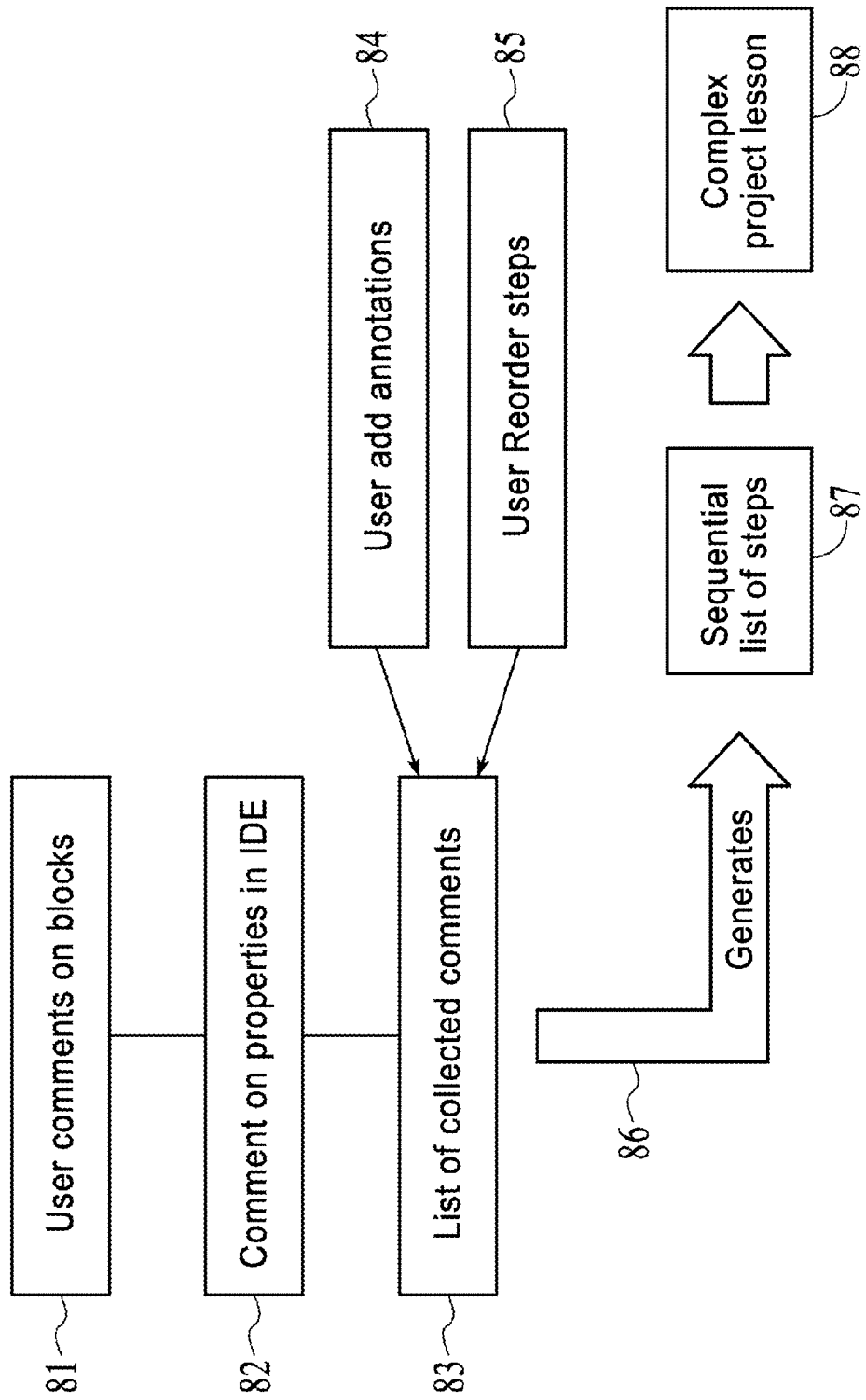

FIG. 9 illustrates an alternative method for generating a lesson module from a computer program. In a block 81, a user comments on blocks of programming code. In a block 82, the user comments on program properties in integrated development environment (IDE). Learning module generator 23 stores a list of collected comments 83 that includes additional user added annotations 84 and reordered steps 85. From list of collected comments 83, learning module generator 23 generates, as illustrated by an arrow 86 a new sequential list of steps 87 used to produce a complex project lesson module 88.

Table 4 shows an example of computer program for a complex project lesson produced based on language blocks from the flying bird project set out in Table 3:

TABLE 4

{"width":–600,"height":–400,"bgtype":"stretch","canvasWidth":480,
  "canvasHeight":320,"name":"Tropical Bird","description":"Help the tropical bird fly out to sea.",
    "resources":[{"count":1,"name":"beach.jpg","img":"\/assets\/Images\/
Backgrounds\/Outdoor\/4fcf9088692f886b16000e53.jpg"},{"count":1,"name":" Bird
    1.png","img":"\/assets\/user\/50312c85692f88c95000006b.png"},
    {"count":1,"name":"Bird 2.png","img":"\/assets\/user\/
50312caa692f88ba5000007f.png"},{"count":1,"name":"Bird
    3.png","img":"\/assets\/user\/50312cb1692f88d550000075.png"},{"count":1
    ,"name":"Bird 4.png","img":
    "\/assets\/user\/50312cb6692f88e050000078.png"}],"blocks":
[{"count":1,"func":"registerFlagTrigger"},{"count":1,"func":"blockControlForever
    "},{"count":1,"func":"blockLooksNextCostume"},{"count":1,"func":

TABLE 4-continued

"blockControlWait"},{"count":1,"func":"blockMotionMove"},{"count":1,"func":
"blockMotionBounceOnEdge"}],"notes":[{"block":null,"spriteName":null,
"resource":"\/assets\/Images\/Backgrounds\/Outdoor\/4fcf9088692f886b16
000e53.jpg","resourceName":"beach","attached":null,"id":1,"text":"
  Let's select a Background for our tropical scene<\/h2> Click Add to open the
  Media Library. Select the Background to add it to the stage.
  <\/p><\/div>\n"},{"block":null,"spriteName":"Parrot","resource":"\/assets\/
  user\/50312c85692f88c95000006b.png","resourceName":"Bird
  1","attached":null,"properFes":{"x":442.77345132738,"y":99.91840277778,
  "rotation":180,"rotateLock":1,"scale":1.1090254493487},"id":2,"text":"
Add a tropical bird to the Stge<\/h2> Open the Media Library to add the Parrot<\/em>
  to the Stage.<\/p><\/div>\n"},{"block":null,"spriteName":
  "Parrot","resource":"\/assets\/user\/50312caa692f88ba5000007f.png",
  "resourceName":"Bird 2","attached":null,"id":3,"text":"
Let's make an animation<\/h2> Let's add a couple costumes to the Parrot that will let us
  make an animation. Later we will make it move as well. Add the first Costume from the
  Media Library to the Parrot.<\/p><\/div>\n"},
  {"block":null,"spriteName":"Parrot","resource":"\/assets\/user\/50312cb169
  2f88d550000075.png","resourceName":"Bird 3","attached":null,"id":4, "text":"
Two more to go...<\/h2> Add the next Costume from the Media Library to the
  Parrot.<\/p><\/div>\n"},{"block":null,"spriteName":"Parrot","resource":"\/
  assets\/user\/50312cb6692f88e050000078.png","resourceName":"Bird
  4","attached":null,"id":5,"text":"
Last one...<\/h2>
Add the costume \"9\" from the media library to
  \"Parrot\".<\/p><\/div>\n"},{block":"registerFlagTrigger","spriteName":
  "Parrot","resource":null,"attached":null,"id":6,"text":"
Now that we have everything set up, let's make it work!<\/h2> Drag the
start<\/em> block to Parrot's code.<\/p><\/div>\n"},
  {"block":"blockControlForever","spriteName":"Parrot","resource":null,"attached
  ":["registerFlagTrigger",6],"id":7,"text":"
Remember how to animate?<\/h2>
Just like we did in previous activities, start by adding the forever loop<\/em> block to the
  start<\/em> block in Parrot's
  code.<\/p><\/div>\n"},{"block":"blockLooksNextCostume","spriteName":
  "Parrot","resource":null,"attached":["blockControlForever",7,0],"id":8,"text":"
Adding animation logic to the Parrot<\/h2>
Add the next costume<\/em> block into the forever loop<\/em> block in Parrot's
  code. This allows us to keep changing costumes to get the animation
  effect.<\/p><\/div>\n"},
  {"block":"blockControl Wait","spriteName":"Parrot","resource":null,"attached
  ":["blockLooksNextCostume",8],"id":9,"text":"
Adding animation logic to the Parrot<\/h2>
Add the wait<\/em> block to the next costume<\/em> block in Parrot's code.
  Without a wait block, the Parrot flaps it's wings too fast. To get a better effect we
  need to slow it down.<\/p><\/div>\n"},
  {"block":null,"spriteName":"Parrot","resource":null,"attached":["blockControl
  Wait",9,0,".2"],"id":10,"text":"
Adjusting our animation<\/h2>
Set the value of the wait<\/em> block to .2<\/em> in Parrot's code. This will
  allow for a better animation effect by slowing down how fast the costumes
  change.<\/p><\/div>\n"},
  {"block":"blockMotionMove","spriteName":"Parrot","resource":null,
  "attached":["blockControlWait",9],"id":11,"text":"
Now that the Parrot knows how to fly, let's make it move<\/h2> Add the
move<\/em> block to the wait<\/em> block in Parrot's
  code.<\/p><\/div>\n"},{"block":null,"spriteName":"Parrot","resource":null,
  "attached":["blockMotionMove",11,0,"6"],"id":12,"text":"
Set the speed of the Parrot<\/h2>
The value of the move block determines the number of steps that the bird makes in every
  cycle of the loop. Set the value of the move<\/em> block to
  6<\/em> in the Parrot's code.<\/p><\/div>\n"},
  {"block":"blockMotionBounceOnEdge","spriteName":"Parrot","resource":
  null,"attached":["blockMotionMove",11],"id":13 ,"text":"
Last step, don't let the bird fly away<\/h2>
If we were to run the program right now, the bird would just fly off the Stage.
  We can easily fix this by adding the bounce on edge<\/em> block to the move<\/em>
  block in the Parrot's code. This is the easiest way to make the Parrot turn around when
  it gets to the edge of the
  Stage.<\/p><\/div>\n"}],"ownerid":"4fc97d5d692f883a79004c38","details":" Watch
  the bird fly back and forth across the Stage.","concepts":"This project combines the
  forever loop, animation and motion to make the bird
  fly across the Stage. The animation is simulated by using Next
  Costume<\/em> in the forever loop. The Move 6 Steps<\/em> block moves the bird in
  the direction it is pointing. If on edge, bounce<\/em> is the block that detects that the
  bird hits the end of the Stage and turns it around.
  Used in combination, it appears that the bird is flying across the Stage. "}

Learning module engine 24, shown in FIG. 2, is invoked when a user runs a lesson module. For example, a user from a learning center client utilizes learning center workshop 21 through an interface to invoke the lesson module. For example, the interface is a web browser on a computing device such as a personal computer or a tablet. For example, when learning is launched, a user chooses to run the lesson module using a browser. Then, learning module engine 24 takes over and guides the user to complete the lesson within the lesson module.

For example, learning module engine 24 displays a lesson bar that shows the steps that the user must perform. The area of the screen that the user must work on is highlighted and in order to proceed, the user must complete a current task. For example, learning module engine 24 provides the user with real-time help such as a "Hint/Show Me" button. Learning module engine 24 also plays any voice over or video associated with the lesson module. Learning module engine 24 also, for example, provides a user with an option to fast forward several steps in a larger task and an option to step backwards.

For example, learning module engine 24, while the user adds logic, highlights the source and target areas of the task. If the user makes a mistake, learning module engine 24 takes the user back to a known state. Once the user has recreated the original program, the lesson is complete. The user can then use learning module generator 23 to modify the lesson module.

For example, learning module engine 24 can also operate in other modes. For example, learning module engine 24 can include a mode where a user can open a lesson module and learning module engine 24 will animate the lesson module to a certain step. Similarly, learning module engine 24 can include a mode where a lesson module is run in slow motion continuously with voiceover. This mode can be useful, for example, when a user wants to generate a video.

Figure 10:
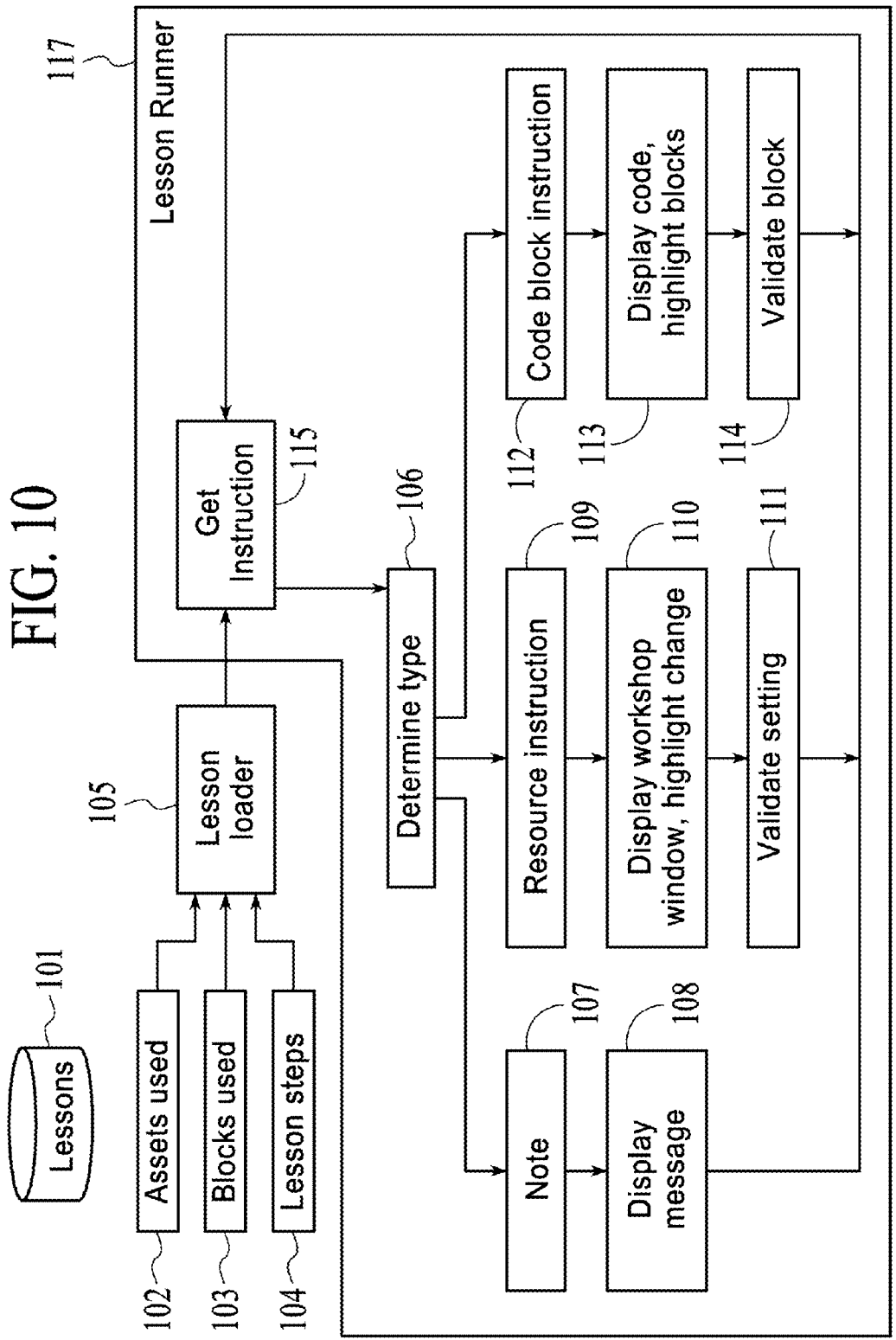
FIG. 10 is a simplified block diagram of a lesson runner architecture that runs lesson modules within a learning center runtime in accordance with an implementation.

FIG. 10 is a simplified block diagram illustrating operation of learning module engine 24. Lessons produced by learning module generator 23 are stored in lessons storage 101. A lesson loader 105 within learning module engine 24 sequentially loads assets, computer programming blocks and lesson steps respectively stored as assets used 102, blocks used 103 and lesson steps 104 within lessons storage 101. Lesson loader loads lesson data and adds to data structures the media assets from assets 102 that will be used. Media assets include, for example, images and sounds.

From within a lesson runner 117, a get instruction block 115 fetches an instruction within the instructions loaded by lesson loader 105. The instruction may include, for example, lessons steps from lesson steps 104, assets from assets 102 and blocks from blocks used 103. Get instruction 115 determines the type of instruction and passes it to the appropriate lesson step handler.

A determine type block 106 within learning module engine 24 sequentially handles instructions from lesson loader 105 and determines instruction type.

For a plain note, the message is displayed and/or spoken. This is an informational message requiring either a timeout or user acknowledgement to continue. This is represented in FIG. 10 where for a note 107, learning module engine 24 displays a message, as represented by a block 108.

When a resource instruction is run, the resources that are to be used when hints are turned on are highlighted. The lesson step instructions are displayed and/or spoken with entered explanations from the lesson creator. A check is performed that the resource was placed in the correct place by checking the associated project data structures for the correct placement. This is represented in FIG. 10 where for a resource instruction 109, learning module engine 24 displays a workshop window and highlights change, as represented by a block 110. Learning module engine 24 also validates settings, as represented by a block 111.

A code block instruction, when run, highlights the block to be used when hints are turned on and shows where the block should be placed on the code canvas. The lesson step instructions are displayed and/or spoken with entered explanations from the lesson creator. A check is trade that the block was placed in the correct place by checking the associated project code data structures. If validation is not successful, a message appears offering some hints. For example, the hints might include such things as animating actions, highlighting location on the display or masking location on the display.

Users are optionally allowed to proceed to the next step, in which case the lesson runner performs the action on behalf of the user. If validation was successful, the next lesson step is executed. This is represented in FIG. 10 where for a code block instruction 112, learning module engine 24 displays code and highlight blocks, as represented by a block 113. Learning module engine 24 also validates programming blocks, as represented by a block 114. After an instruction is processed, in a block 115, a next instruction is obtained. The lesson proceeds until no more steps, at which point the runner can offer additional activities or the user (lesson creator) can embed additional activities that can be done.

Figure 11:
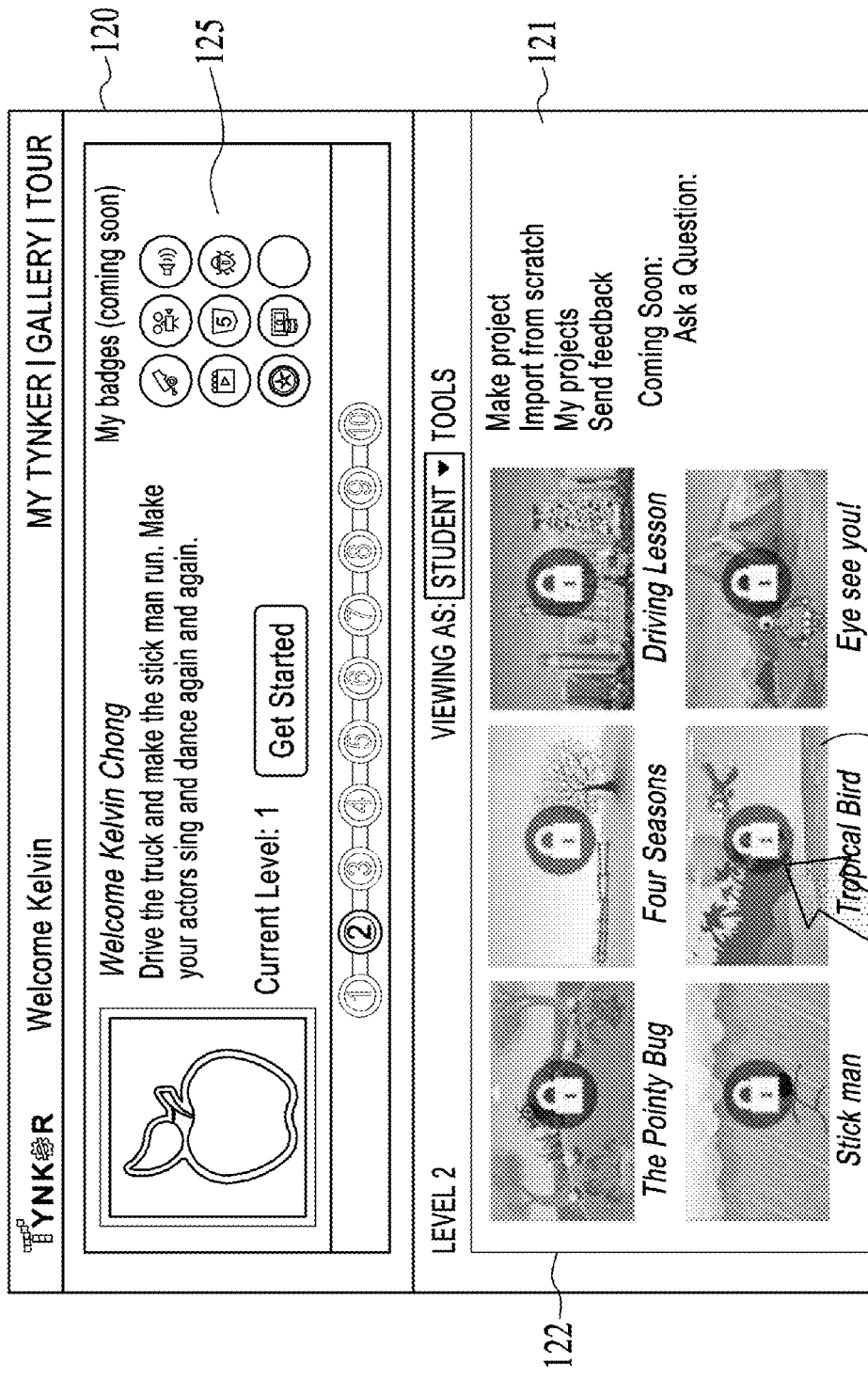

FIG. 11 shows a welcome window interface 120. An area 125 provides announcements to a user. An area 121 allows the user to select an action. An area 122 allows the user to select a project (computer program) to run. In FIG. 11, a cursor 123 illustrates the user selecting an icon 124 for the tropical bird lesson. Selection of icon 124 brings up an interface for the tropical bird and activates learning module engine 24 to run a project lesson for the tropical bird, as illustrated by FIG. 12.

Figure 12:
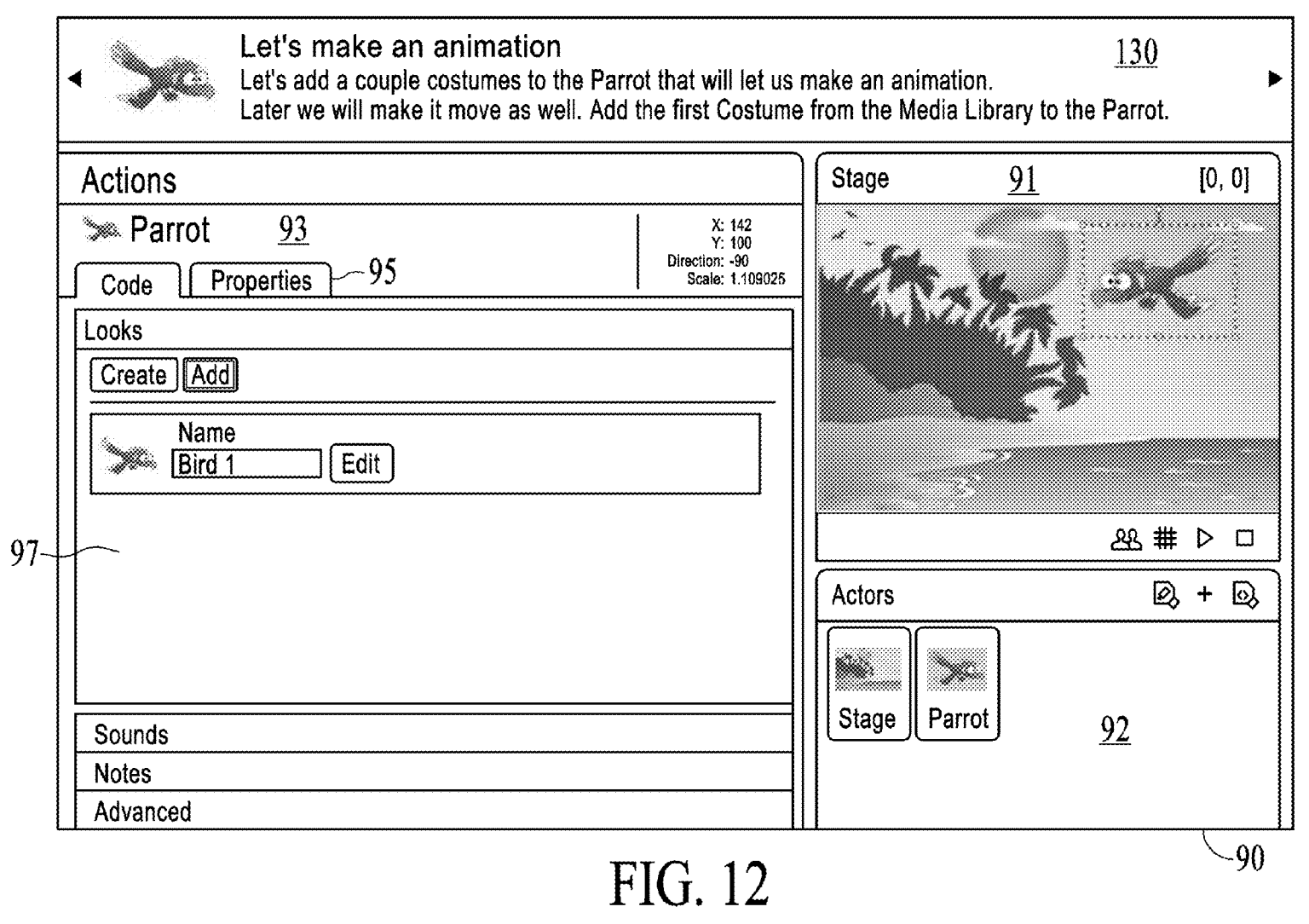
Figure 13:
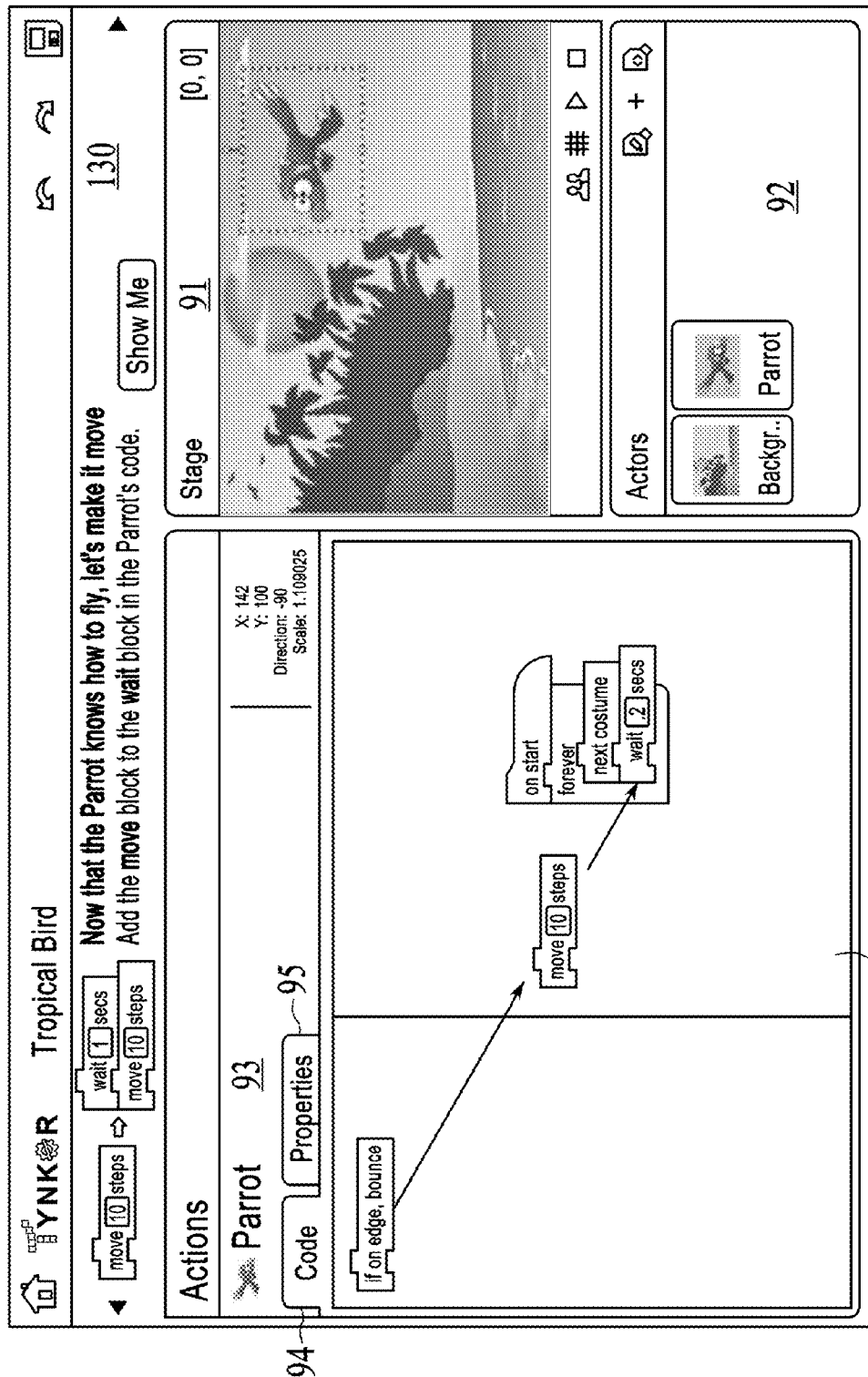

FIG. 12 shows user interface 90 with the added addition of a bar 130 through which learning module engine 24 communicates with the user. As illustrated by FIG. 13, learning module engine 24 communicates to the user next steps in the lesson and also can provide visual instruction by adjusting entities within work area 96 and code block area 97. For example, when a user selects the "Show Me" button within learning bar 130 as shown in FIG. 13, learning module engine 24 provides animation of the move block in code block area 97 being added to the wait block shown in work area 96.

For example, the Learning Center also allows the creation and running of puzzle type lessons with system validating success and failure type triggers. That is, a puzzle is an example of a special kind of lesson that has built in validation. For example, the puzzle has a specific success criteria that the author defines, such as: "Make the robot go to the green square."

The author of a puzzle lesson module builds the project (computer program) using learning center workshop. When building the lesson modules, the author uses two special blocks of code: a success criteria block and a failure criteria block. The author uses the blocks to define success and failure and to indicate the consequences of success and failure. The author then uses learning module generator 23 to generate a lesson module for the project.

When a user opens the project in a lesson running mode, upon a user completing an action, learning module engine 24 will check whether the success or failure criteria are valid.

Learning module engine 24 will then execute the consequences of success or failure, as appropriate. This is illustrated in FIG. 14.

Figure 14:
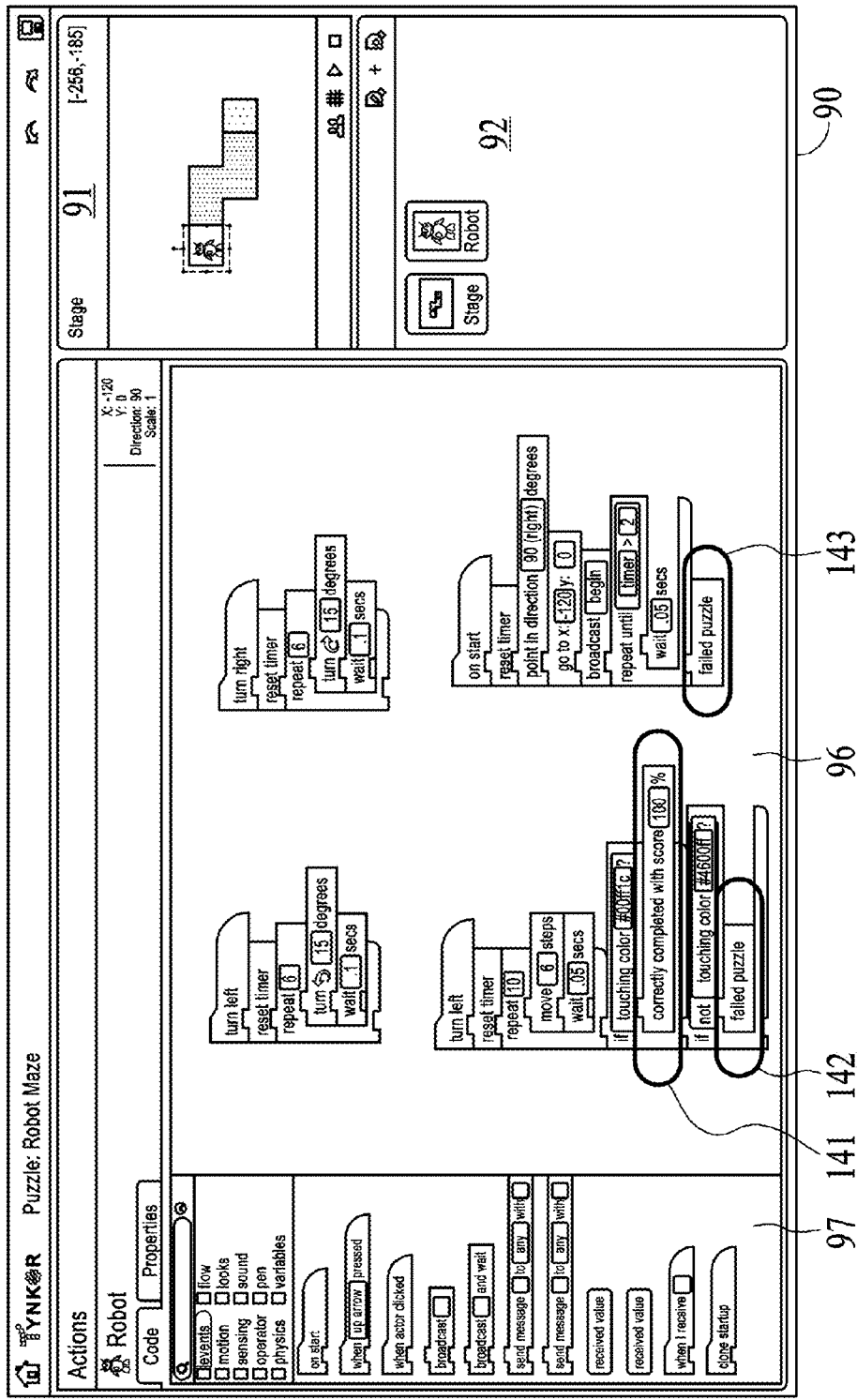
FIG. 14 shows a success criteria block and a failure criteria block as displayed by a graphics user interface used to create lesson modules within a learning center runtime in accordance with an implementation.

FIG. 14 shows how a lesson creator can define a success criteria block 141, a failure criteria block 142 and a failure criteria block 143 within work area 96 of interface 90 while creating a lesson or puzzle with using learning center workshop 21.

Figure 15:
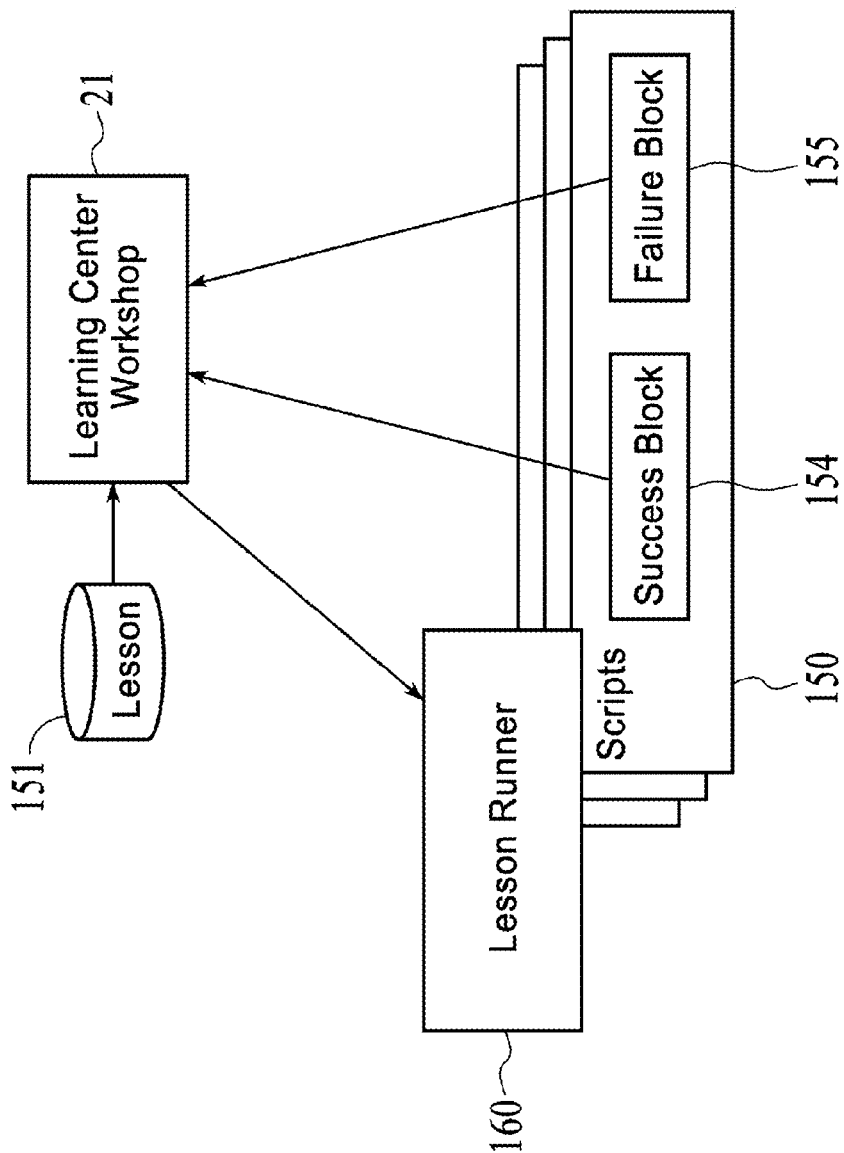
FIG. 15 and FIG. 16 are simplified block diagrams illustrating validation of a project within a learning center runtime in accordance with an implementation.

FIG. 15 is a block diagram that illustrates a lesson module 151 that includes scripts 150 that include a success block 154 and a failure block 155. These are utilized by learning center workshop 21 to construct a project to be run by a lesson runner 160 to run the lesson.

For example, the learning center allows a user to define activities that can be automatically validated by the learning runtime. For example, a task is presented to the student to accomplish a goal such as to write code to move a golf ball into a hole. The student creates the code. In order to check whether the code accomplishes the task, code blocks that the student has added can be checked to see that the code blocks are in the correct order. Alternatively, a trigger methodology can be used to determine whether the task was accomplished.

For example, a trigger is assigned to the objects that a user manipulates. The trigger is based on whether a criteria placed within the computing program has been satisfied. For example the objects are a ball and a hole. The triggers are hidden from the user. The triggers are code instructions that check for the criteria, as delineated by parameters. If the parameters are satisfied, the trigger is fired, and the process that checks that the code can determine whether the user accomplished the task. For example, a geometric criteria specifies that a ball must travel a certain distance. For example, a hole trigger checks that the ball is within the bounds of the hole.

In addition, other types of criteria can be used. For example, a time-based criteria indicates whether a task is completed within a specified amount of time. For example, did a mouse finish a maze in under 8 seconds? A code based criteria determines whether code used to accomplish a task is within predetermined parameters. For example, was a lesson completed using under 8 code blocks and without using recursion? Value-based criteria determine whether a particular value was reached. For example, was a score greater than 25? Event criteria determine whether a certain event criteria was received. For example, was a message sent by one of the actors? A physics based criteria indicates a physical property or phenomena occurred. For example, did a cannon ball reach a velocity of at least 25 meters per second? An external physical criteria indicates some real activity outside the program occur. For example, did a sensor on a physical stage robot move 10 feet?

Figure 16:
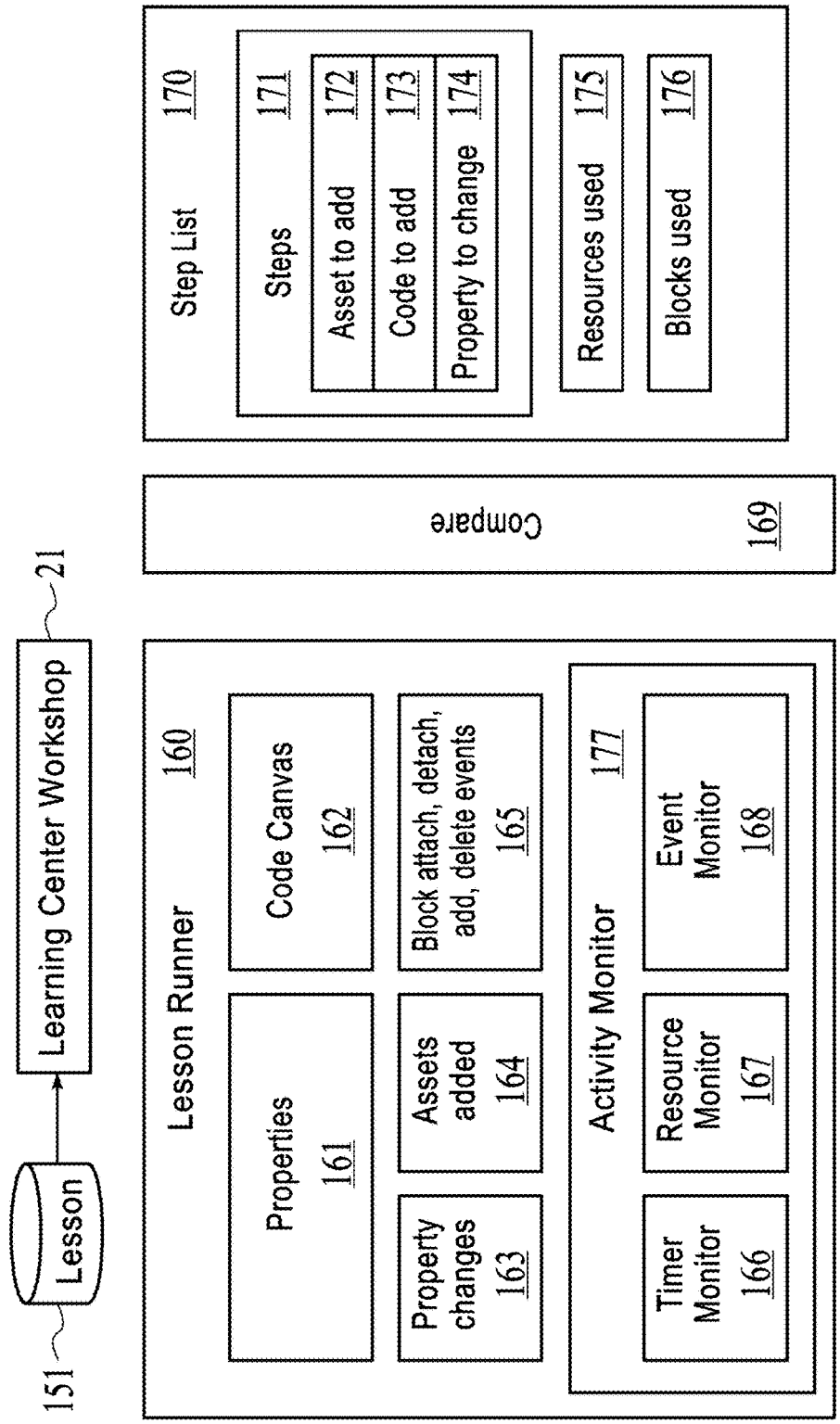

FIG. 16 illustrates validation during a lesson runtime. For example, lesson module 151 is run within learning center workshop 21 that calls lesson runner 160 to run the lesson module. Lesson runner 160 includes properties 161 and a code canvas 162. Actions on properties 161 or code canvas 162 triggers property changes 163, assets added events 164 and block events 165. Block events 165 include, for example, block attach events, block detach events, block add events and block delete events.

An activity monitor 177 within lesson runner 160 includes a timer module 166, a resource monitor 167 and an event monitor 168. Lesson runner 160 performs a compare function 169 with a step list 170. Step list 170 includes steps 171, resources used 175 and blocks used 176. Each of steps 171 may be an asset to add step 177, a code to add step 173 or a property to change step 174.

Figure 17:
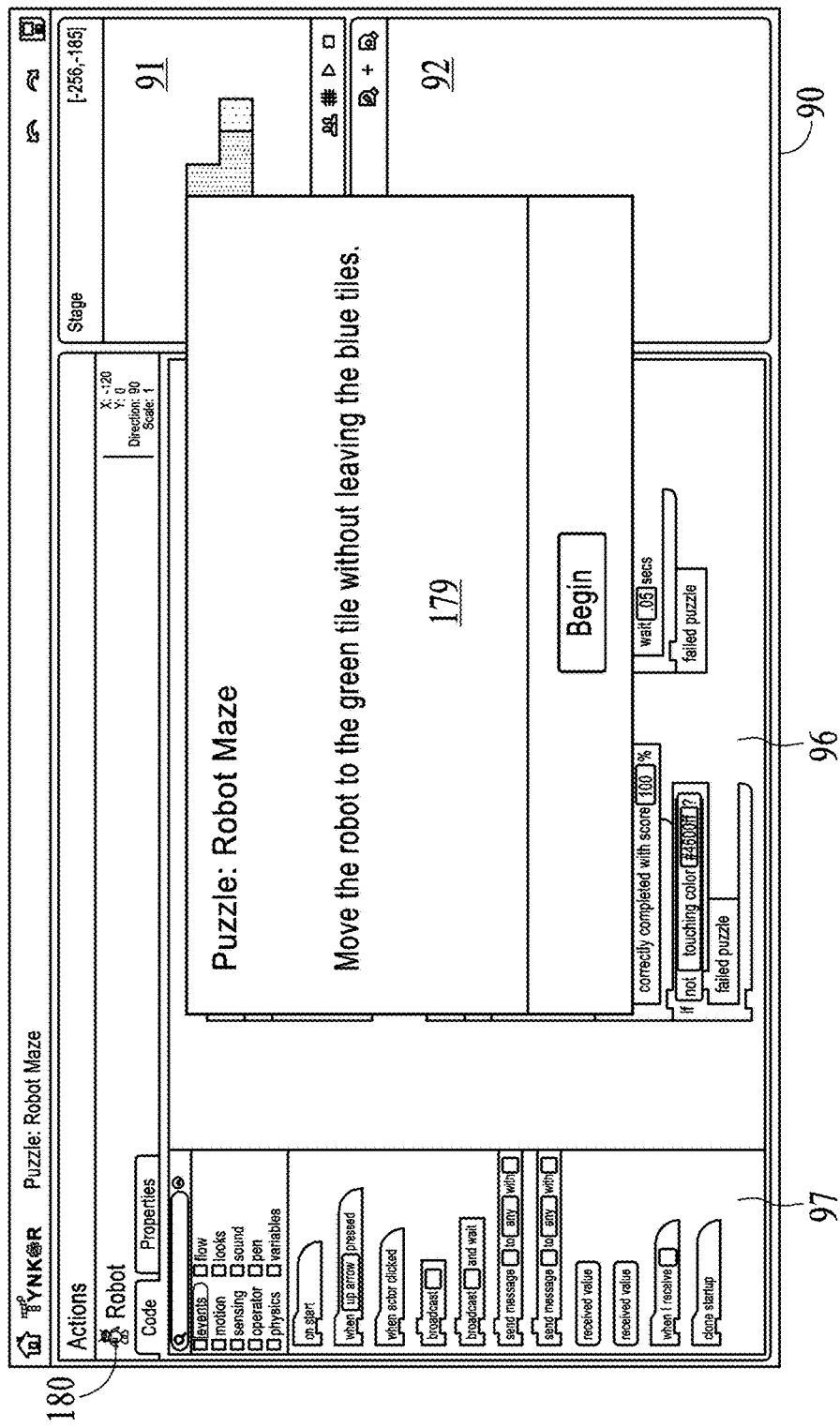
FIG. 17, FIG. 18 and FIG. 19 are simplified diagrams illustrating operation of a graphics user interface providing runtime feedback to a user within a lesson running in a puzzle mode within a learning center runtime in accordance with an implementation.

FIG. 17 gives an example of a window 179 that may appear over interface 90 that gives instructions for a lesson module that includes validation.

Figure 18:
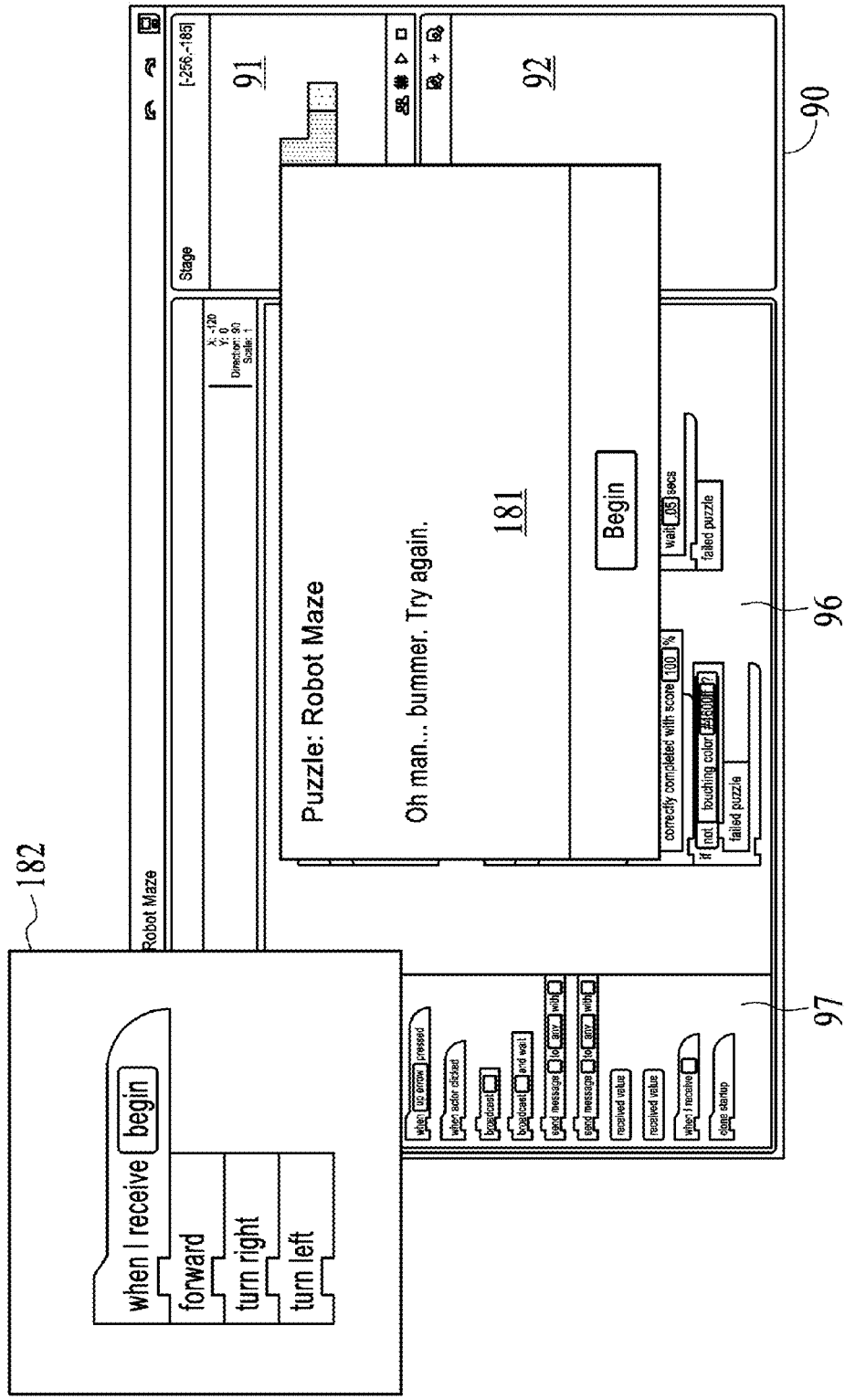

FIG. 18 gives an example of a window 181 that appears over interface 90 when a user fails to perform a lesson properly. Blow up section 182 of work area 96 shows the incorrect code blocks.

Figure 19:
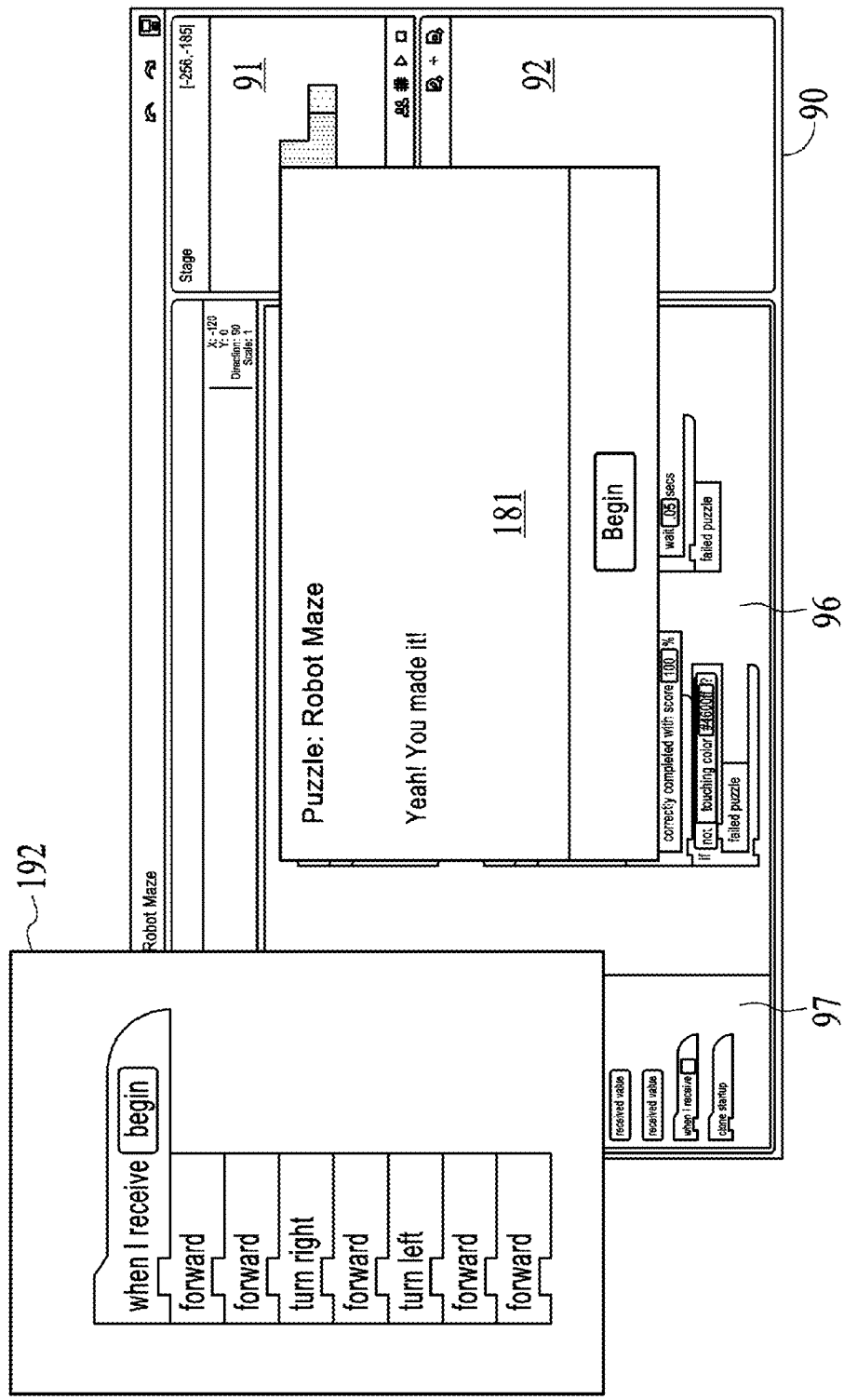

FIG. 19 gives an example of a window 191 that appears over interface 90 when user performs a lesson properly. Blow up section 192 of work area 96 shows the correct code blocks.

After a project author generates a lesson module within learning center server 12, the author can make the lesson module available to other users of learning center server 12. For example, other users are charged a fee for using a lesson module made available by an author and the author receives a portion of the fee, based, for example, on the number of other users that use the lesson module.

For example, an author is reimbursed based on tracking the number of times another user views or completes a lesson authored by the author. For example, an author gets paid $2 for every 1000 lesson views inside a paid course authored by the author. Alternatively, an author can sell a lesson for a flat fee.

Goal-Based Lesson Module Generation

Embodiments of the present disclosure can be used to generate lessons of varying scope to teach different programming aspects to students. In exemplary embodiments, students may select one or more programming goals they'd like to learn from a list of possible programming goals presented to the user via the user interface 90. Goals presented in this manner may include pre-written projects and/or lesson modules that can be parsed by the learning module generator 23 to generate a list of tasks to teach the concepts, skills, and techniques associated with the goal.

Alternatively, a student may identify a software program (such as a game) or portion thereof that the student wishes to learn how to write, thereby presenting the student's own goal (learning to write a similar program) to the learning center workshop 21 or other software implementing functionality of the embodiments of the present disclosure. In such cases, systems and methods of the present disclosure can analyze the program and (based on pre-identified goals, skills, concepts, and code blocks) identify the goals, skills, techniques, and concept involved in writing the program, then generate a lesson module accordingly.

The programming goal identified by a student may pertain to any desired subject matter, programming language, functional effect, hardware component(s), or other characteristic. Exemplary goals may include creating a cartoon with sound, designing a game, creating an animated greeting card and many others. A variety of techniques and skills may be associated with each goal, and each technique or skill may in turn be associated with various core programming concepts.

For example, one possible goal that a user may select is to learn how to build a single-player side-scrolling game. This goal could be selected from a gallery of possible goals, or by the user identifying a side-scrolling game the user wishes to emulate. Associated with this goal may be one or more skills and techniques, such as animation, interactivity, general game building, sound handling, and others. Each skill or technique, in turn, may have one or more associated lower level (i.e., more detailed or fundamental) concepts.

Each skill, technique, and/or concept may be taught using one or more lessons as described in more detail herein.

Figure 21:
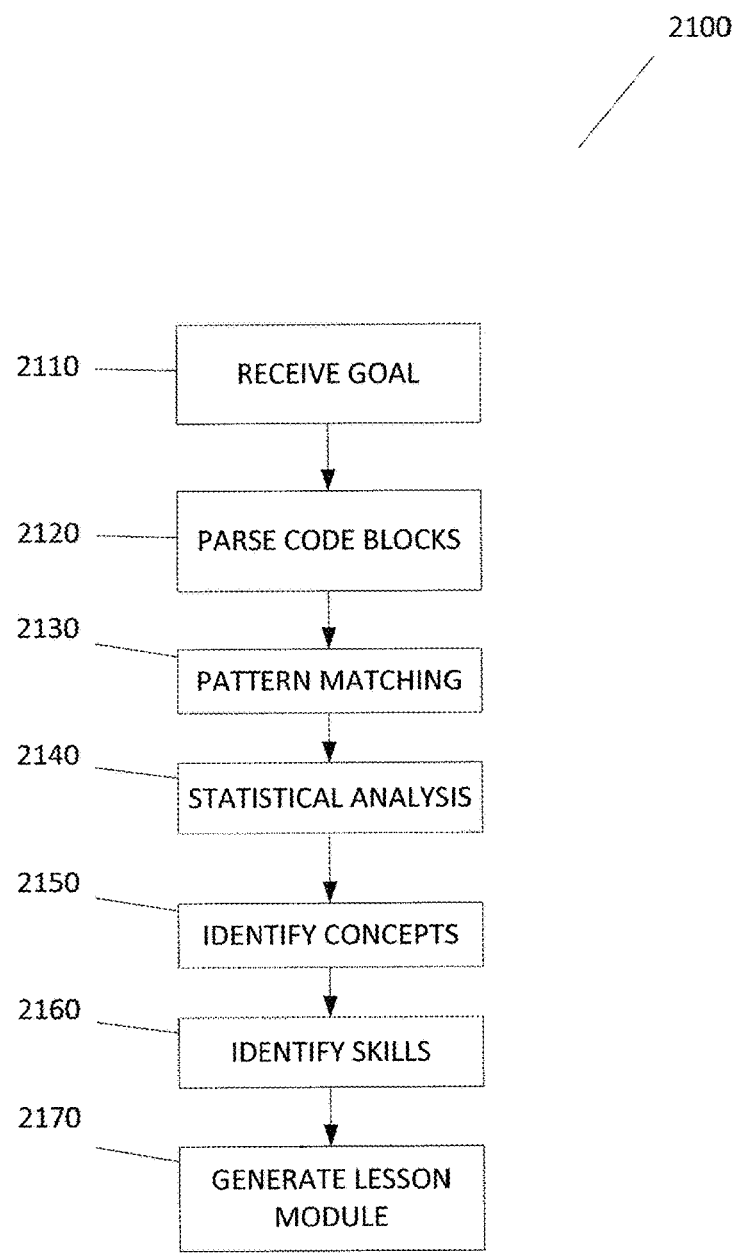
FIG. 21 is a flow diagram of an exemplary process in accordance with various aspects of the present disclosure.

FIG. 21 depicts an exemplary process for generating a lesson module based on an identified goal according to various aspects of the present disclosure. Embodiments of the present disclosure may perform more or fewer steps than those shown in FIG. 21, and may perform the steps of method 2100 in any order and in conjunction with steps of other processes. Furthermore, exemplary method 2100 is described as being implemented by learning center workshop 21 below, however this method (and others) may be implemented, in whole or in part, by any other combination of hardware or software components operating in conjunction with the present disclosure. Additionally, while various interactions are described with reference to a "student," it is to be understood that other users (such as teachers and parents) may likewise interact with the embodiments disclosed herein.

In the exemplary method 2100, a programming goal is received (2110). Where the goal is associated with a learning workshop project external computer program, or other software, such software can be parsed to identify code blocks (2120), and a statistical (2130) and pattern matching (2140) analysis performed on the code blocks to identify the concepts (2150) and skills/techniques (2160) associated with the goal. Alternatively, or in addition, the identification of concepts (2150) and skills (2160) may be performed by retrieving concepts, skills, code blocks, and/or lesson modules stored in conjunction with the goal in a database. A lesson module is generated (2170) in accordance with the identified skills, techniques, and concepts, for presentation to a student.

The programming goal may be received (2110) by the learning center workshop 21 in any suitable manner. For example, a student may select the programming goal from a list of possible programming goals presented to the user via the user interface 90. A list of goals may be presented using graphics, icons, buttons, pulldown menus, and/or any desired user interface feature. The student may also input one or more keywords to perform a search to find a goal associated with the one or more keywords. In this case, the goal and its associated skills, techniques, concepts, and projects/programs may be stored in a database accessible by the learning center workshop 21, learning center server 12, and/or other hardware or software component implementing methods of the present disclosure. Alternatively, the programming goal may be received (2110) by the student identifying a program (or portion thereof) that the student wishes to learn how to emulate.

The identification of higher-level programming skills and techniques associated with a goal (2160) or lower-level programming concepts associated with skills and techniques (2150) may be identified using similar (or different) techniques, and according to any desired criteria. Any number of skills and techniques may be associated with any particular goal, just as any number of core concepts may be associated with each individual skill/technique. Goals, skills, techniques, and concepts may be associated with identifying "tags." Such tags can be defined and assigned to code blocks, programs, goals, skills, techniques, and concepts stored in a database in communication with the learning center workshop 21. As discussed below, this repository can in turn be used to tag code blocks, programs, goals, skills, techniques, and concepts for new programs (e.g., identified by a student as part of a programming goal the student wishes to achieve).

The goals, skills, techniques, and concepts may have a hierarchal relationship with each other. For example, a goal (at the highest level of the hierarchy) may have a plurality of associated skills at a lower level in the hierarchy, with each associated skill associated with one or more programming concepts at an even lower level. In this context "low level" refers to a lower level of abstraction (and thus a higher level of detail), whereas "high level" refers to a higher level of abstraction (and thus a lower level of detail) associated with a goal, skill, technique, or concept. Accordingly, a low-level concept might be associated with mathematical operators, while a relatively higher-level concept or skill might be associated with geometric art that includes the use of mathematical operators, as well as other lower-level concepts.

In response to the selection of a goal, the learning center workshop 21, may identify one or more concepts (2150) and/or skills (2160) necessary for the student to achieve the goal, as well as skills or techniques associated with the goal in any other desired manner. Skills may be identified in response to the goal selection in real-time or near-real-time, or they may be predefined. For example, in a case where the student selects a programming goal from a list, the skills, techniques, and concepts may be pre-defined and stored (e.g., in a relational database record) in conjunction with a pre-generated lesson module.

In another example, in a case where the student identifies his or her goal by identifying a computer program the student wishes to learn how to write or emulate, the learning workshop 21 may analyze the program entered by the student to identify the goals, programming skills, techniques, concepts, and code blocks associated with the identified program. The student can identify a computer program in any desired manner, such as by uploading source code or object code for the program into the learning center workshop 21 or by providing a link to the program. The student may identify an entire complete program as well as portions of a program (such as individual functions or code fragments) associated with a programming goal the student wishes to achieve.

The code identified by a student is parsed (2120) to identify one or more code blocks within the code. Each identified code block is compared to code blocks known to the learning center workshop 21 (e.g., stored in a database and associated with one or more concepts, skills, and/or goals). Based on the similarity between the identified code block and one or more known code blocks, concepts, skills, and techniques can thus be assigned to the overall code.

In the exemplary method 2100, one or more code blocks may be compared to known code blocks based on similar patterns. Such patterns may include, or be based upon sequences of instructions, variable names, function calls, interactions with other program elements, and any other desired features or criteria. A pattern may be identified for one or more lines of code, as well as for one or more code blocks.

Embodiments of the present disclosure may determine the functionality of blocks of code in an identified program. Among other things, this may aid in comparing the identified blocks to known coding blocks with similar functionality. Functionality of one or more code blocks may be determined in any suitable manner. For example, an identified code block may be executed using a virtual machine (i.e. a software simulator that emulates the functionality of a real-world system) and the functionality of the block determined based on the execution. The functionality of the identified code block can then be compared to the functionality of known code blocks associated with one or more goals, skills, techniques, and/or concepts. The functionality of a code block may include, for example, user input, output to a user, modification of one or more states by a user, an environmental restart (e.g., characters in a game are reset to their initial state), and combinations thereof. Among other things, use of a virtual machine to execute code blocks allows embodiments of the present disclosure to analyze code executable across a variety of different hardware platforms and operating systems without having to test the code blocks on each actual platform.

The code identified by a student may have any number of different identified code blocks associated with it. Additionally, some code blocks may be associated with multiple goals, skills, concepts, and/or techniques, and therefore may not (by themselves) be determinative in identifying a particular concept (2150) or skill (2160) for the identified code. Embodiments of the present disclosure may perform any desired analysis or other procedure to help ensure a lesson module (or multiple lesson modules) is generated that correctly addresses the subject matter associated with a student's goal.

For example, embodiments of the present disclosure may perform a statistical analysis (2140) to identify concepts and skills associated with a program. The statistical analysis (2140) may include calculating the probability that an identified code block (or group of code blocks) is associated with a skill, concept, or goal based on the known code blocks and the skills, concepts and goals with which they are associated. A particular skill or concept can be assigned to the code identified by the student in response to such a probability meeting or exceeding a predetermined threshold. Probabilities for any number of different code blocks can be calculated in any desired manner, such as by calculating, for each of a plurality of identified code blocks, a probability that each respective identified code block is associated with each respective skill from the one or more skills.

In one example, a program identified by a student may be parsed (2120) and the code blocks within the code identified, via pattern matching (2130) to known code blocks, as having the following skill and concept tags associated with the code:
 (animation)
 (motion)
 (keyboard_interaction)
 (score_tracking)
 (programmatic_music)

This sequence of skills and concepts can then be compared to the skills and concepts associated with known programs (e.g., stored in a database in communication with learning workshop 21) that are representative of programs associated with the various skills and concepts.

In this example, the probability each concept or skill is associated with a particular type of program (specifically a "game") is as follows:
 (animation)—0.9
 (motion)—0.9
 (keyboard_interaction)—0.9
 (score_tracking)—0.9
 (programmatic_music)—0.1

In this example, out of all programs in the database identified with the "game" tag, 90% of the time, there is an "animation" sequence, but only 10% of the time is there a "programmatic_music" sequence. Embodiments of the present disclosure may calculate probabilities in any desired manner, such as by utilizing a Bayesian calculation. Continuing the previous example, the probability that a sequence associated with a skill or concept is in the program identified by the student may be calculated using the following equation:
 probability_of_sequence_type_in_program=probability_of_being_program_type_given_sequence/(probability_sequence_appears_in_program_type+probability_sequence_appears_in_other_program_types)

Additionally, the probabilities for all the block sequences as a whole can be determined. The respective probabilities for each sequence are in a given type of program can be combined in an extension of a Bayesian equation as follows:

$$\text{probability\_of\_program\_type} = (p1*p2* \ldots *pn)/((p1*p2**pn)+((1-p1)*(1-p2)* \ldots *(1-pn)))$$

Using the above exemplary equations, the program identified by the student in this example would have a probability of 0.999 (99.9%) that is a "game" program. In embodiments where the learning center workshop 21 assigns a tag for a goal, skill, or concept to a program when the probability that one or more code blocks are associated with the same goals, skills, or concepts assigned to one or more known code blocks or programs meets or exceeds a threshold of, for example, 90%, the program would be assigned the "game" tag in this example. In the same manner, the probability that the code block sequences in the program are associated with another type program may be used to determine the identified code or identified code blocks are not associated with a particular goal, skill, or concept. For example, if the individual probabilities that the code block sequences are associated with a music program are:
 (animation)—0.3
 (motion)—0.1
 (keyboard_interaction)—0.2
 (score_tracking)—0.0
 (programmatic_music)—0.9 then the program will have a very low probability of being a "music" program because "music" programs have more programmatic music elements rather than animation, motion, keyboard interation, and score tracking.

The statistical analysis (2130) may include other calculations and analyses as well. For example, embodiments of the present disclosure may be configured to generate alerts in response to one or more calculated probabilities that a goal, skill, and/or concept associated with a particular code block, group of code blocks, or program being below a predetermined threshold. Using the example above, an alert might be generated in response to the individual probabilities for three of the five identified concepts and skills being below 40%. In other cases, an alert could be generated in response to the probabilities associated with each of any desired number or percentage of identified code blocks being below a predetermined threshold.

Embodiments of the present invention may determine complexity metrics associated with the identified code. The complexity metric can be determined for individual code blocks as well as for the identified code as a whole. Among other things, the complexity metric can help students and teachers determine whether the difficulty of a particular programming goal or project. Exemplary complexity metrics may include: a type associated with a code block, the number of code blocks in the code, a level of nesting in a code block, a number of devices (e.g., input/output devices, communication hardware) interfacing with the code, a type of media (e.g., sounds, images, video) used by the code, functionality of the code, and combinations thereof.

The lesson module is generated (2170) in accordance with the identified goal, skills, techniques, and concepts as described above. While method 2100 is described in accordance with generating a lesson module for a single goal, the learning center workshop 21 may generate a lesson module that includes steps for teaching a student about any number of different goals, skills, techniques, and concepts. For example, for each skill, technique, or concept identified, the learning center workshop 21 may generate a respective step (or set of steps) in the ordered list of steps in the lesson module particularly tailored to teach a student the respective skill, technique, or concept. A lesson module may also be generated for each individual skill, technique, or concept associated with a goal. Additionally, any number of lesson modules may be generated for a given goal, skill, technique, or concept.

Figure 22:
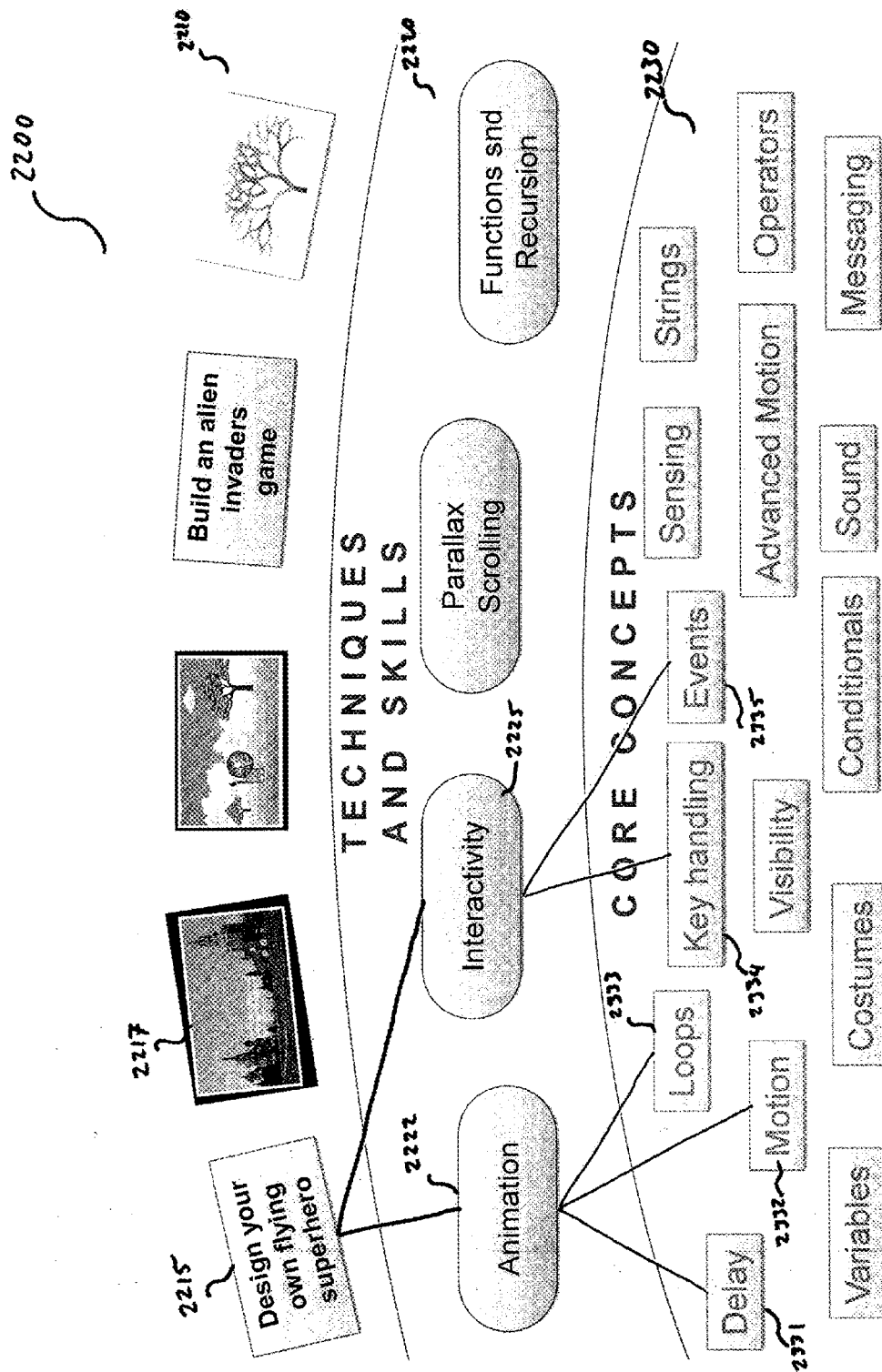
FIG. 22 is a block diagram illustrating exemplary relationships between programming goals, programming techniques and skills, and programming concepts in accordance with various aspects of the present disclosure.

Referring now to FIG. 22, diagram 2200 illustrates a hierarchal view showing the relationships between various exemplary goals 2210, techniques and skills 2220, and core concepts 2230. As described previously, a goal may be described in text (as with goal 2215), represented by an image (such as goal 2217 representing a goal of animating a drawing), or in any other desired manner. In accordance with diagram 2200, the learning center workshop 21 may identify two skills/techniques 2220 associated with goal 2215, namely animation 2222 and interactivity 2225. In turn, animation 2222 may be associated with the core concepts of delay 2331, motion 2332, and loops 2333 while interactivity may be associated with the concepts key handling 2334 and events 2335. While animation 2222 and interactivity 2225 are illustrated as each being associated with different concepts, goals 2210, techniques/skills 2220, and concepts 2230 may be associated with each other in any suitable manner, including multiple techniques/skills 2220 being associated with the same concept 2230.

Customized Lesson Creation and Application

Embodiments of the present disclosure can be used by users supervising students (such as parents and teachers), or event the students themselves, to construct custom courses to teach students various concepts (including concepts related to computer programming) As described above, lesson modules (also referred to herein as "learning modules") may be created and stored in a database to teach various skills and concepts. Additionally, as described below, these lesson modules may be customized and personalized to a particular student or group of students. The lesson module may be applied (i.e. provided) to a student and the progress of the student in completing the lesson module may be monitored to further customize the lesson module (or future modules) to the specific capabilities and needs of the student.

Figure 23:
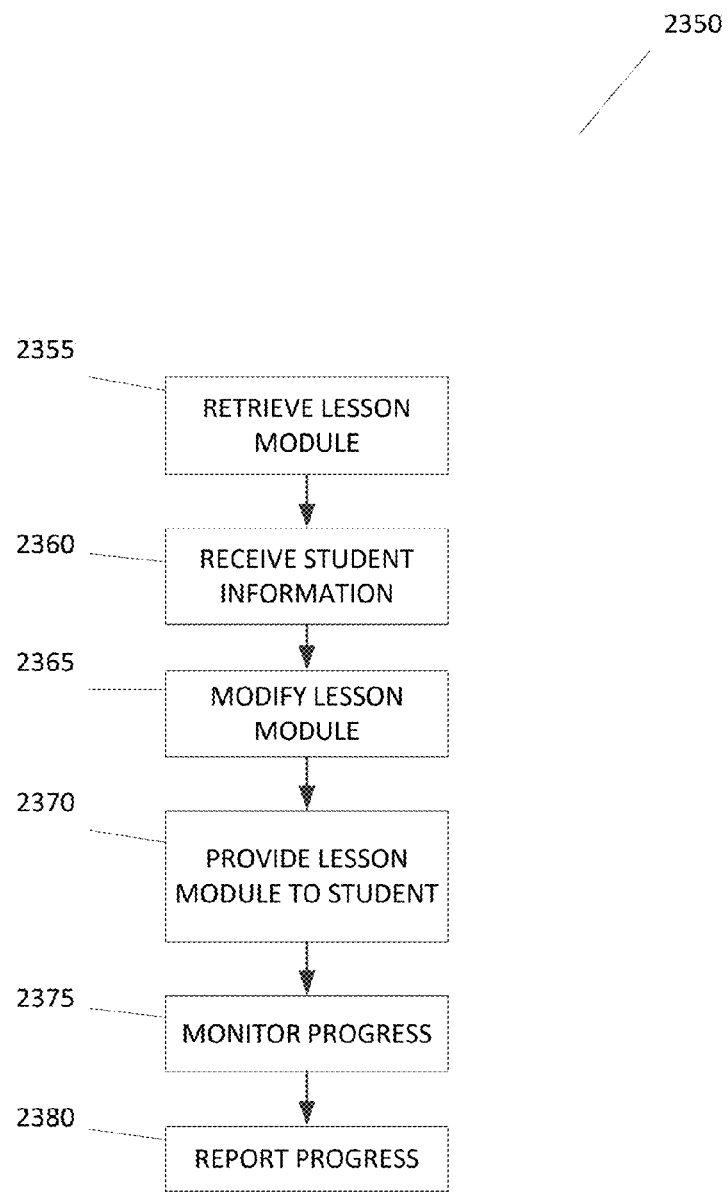
FIG. 23 is a flow diagram of an exemplary process in accordance with various aspects of the present disclosure.

FIG. 23 depicts an exemplary method for automatically customizing and applying a lesson module according to various aspects of the present disclosure. In this example, method 2350 includes retrieving a lesson module from a database (2355), receiving information regarding a student (2360), modifying the lesson module based on the student's information (2365), providing the lesson module to the student (2370), monitoring the student's progress in completing the lesson module (2375), and reporting the student's progress (2380).

Learning modules may be retrieved (2370) from any suitable database or other source such as, for example, the learning center server 12 depicted in FIGS. 1 and 2, described above. Learning modules may be directed to teaching any desired skill, technique, and concept. Learning modules may include a variety of different content, such as quizzes, puzzles, slide shows, video, audio, graphics, text, and any other desired content. The learning modules may be parameterized to deliver different forms of content, and may include various plug-ins.

Figure 24:
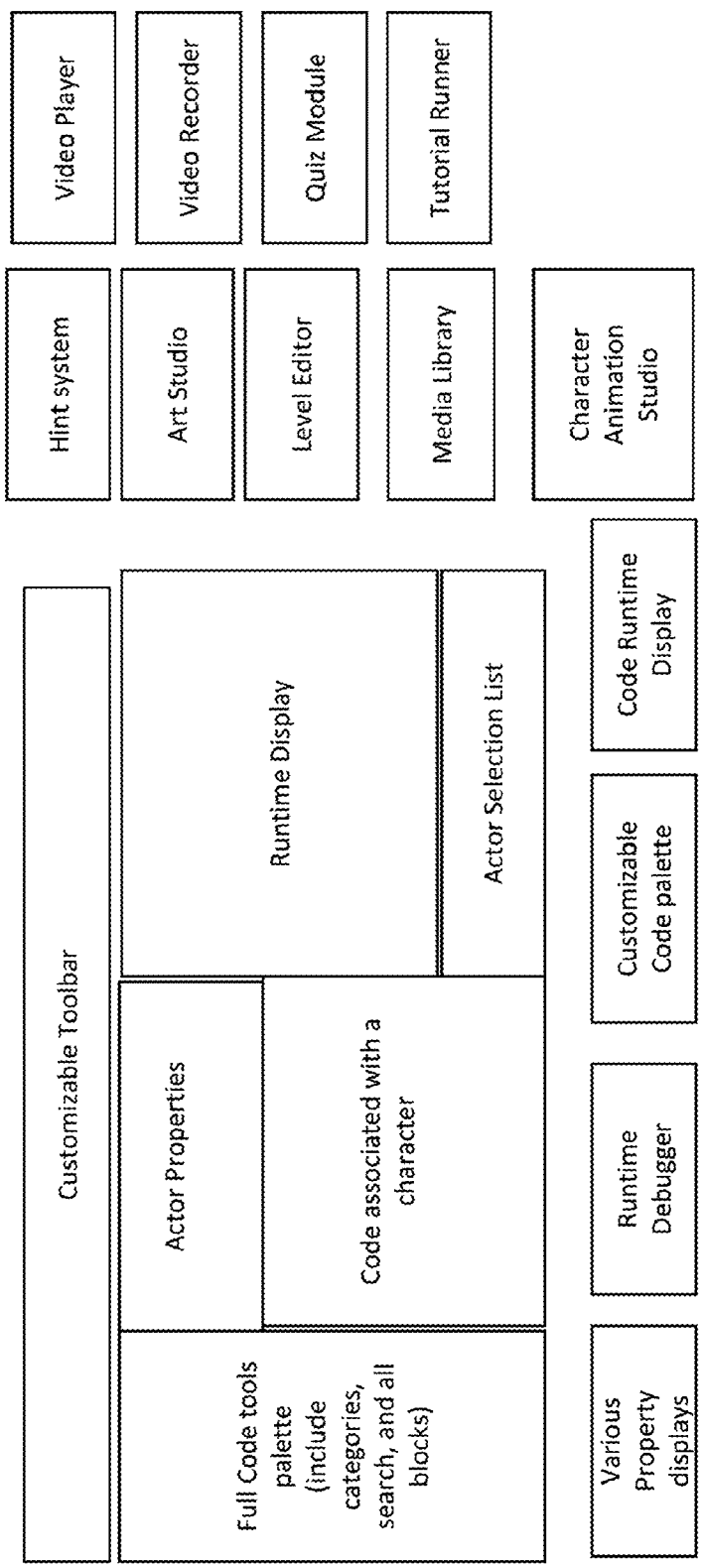
FIG. 24 is a block diagram depicting various configurable lesson modules and other components that may be provided to a student in accordance with various embodiments of the present disclosure.

FIG. 24 depicts an exemplary collection of learning modules and other plug-in components for display to a student. In this example, a scripting language may be used to customize the components and define which set of plug-ins to display to the student. In this manner, course developers and other users may use a scripting language, such as Extensible Markup Language ("XML"), Javascript Object Notation "JSON," and the like to build customized lessons for retrieval (2355) from a database, and a lesson plan generator of other software component may parse the XML and deliver the customized lesson module and associated components to the student (2370). Among other things, components configured using a scripting language allows embodiments of the present disclosure to dynamically configure lesson plans (at runtime) based on a student's current progress, the student's measured ability, and other criteria.

Figure 26A:
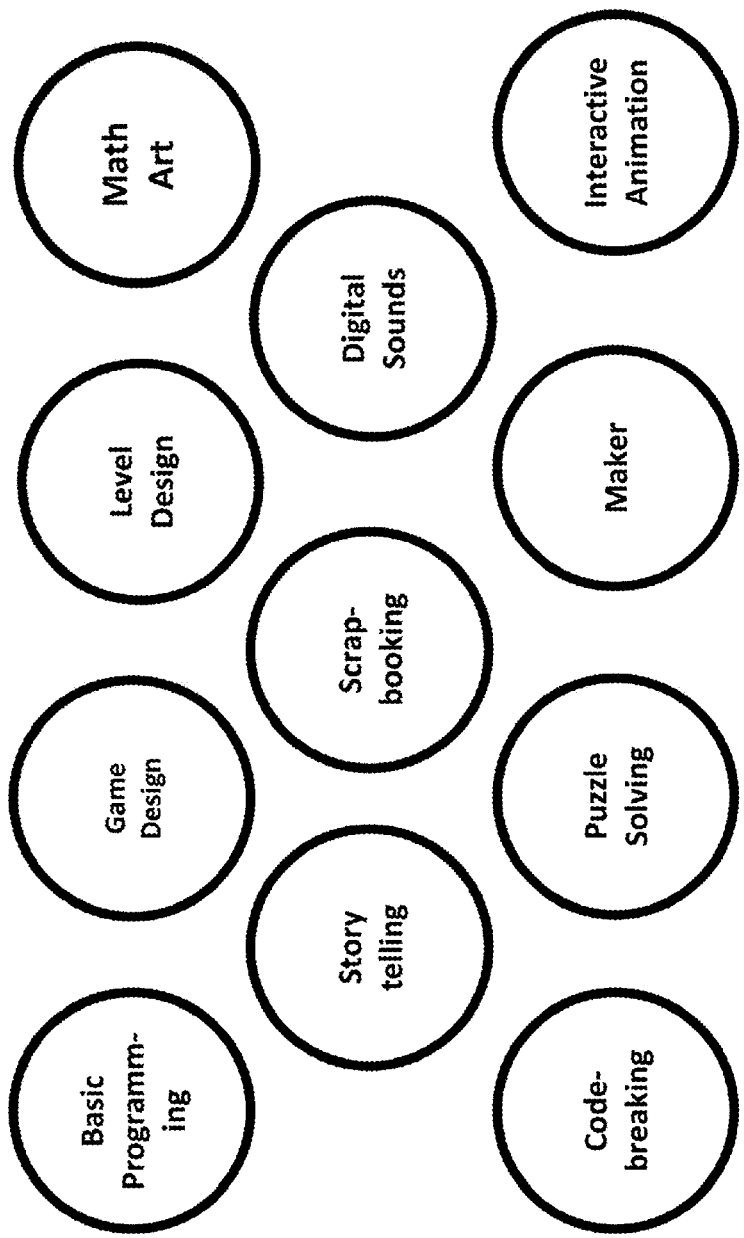
FIGS. 26A-26C illustrate exemplary aspects of providing learning modules to a student based on a goal identified for the student.
Figure 26B:
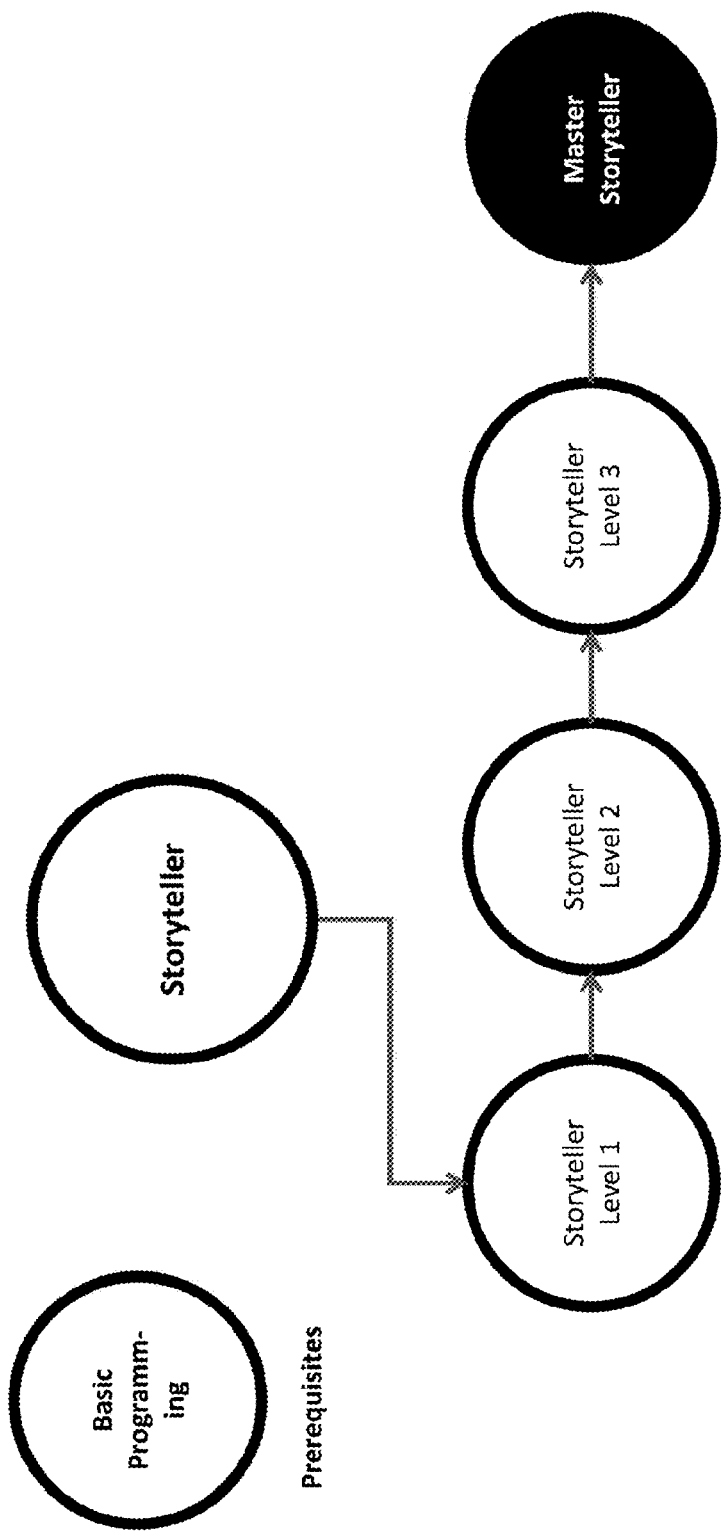
Figure 26C:
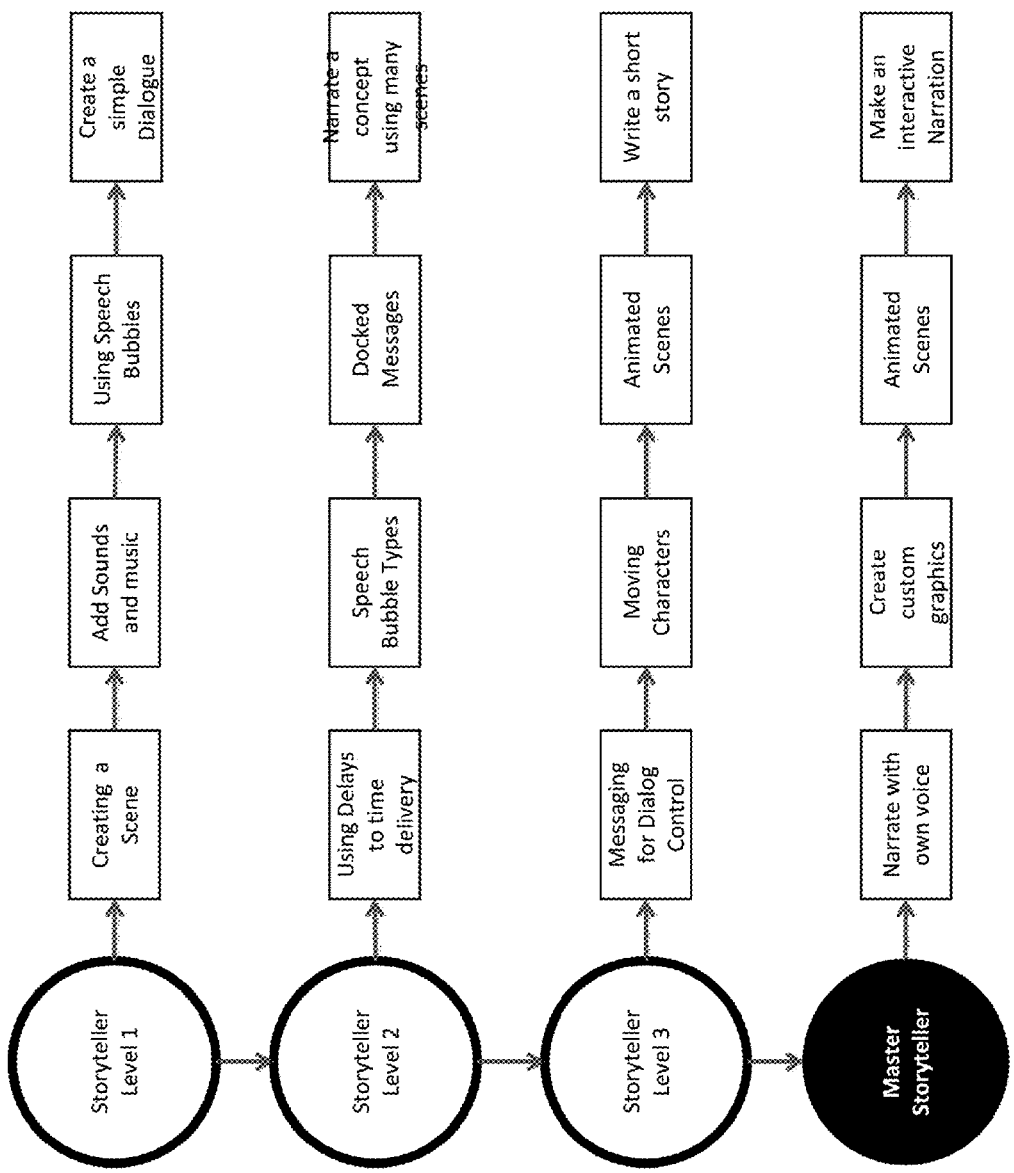

As described above, learning modules may be retrieved (2355) based on a goal identified for the student (2360). Goals may include any desired objective or set of objectives for a student, such as learning one or more programming concepts, or obtaining an award (such as a badge or certificate) for completing a particular lesson modules and/or completing a lesson module with at least a predetermined level of proficiency. FIGS. 26A-26C illustrate exemplary aspects of providing learning modules to a student based on a goal identified for the student. FIG. 26A illustrates an exemplary group of programming goals that the student may choose or have chosen for them by a teacher, parent, or other user.

Figure 26D:
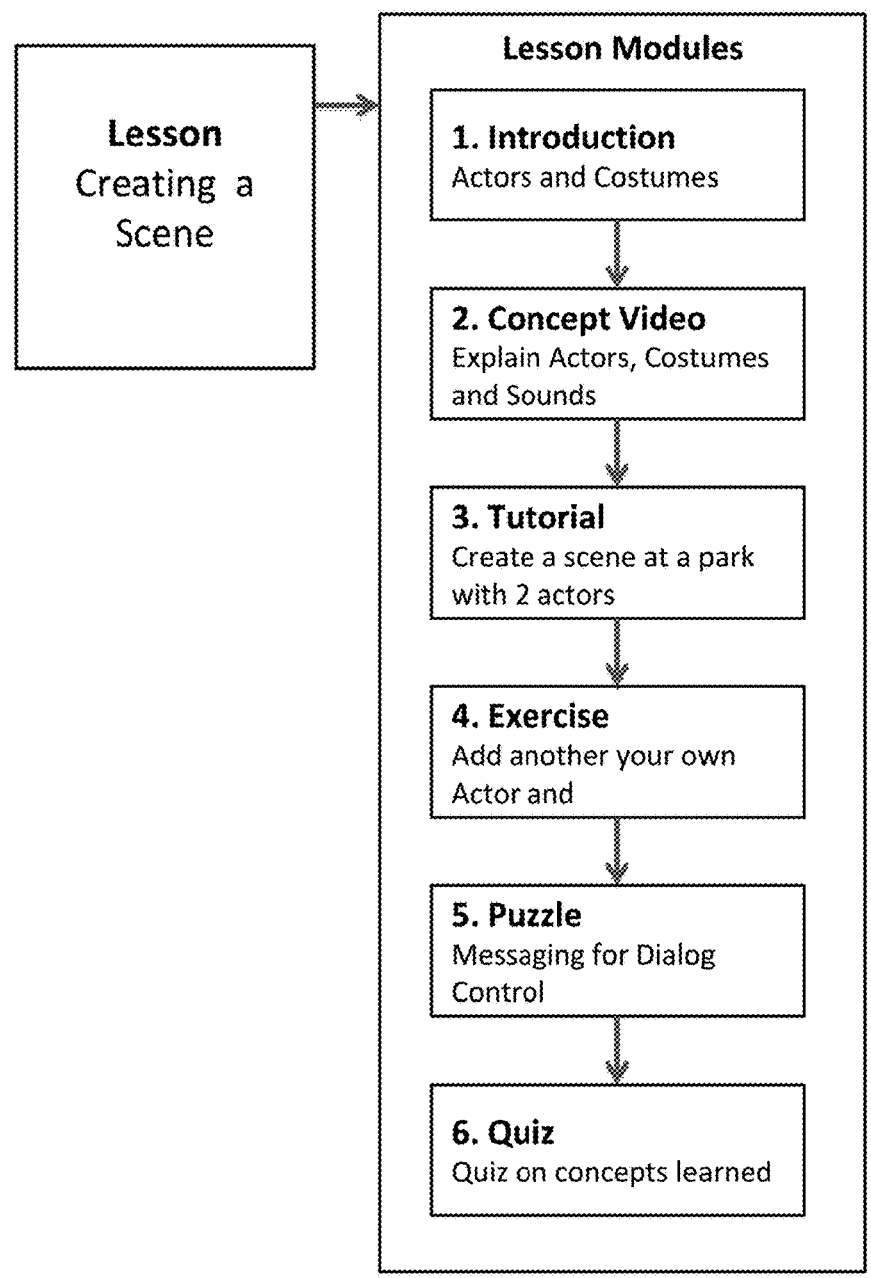
FIG. 26D illustrates an exemplary set of lesson modules provided to a student in conjunction with a lesson.

FIG. 26D illustrates an exemplary set of lesson modules provided to a student in conjunction with a lesson, "creating a scene" from the goal "Storyteller Level 1" in FIG. 26C. In this example, the lesson modules include presenting an introduction to the student (module 1), providing a video to introduce concepts of the lesson (module 2), providing a tutorial of the concepts (module 3), giving the student an exercise to perform that utilizes the concepts of the lesson (module 4), giving the student a puzzle to solve that uses the concepts of the lesson (module 5), and quizzing the student on the concepts in the lesson (module 6).

In some exemplary embodiments, learning modules may be retrieved (2355) based on a determination of dependencies between lesson modules. In some embodiments, a student may be prevented from accessing some or all of a second lesson module until the user has completed a second lesson module upon which the first lesson module depends. For example, a first lesson module may be retrieved, modified, and provided to a student that teaches one or more fundamental concepts upon which more advanced concepts are based. Upon successfully completing some or all of the first lesson module, a second lesson module directed to the advanced concepts may be presented to the student.

In FIG. 26B, for example, a goal of "Storyteller" is identified for a student, which is based on the fundamental concepts associated with the goal of "Basic Programming." Additionally, the "Storyteller" goal has four sub-goals (Storyteller Levels 1-3 and Master Storyteller). As shown in FIG. 26C, each sub-goal has a lesson plan comprising multiple lesson modules, and a student may be prevented from accessing a later lesson module (e.g., "Using Speech Bubbles" in Level 1) until the student has completed an earlier lesson module (e.g., "Creating a Scene" in Level 1). Likewise, a student may be prevented from accessing lesson modules in a later (e.g., Level 2) sub-goal until the student successfully completes the lesson modules from an earlier sub-goal (e.g., Level 1). Determinations of "successful" and "unsuccessful" completion of learning modules and goals may be made in any desired manner, including those described in more detail below.

Figure 27A:
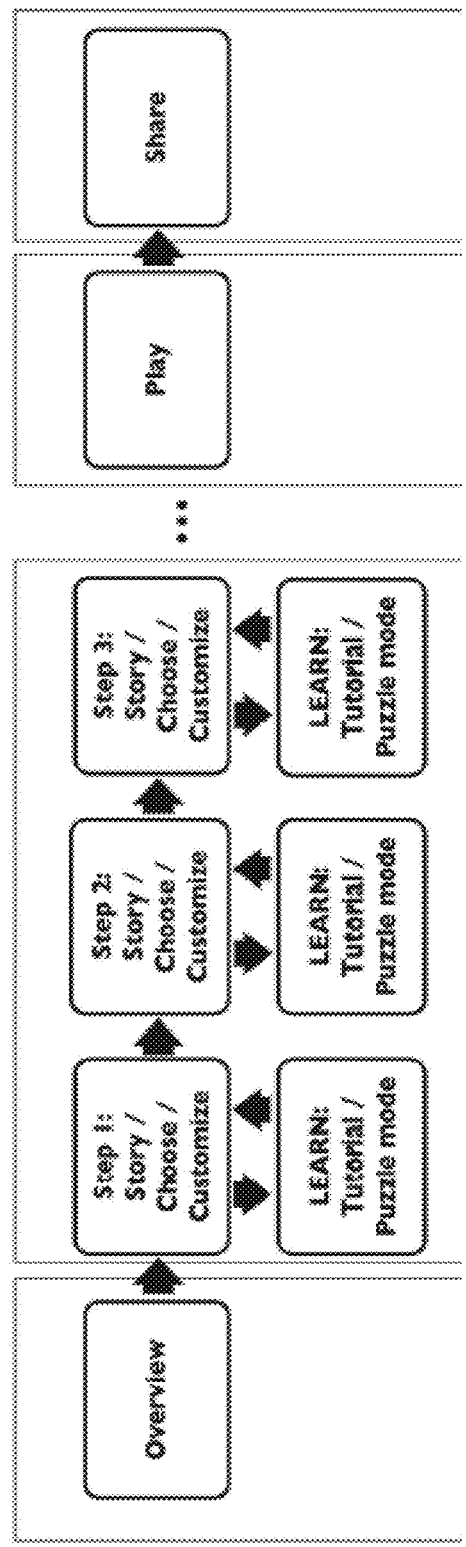
Figure 27B:
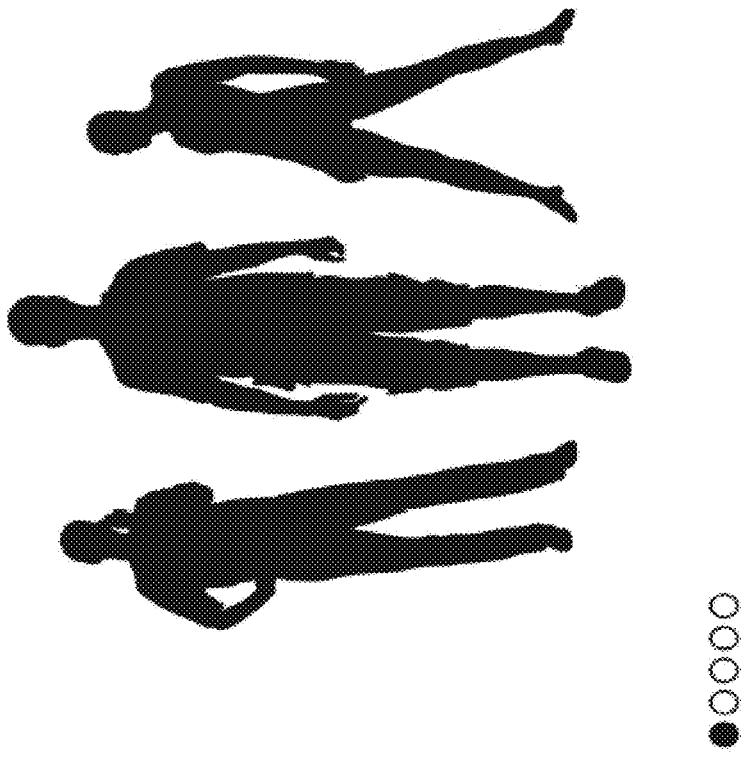
Figure 27C:
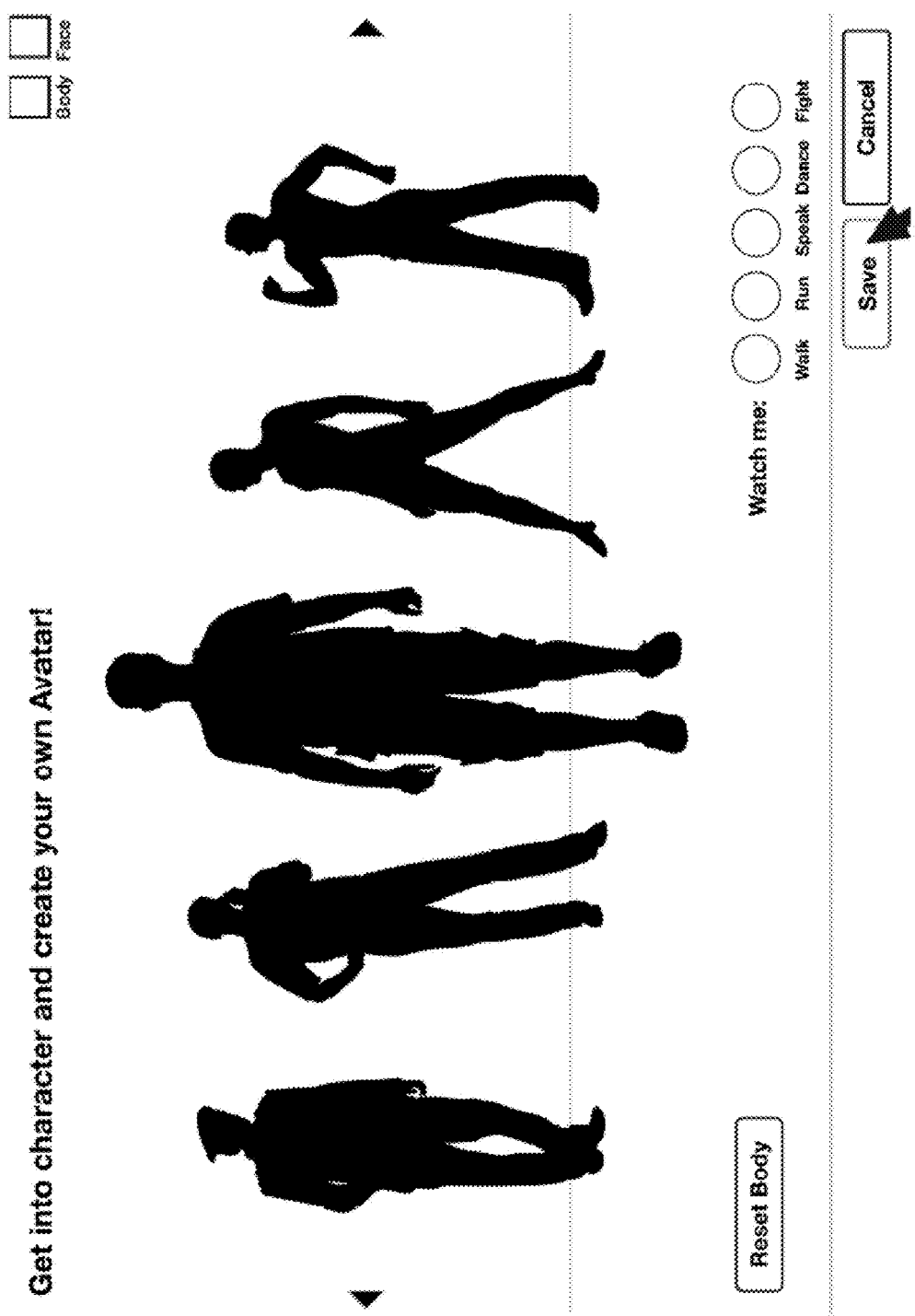
Figure 27D:
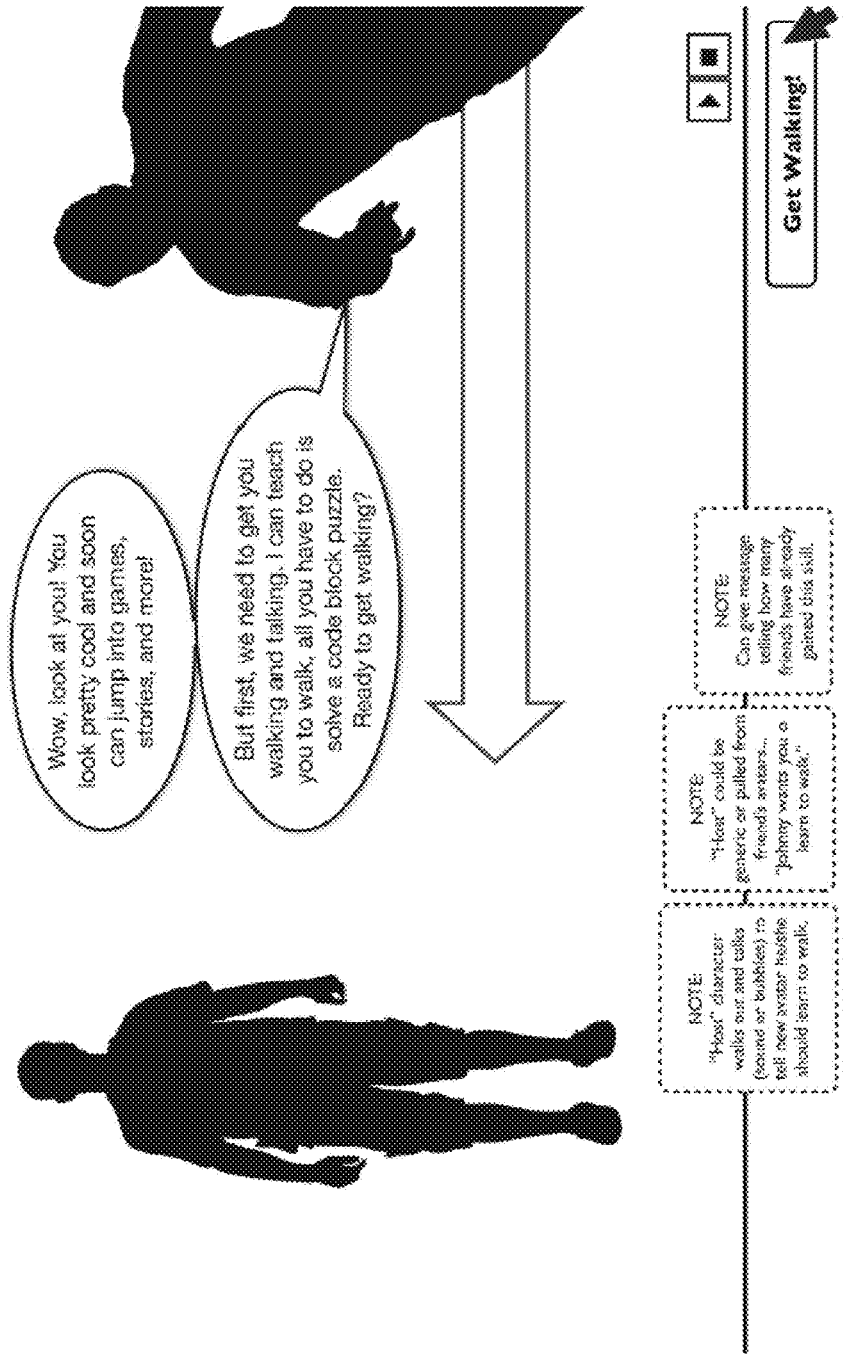

FIGS. 27A-27F illustrate another example of providing a customized lesson plan based on an identified goal for the student. FIG. 27A is a flow diagram showing an exemplary process for providing a customized lesson plan. In this example, a student is given a description of an activity that sets the context for the lesson and gives highlights of core actions to be taken (Overview). FIG. 27B is an exemplary screenshot of an Overview for creating a character (i.e., an "avatar") that the student controls by creating one or more software applications. Referring again to FIG. 27A, the student may be provided with one or more lessons. As depicted, the student is presented with three lessons that each provide the student with an opportunity to choose and customize aspects of the student's avatar (e.g., the avatar's "story"), as well as to access tutorials and puzzles to reinforce the learning of various programming concepts used in customizing the avatar. While three lessons are shown in FIG. 27A, embodiments of the present disclosure may provide more, or fewer, lessons to a student as appropriate. FIG. 27C depicts an exemplary screenshot presented as part of one of the "Choose/Customize" blocks in FIG. 27A, while FIG. 27D is an exemplary screenshot presented as part of one of the "Tutorial/Puzzle mode" blocks in FIG. 27A.

Figure 27E:
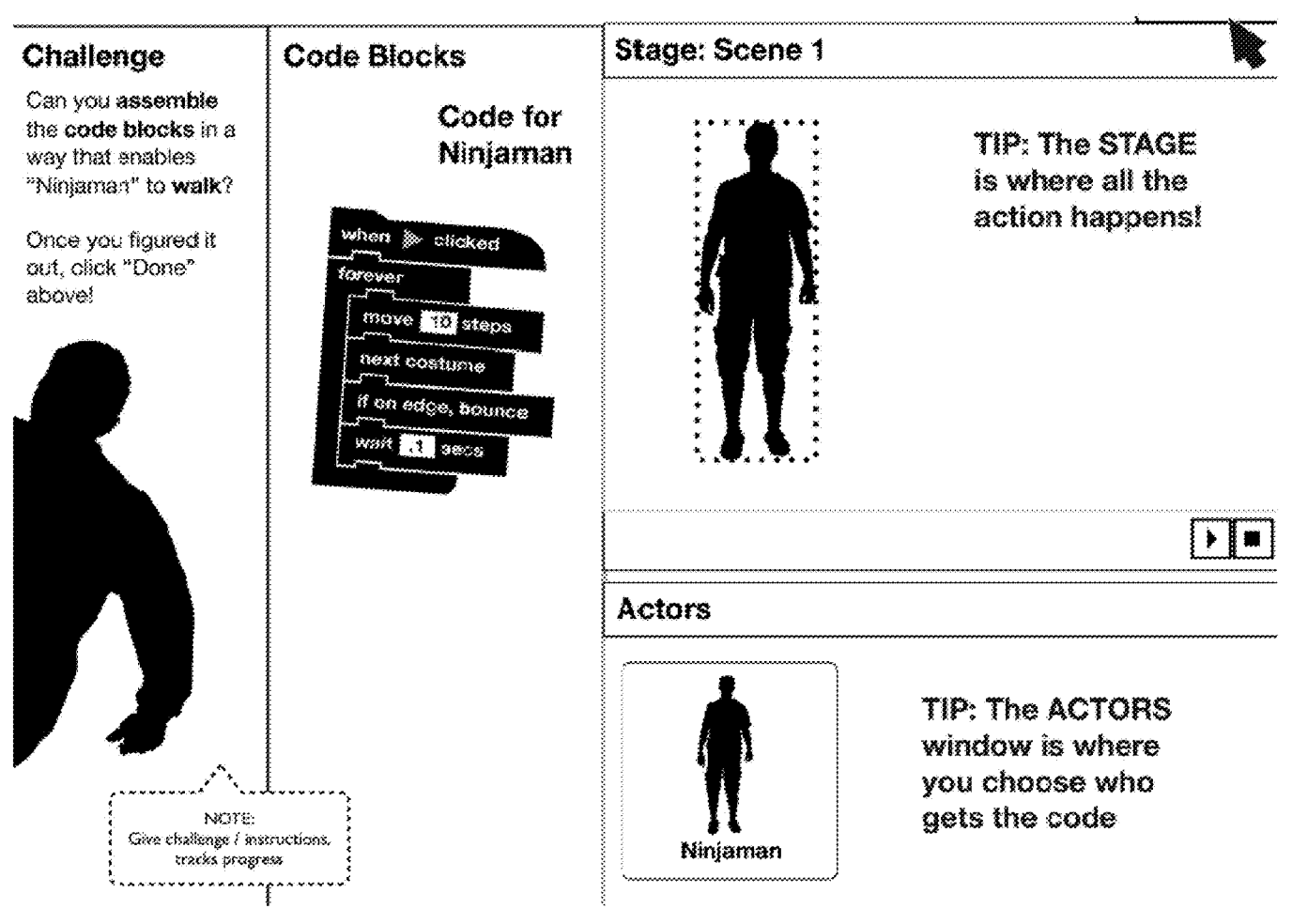
Figure 27F:
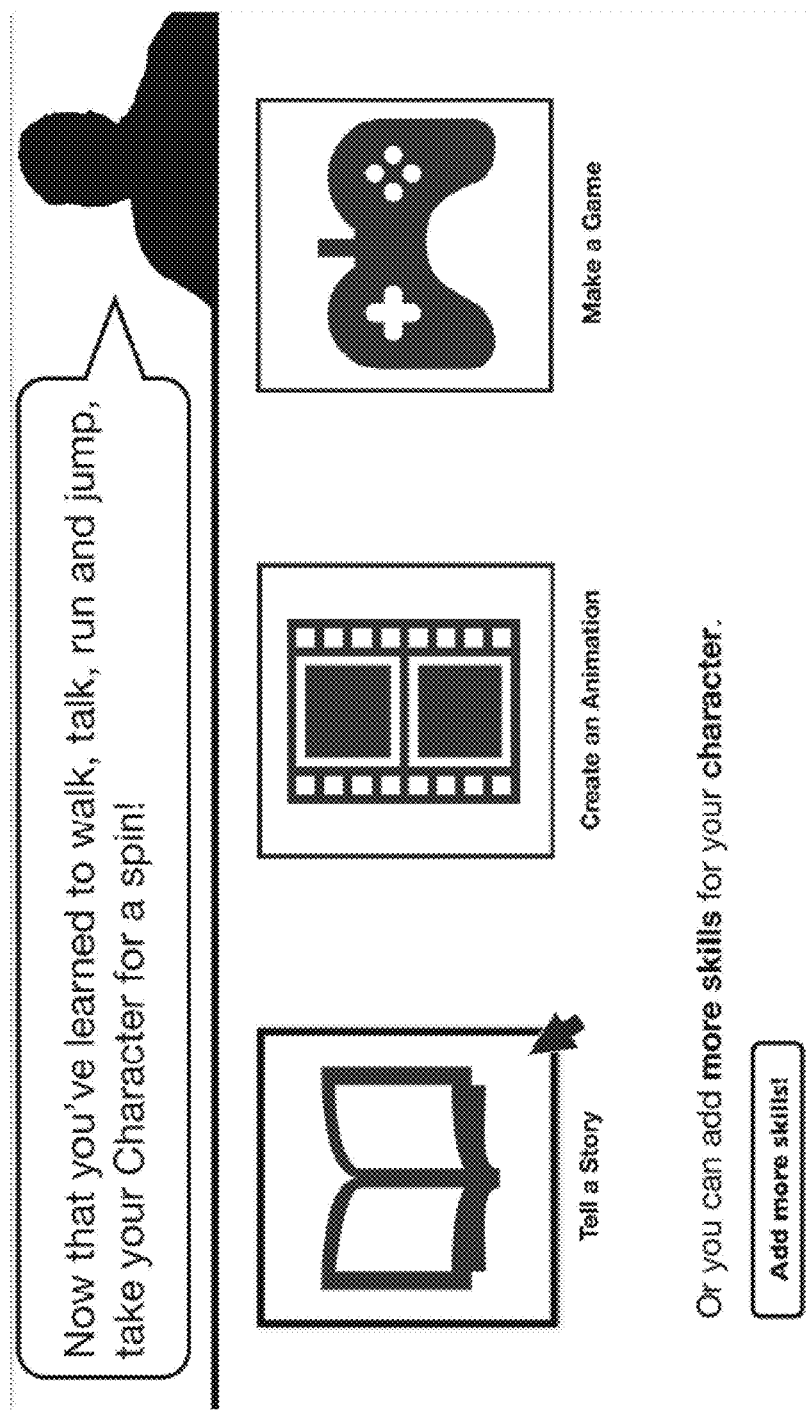

FIG. 27E illustrates a student being given puzzle (as part of the "Tutorial/Puzzle mode" block in FIG. 27A). In this example, the puzzle involves providing the student with an objective of programming a character ("Ninjaman") to walk (shown in the "Challenge" section), programming the character (shown in the "Code Blocks" section), and being given tips and tutorials (shown in the "Stage: Scene 1" and "Actors" sections). FIG. 27F depicts an exemplary screenshot allowing a student to select additional projects and goals for his or her avatar, such as using the avatar to "Tell a Story," "Create an Animation," or "Make a Game."

In various embodiments of the present disclosure, a student may be allowed to skip a first learning module to complete a second learning module dependent on the first learning module. If the student is successful in completing some or all of the second learning module, the first learning module may be marked as successfully completed. Additional learning modules (such as quizzes or tests) may be provided to the student upon successful completion of the second learning module before the first learning module is marked as successfully completed. Successful completion of a learning module. In this manner, advanced students can skip ahead to learn concepts that are more challenging, while still ensuring that the student has an acceptable level of knowledge of all concepts taught in a course of learning modules.

In exemplary method 2350, information regarding a student is received (2365) in order to tailor lesson modules to that student. Such information may be obtained from any desired source, such as from the student or an individual supervising the student, such as a teacher or parent. Information regarding a student may also be retrieved from a database, determined based on a student's past assignments, tests, and/or history in completing other learning modules. In some embodiments, for example, information regarding a student may include the student's age, grade level, and information on the student's performance with regards to other learning modules. The student's performance may be provided in view of one or more other students, such as students having the same (or similar) age, grade level, or demographics as the student. Information on a student's performance may be received in real-time or near-real-time as a student progresses through a group of lesson modules, thereby allowing embodiments of the present disclosure to continuously adapt the content and/or difficulty of the lesson modules (likewise in real-time or near-real-time) based on the student's current ability and/or progress.

Information regarding a student may include information regarding a student's interests. A student's personal interests may be age-related, gender-related, and/or based on any other desired criteria. Such information may be used to personalize lesson modules based on each student's interests, thereby presenting information to students in a manner that is entertaining and interesting to each individual student. For example, the personal interests for a second-grade boy may include "dinosaurs," while the personal interests for a second-grade girl may include "unicorns." A lesson module to teach a concept (such as animation) may thus be customized to involve the animation of dinosaurs for the boy, and the animation of unicorns for the girl.

A lesson module may be modified (2365) based on a student's information to customize the learning module to that student. The lesson module can be modified in any desired manner according to any desired criteria. For example, a student's performance history in completing previous lesson modules can be analyzed to identify a concept, skill, or technique that the student is adept in, and modify a lesson module to remove content that the student has already demonstrated mastery of. Likewise, a student's performance history may be analyzed to identify a concept, skill, or technique for which that the student has demonstrated a lack of proficiency or understanding. Supplemental content may then be added to a learning module to help the student achieve a better level of proficiency or understanding in the concept, skill, or technique.

A lesson module may be modified by adding a parameter to the lesson module, removing a parameter from the lesson module, and/or modifying a parameter in the lesson module. Likewise, a lesson module may be modified by adding a plug-in to the lesson module, removing a plug-in from the lesson module, and/or modifying a plug-in in the lesson module.

Lesson modules may also be modified and delivered to students in conjunction with any desired mode or format. FIGS. 25A-25G, for example, are block diagrams illustrating exemplary modes that may be utilized in different circumstances to deliver various lesson modules.

Figure 25A:
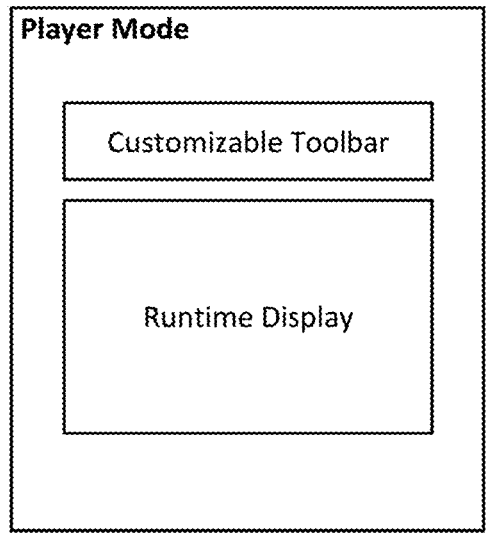
FIGS. 25A-25G depict different exemplary presentation modes for providing lessons to a student.
Figure 25B:
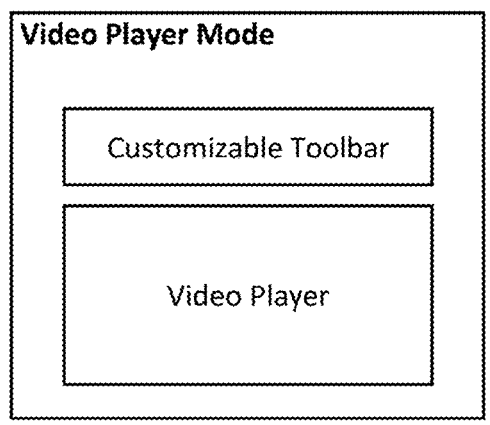

FIG. 25A depicts an exemplary "player mode" format that can be used to, for example: present an introduction to concepts being taught in a lesson, run a software application to demonstrate a fully working project that the student can examine to see how it works, and to provide a summary of material taught in a lesson. FIG. 25B depicts a "video player mode" that can be used for, among other things, showing an instructional video during a lesson.

Figure 25C:
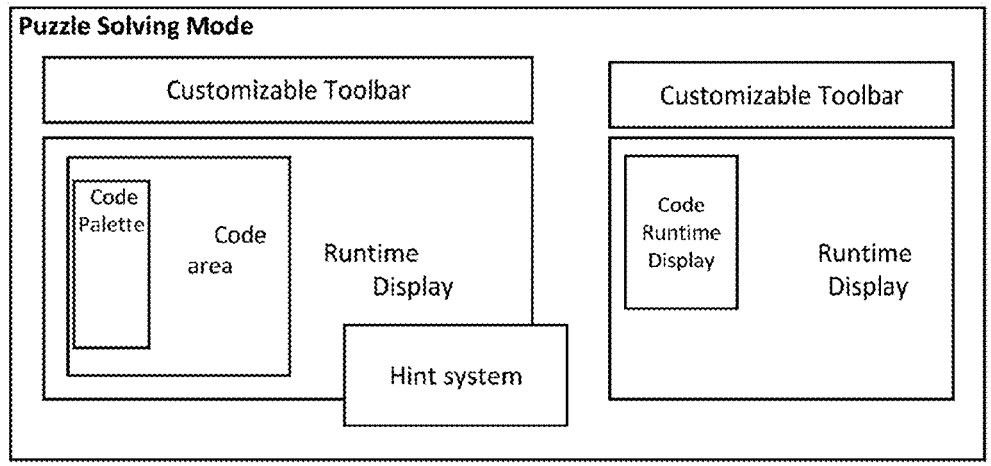

FIG. 25C illustrates a "puzzle-solving mode" where various puzzles (such as programming puzzles) can be delivered to the student. In this example, two sub-modes are depicted, a "puzzle solver" mode (on the left) and a "puzzle runner" mode (on the right). In the "puzzle solver" mode, users may select code blocks from the code palette into the code area and arrange them to create a software application, such as an application that programs a character to solve a problem presented. In the "puzzle runner" mode, the code of the application created by the student executes and, if the user correctly implemented the application, the puzzle is solved. For instructional purposes, the code runtime display may show a step-by-step execution of the specific visual coding block that is being executed by the runtime. One example of a puzzle a student may be asked to program a solution to might be: "program your spaceman character to avoid the aliens in his path and get the power cell" (see FIG. 25H).

Figure 25D:
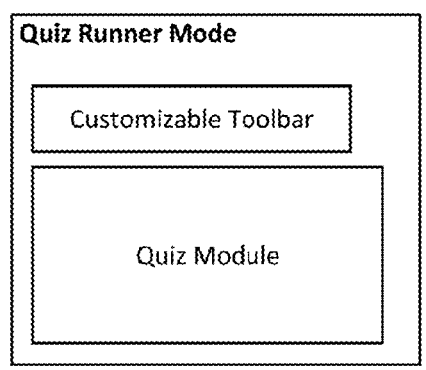
Figure 25E:
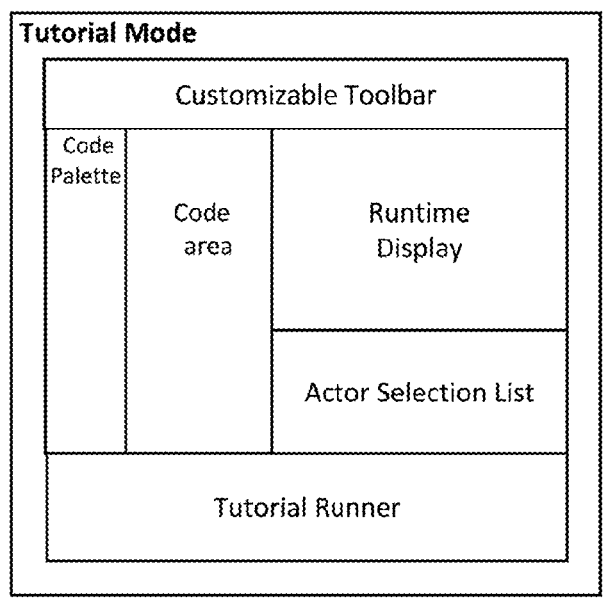
Figure 25F:
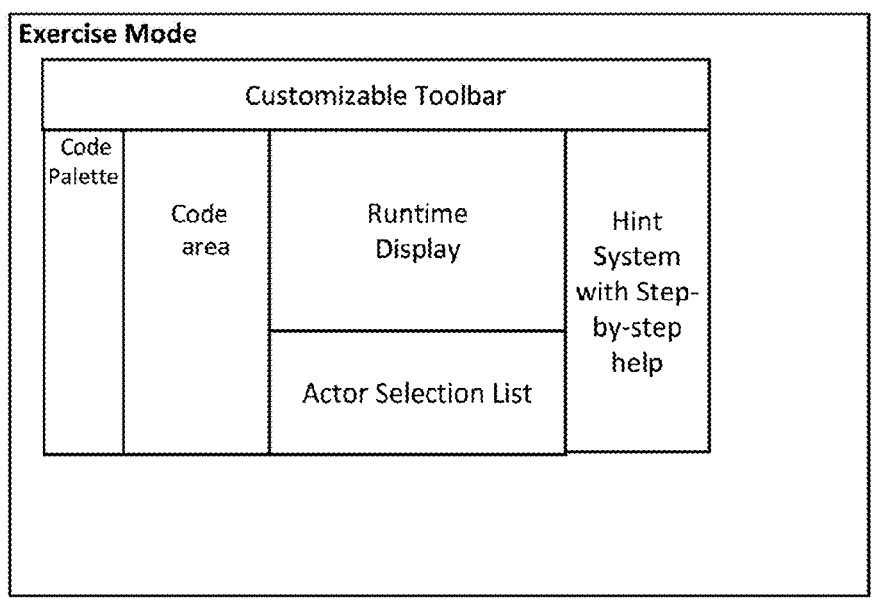

FIG. 25D depicts a "quiz runner mode" that can be used to deliver a set of quiz questions in a quiz learning module. FIG. 25E illustrates a "tutorial mode" that can be used to deliver a tutorial to a student, such as showing a student how to create a software application step-by-step from the beginning. FIG. 25F depicts an "exercise mode" whereby students can be presented with hints during a learning exercise (such as writing a software application).

Figure 25G:
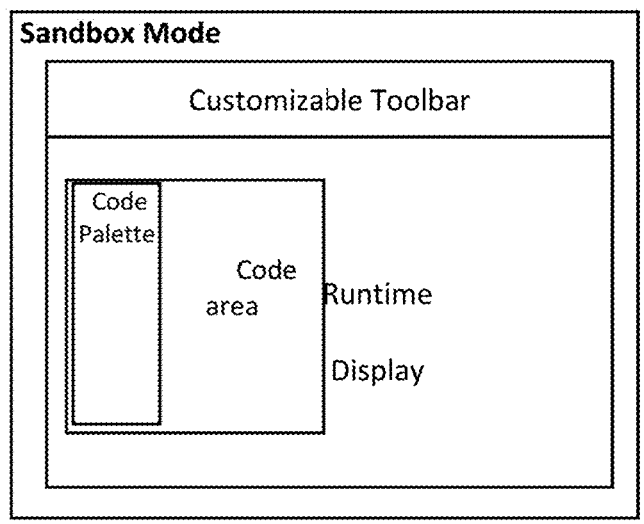

FIG. 25G illustrates a "sandbox mode" that comprises a plurality of visual code blocks related to a computer programming concept that the student can manipulate. Among other things, the sandbox mode can be used gradually introduce students to sets of code blocks without overwhelming them with all code blocks being available all at once. Lessons and lesson modules may be presented using any other desired format and/or mode of presentation.

Figure 25H:
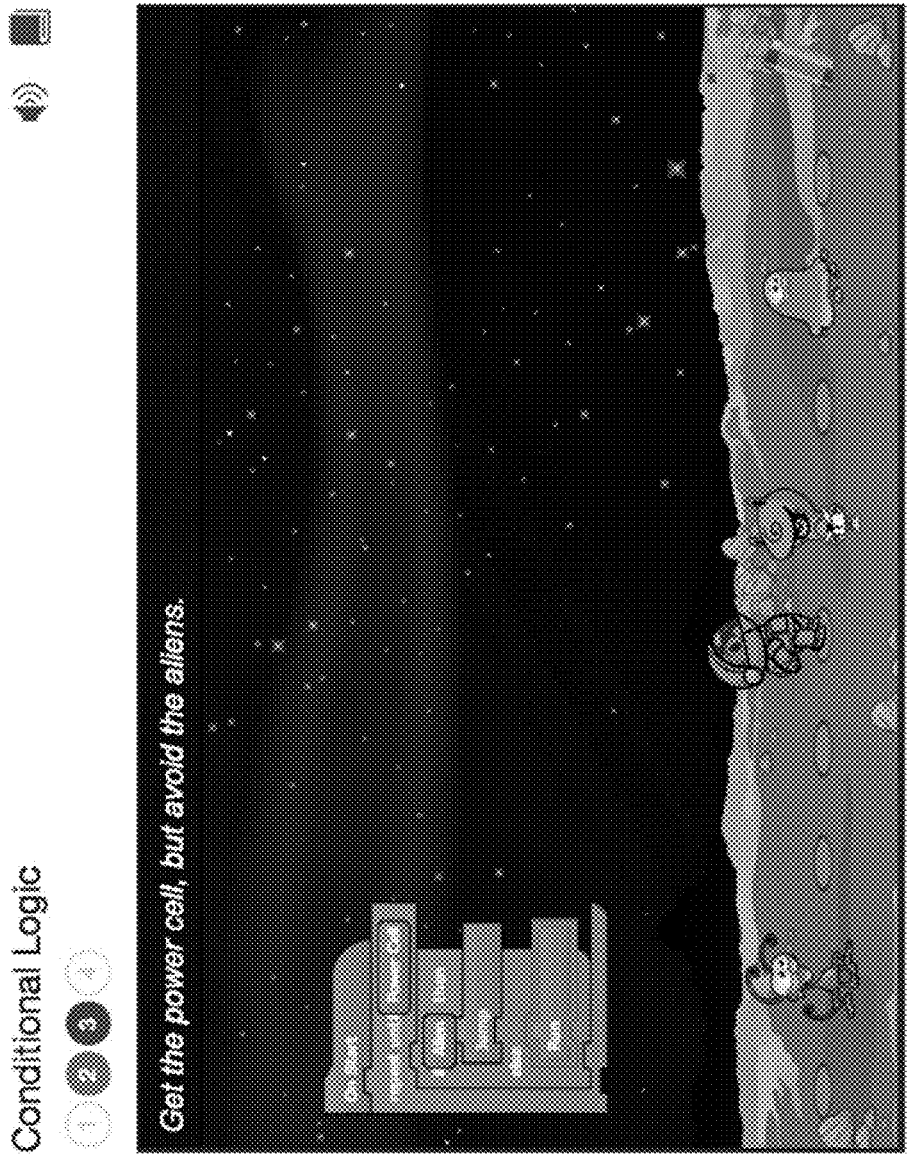
FIGS. 25H-25L are exemplary screens that may be presented in conjunction with the modes shown in FIGS. 25A-25G.
Figure 25I:
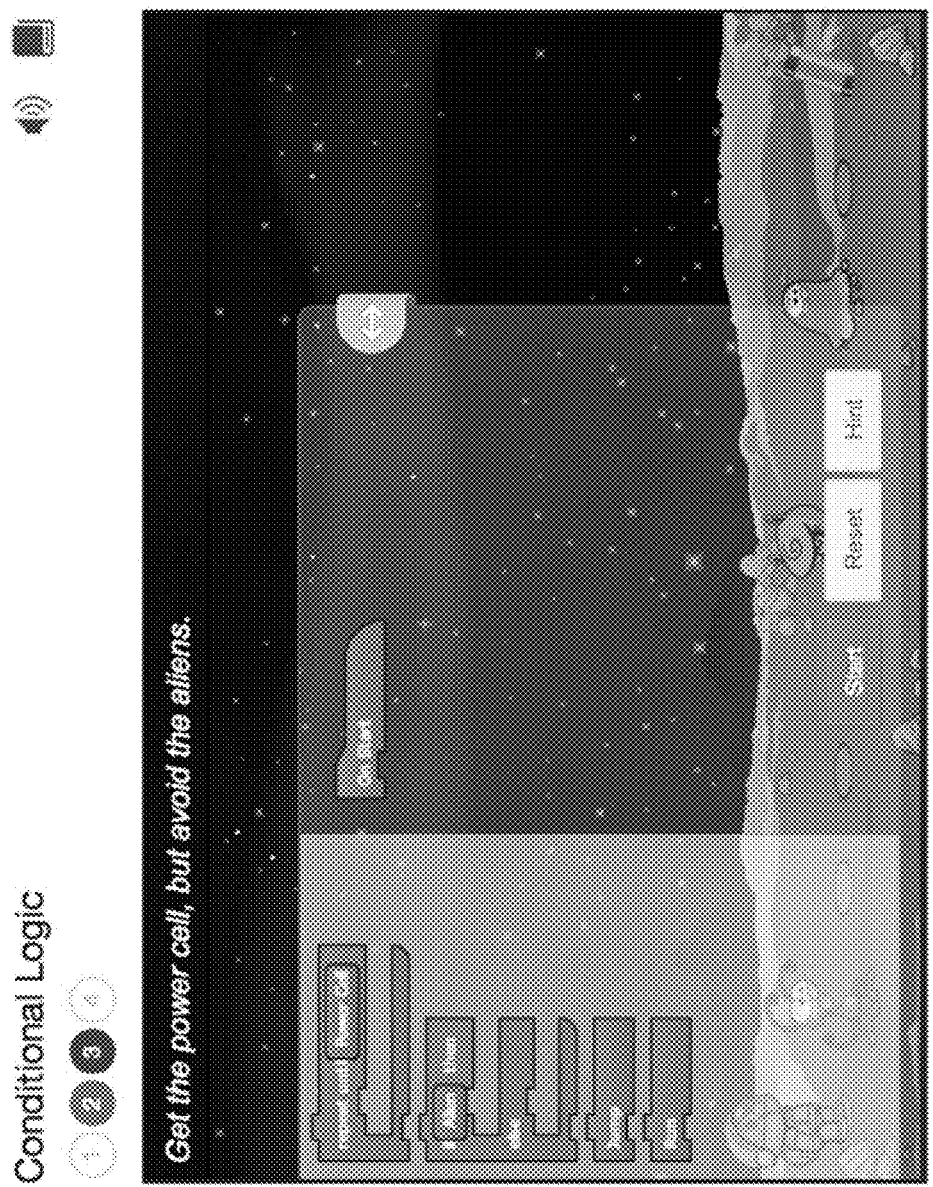
Figure 25J:
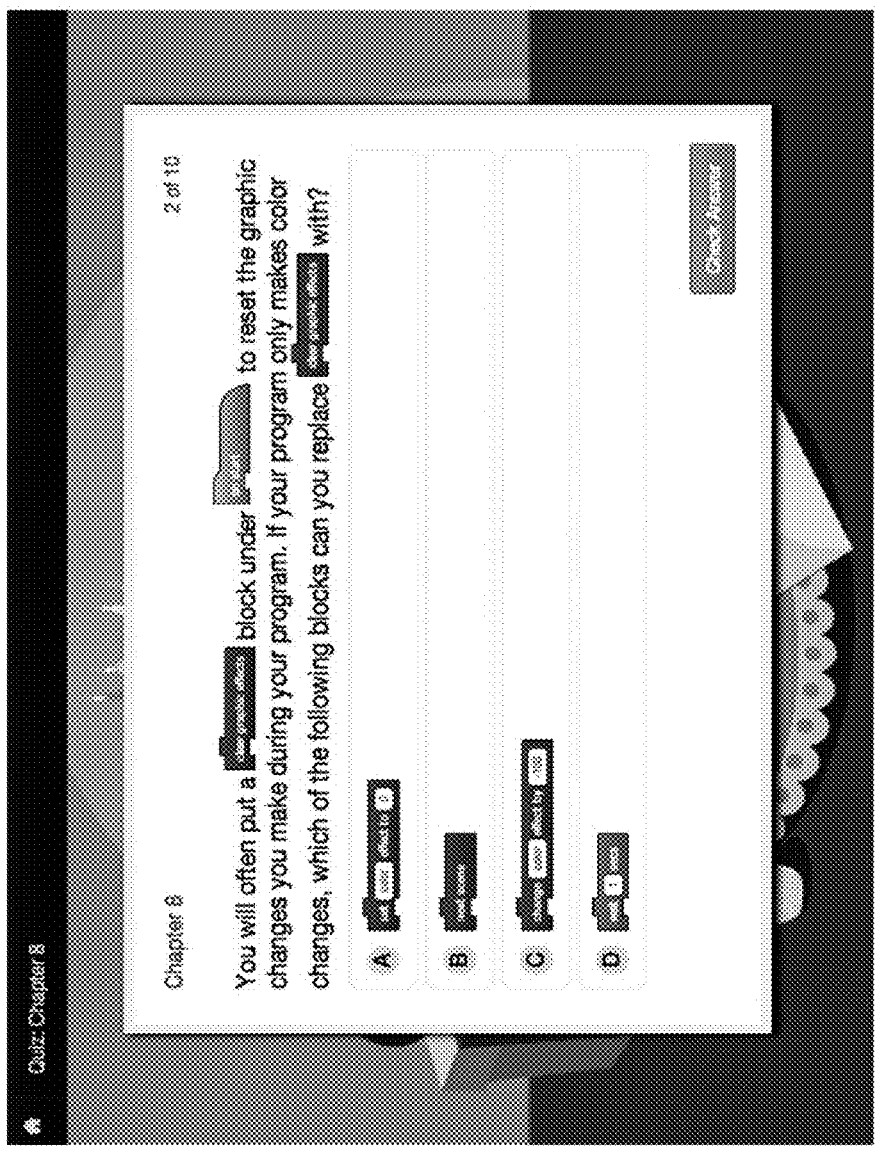
Figure 25K:
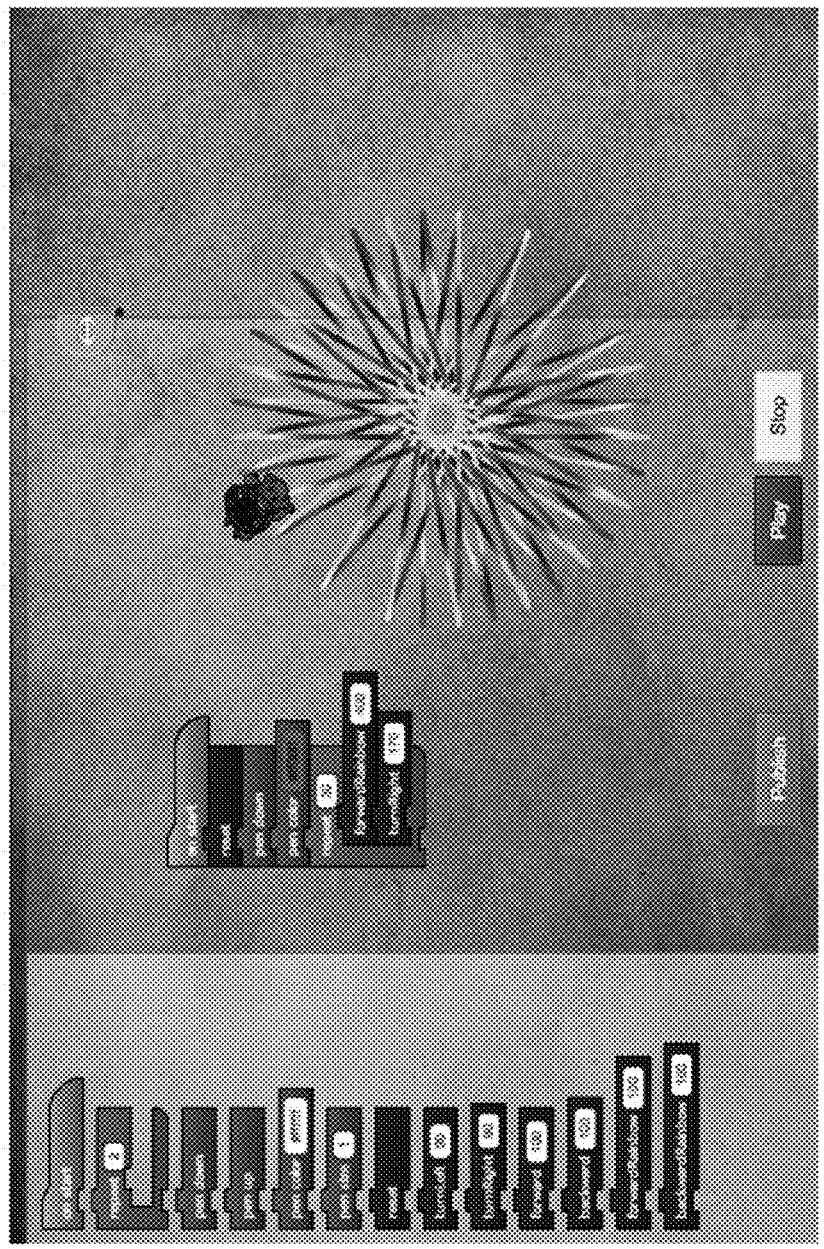
Figure 25L:
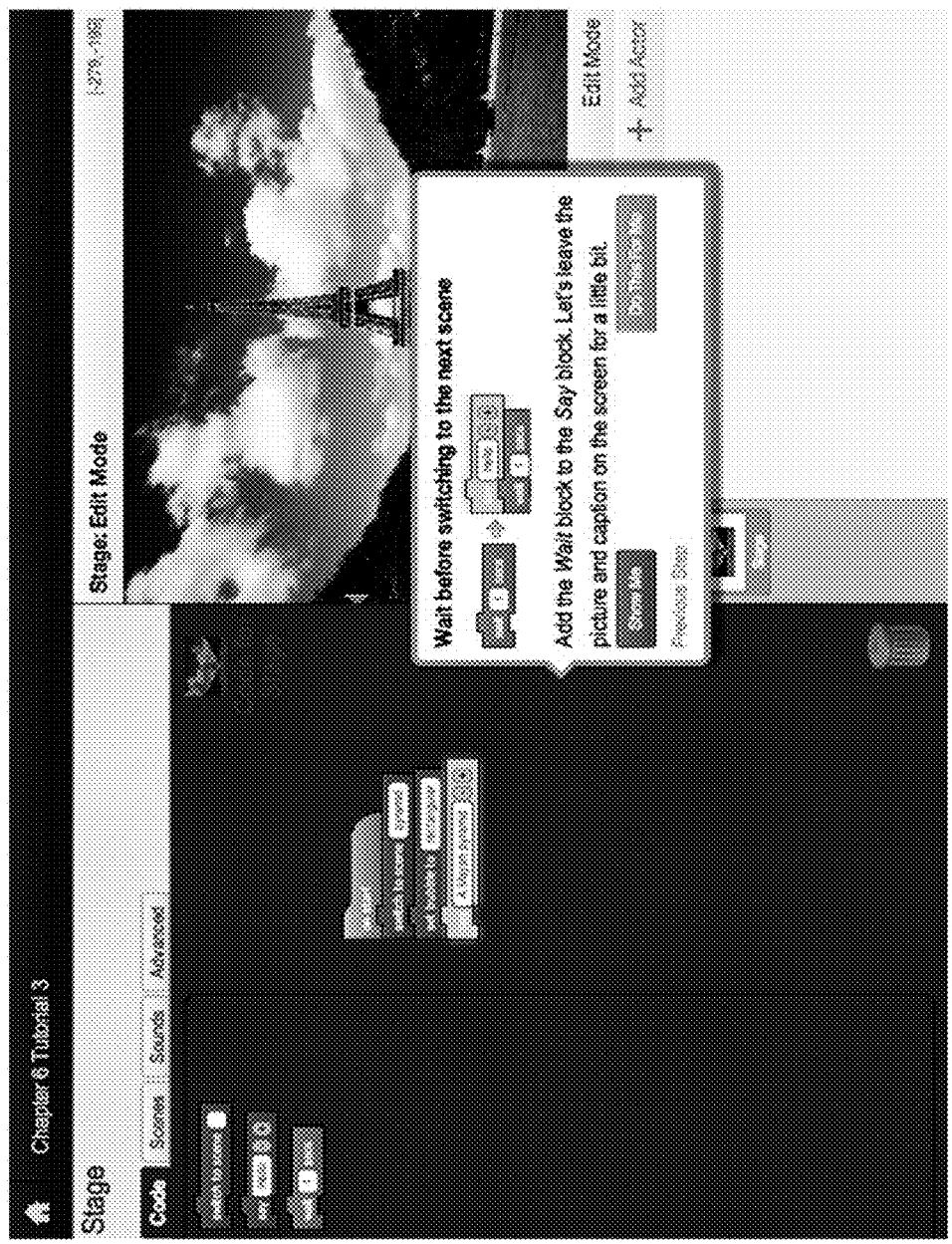

FIGS. 25H-25L illustrate exemplary screenshots that may be used in conjunction with the different modes described in FIGS. 25A-25G. FIG. 25H, for example, depicts an introductory screen that may be presented as part of the "puzzle runner" mode from FIG. 25C, while FIG. 25I depicts a screen that may be presented as part of the "puzzle solver" mode shown in FIG. 25C. FIG. 25J depicts an exemplary quiz module that may be shown in conjunction with the "quiz runner mode" from FIG. 25D. FIG. 25K depicts a screen that may be presented in conjunction with the "sandbox mode" from FIG. 25G. FIG. 25L depicts a screen that may be presented in conjunction with the "tutorial mode" from FIG. 25E.

A lesson module may be modified by generating an activity for the student to perform in accordance with the lesson module. For example, where a lesson module relates to teaching a computer programming concept, such as animation, the lesson module may be modified to generate a coding puzzle, a debugging puzzle, and/or a quiz that helps teach (and/or tests the student's knowledge of) the concept of animation.

In exemplary method 2350, the lesson module is provided to a student (2370) and the student's progress in completing the lesson module is monitored (2375). The student's progress may be monitored in any desired manner, including determining how much of a lesson module the student has completed, grading the student's performance on one or more portions of the lesson module, comparing the student's progress and/or aptitude in completing the lesson module to that of other students, and others.

In some exemplary embodiments, monitoring the student's progress includes determining whether the student is successful in completing a lesson module. Determining whether a student is successful in completing a lesson module may be based on any desired criteria, and such criteria may vary from student to student. For example, a student may be determined to be successful in completing a lesson module where: the student completes at least a portion of the lesson module within a predetermined period of time, the student answers at least a predetermined number of questions in the lesson plan correctly, and/or the student performs the lesson module at least as well as one or more other students. Determining whether a student is successful in completing a lesson module may be based on any other desired criteria, such as whether they complete all the exercises in a module, whether the student availed himself/herself of hints to complete a lesson module, and/or whether they applied concepts learned in other projects or lessons. In one exemplary embodiment, for a lesson module that included one or more puzzles, a student's success or failure in completing the puzzle(s) may be evaluated based on whether the student solved some or all of the puzzles optimally or sub-optimally (e.g., the solution was correct, but the number of lines of code was more than the minimum blocks required to solve the problem).

Based on how each student fares in the lesson (e.g., based on the above criteria), a personalized lesson plan may be created with suitable lessons provided to the student until the student achieves his/her goal. In response to determining that the student is successful in completing a lesson plan the student may be provided with a second lesson module that includes one or more concepts that are dependent on one or more concepts in the completed lesson module.

A student need not be entirely successful in completing a lesson module to advance to a subsequent lesson module, or for the completed lesson module to be considered "successfully" completed. For example, where a student is determined to be partially successful in completing a lesson module, the student may still be provided with a second lesson module that includes concepts dependent on concepts in the completed lesson module. As with measures of "success," measures of "partial success" may be determined according to any desired criteria, and may vary from student to student. In one exemplary embodiment, a lesson module may contain multiple concepts. A student may successfully complete (or demonstrate sufficient understanding of) all but one concept in the lesson module. In such cases, the student's performance may be considered good enough to proceed to more advanced lesson modules. Alternatively, embodiments of the present disclosure may identify the concept(s) the student failed to demonstrate sufficient understanding of, and provide the student with a supplemental lesson module that reinforces the concept(s) the student failed to demonstrate an understanding of. In this manner, embodiments of the present disclosure can dynamically provide additional support and instruction for students in areas they need the most help in understanding.

A student may be determined to be unsuccessful in completing a lesson module based on any desired criteria, such as by completing at least a portion of the lesson module beyond a predetermined period of time, answering at least a predetermined number of questions in the lesson plan incorrectly, and/or underperforming the lesson module compared to one or more other students. For example, for a lesson module directed to teaching a computer programming using visual code blocks, a student who uses more code blocks to complete an exercise than other students in his or her class may be deemed to have failed to successfully complete the lesson module based on the relative inefficiency of the student's solution, even when the student's solution works. In this manner, a student's performance may be graded on more that a simple pass/fail on whether the student provides a working solution to a problem, thereby helping to teach the student concepts such as programming efficiency.

In cases where the student is determined to be unsuccessful, the student may be required to repeat the failed lesson module, given another lesson module based on the student's personal interests, or given a second lesson module that reinforces all of the concepts taught in the failed lesson module, thereby giving the student a different perspective on the same concepts. In one exemplary embodiment, a student may be given a second lesson module that is personalized (as described above) based on the student's personal interests. In this manner, lesson modules may be customized for each student to help hold the student's attention and to teach subject matter using themes the student finds interesting. In another exemplary embodiment, a student may be provided with a lesson module that was previously completed by one or more other students. The one or more students may be similar to the unsuccessful student in one more ways, such as having the same or similar demographics, being in the same grade, or exhibiting the same or similar performance in completing lesson modules.

Embodiments of the present disclosure may report (2380) students' progress to a teacher, parent, or other user supervising a student. The student's progress may be monitored and reported at any point while the student works to complete the lesson module. For example, a teacher, parent, or other user supervising the student may view a student's progress in completing a lesson module in real-time. In one example, a group of students may be running software on a group of networked computers implementing embodiments of the present disclosure and are given a project to complete that includes writing a computer program using visual code blocks. As the students work on the project, a teacher may view each student's progress (including identifying which and how many code blocks each student is using) in real-time via the teacher's computer system networked to the computer systems of the students. In this manner, the teacher can quickly, efficiently, and immediately identify those students that are struggling with the task, identify those students for whom the task is "too easy," and/or identify concepts that the group of students as a whole may benefit from further instruction.

Integrated Developer Environment for Visual and Text Coding

As described above, embodiments of the present disclosure provide, among other things, a user-friendly integrated development environment (IDE) in which to manipulate visual coding blocks as shown, for example, in FIGS. 3, 6, and 12-14. Additionally, embodiments of the present disclosure may provide an IDE that allows users to develop software applications using both visual blocks and text coding, and to seamlessly transition between visual and text coding as desired. This not only provides a powerful tool for sophisticated software developers to quickly develop and debug applications, but also helps newer programmers learn the principles of software development by allowing them to easily transition between the underlying text code associated with visual blocks and vice versa.

Figure 28:
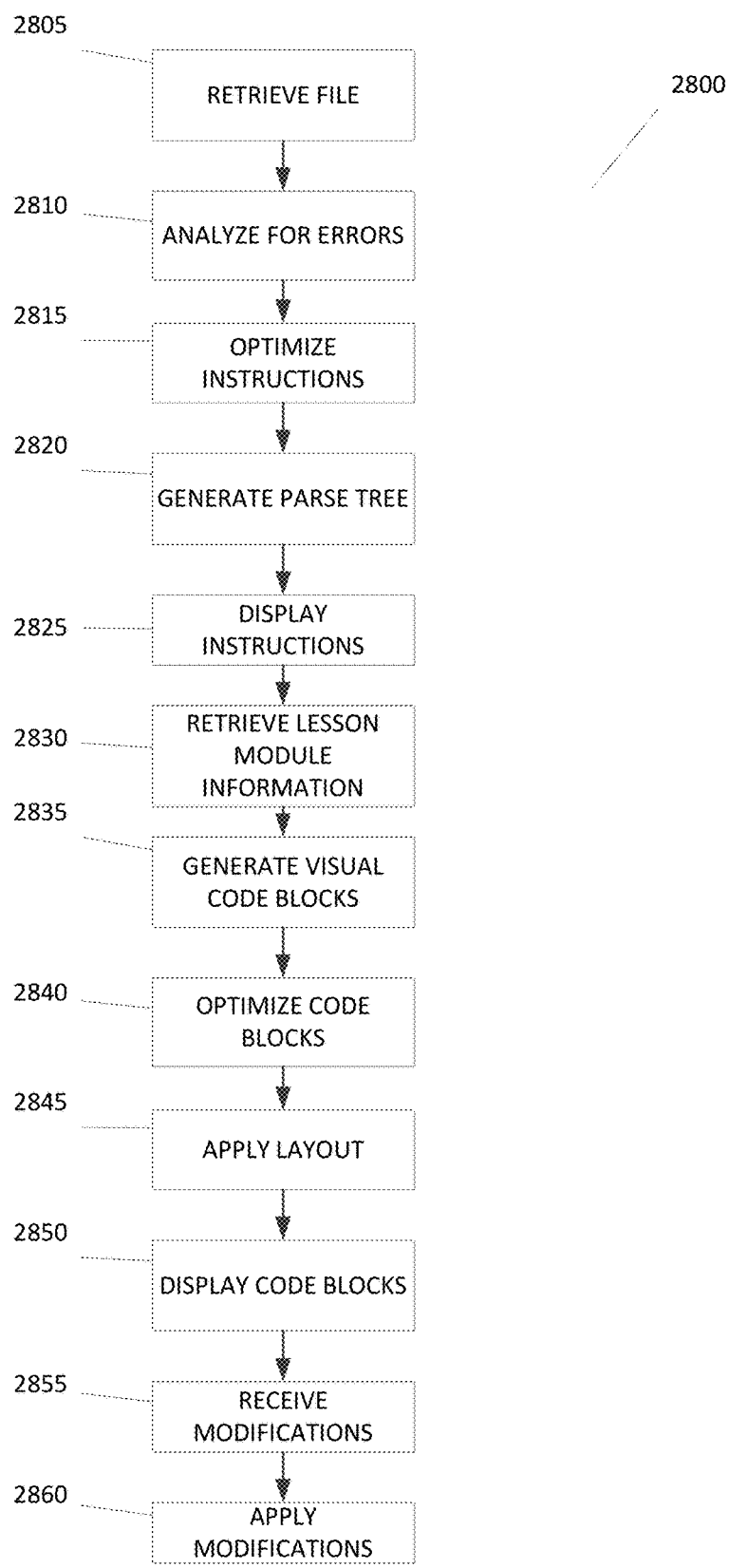
FIG. 28 is a flow diagram of an exemplary process in accordance with various aspects of the present disclosure.

FIG. 28 is a flow diagram of an exemplary process according to various aspects of the present disclosure. The steps and features of method 2800 (in whole or in part) may be practiced in conjunction with any of the other methods described herein, as well as with any combination of user interface screens and hardware components. The functionality of method 2800 may be performed by software operating on, or in conjunction with, a variety of different hardware components, such as Learning Center Server 12 shown in FIG. 1. In FIG. 28, exemplary method 2800 includes retrieving a file containing software instructions (2805), analyzing the software instructions for errors (2810), optimizing the instructions (2815), generating a parse tree containing the instructions (2820), displaying the software instructions in an IDE (2825), retrieving information on one or more lesson modules from the file (2830), generating one or more visual code blocks (2835), optimizing the visual code blocks (2840), applying a layout scheme to the code blocks (2845), displaying the code blocks (2850), receive modifications to the software instructions and/or visual code blocks (2855), and apply the modifications (2860).

Embodiments of the disclosure can retrieve files containing software instructions from a variety of different sources. For example, referring to FIGS. 1 and 2, a file containing software instructions may be retrieved from Learning Center Clients 13,14, from a data store in communication with (or part of) the Learning Center Server 12, or from another component in communication with the Learning Center Server 12 via the Internet 11 or other network. In cases where a student creates a new project, software instructions may be received from a user via a user interface and stored in a new or existing file.

Files containing software instructions may be in any format. For example, in some embodiments a file may contain source code in a text format written in a programming language such as C, C++, C#, JAVA, assembly, etc. Alternatively, binary files containing compiled code may be retrieved, in which case embodiments of the disclosure can perform a decompilation process to convert the binary instructions into software instructions in a particular programming language for display via the IDE as described below. Additionally, multiple files containing software instructions may be retrieved by embodiments of this disclosure.

The software instructions may be analyzed for different types of errors (2810). In one exemplary embodiment, text characters in a file are processed by a lexical analyzer generator for subsequent processing by a grammar parser. Character sequences from the file can be broken up into various tokens to identify software instructions and syntactical errors therein. For example, the character sequence "this.varname=23;" can be broken up into the tokens "this", "dot", "varname", "equals", "23", and ";". The lexical analyzer may identify various syntax errors, which may be flagged for review and/or automatically corrected by the analyzer. For example, syntactical errors such as invalid identifiers or characters in expressions such as "landonly=23;" are flagged.

Syntactical errors, such as an invalid symbol, may be automatically corrected by, for example, converting the invalid symbol into a valid symbol. For example, where an invalid symbol or a reserved keyword in the target visual language is detected, a symbol table can be used to map the invalid symbol to a system generated valid symbol. This mapping can then be looked up to find the new symbol name when it gets used.

Software instructions from the file (e.g., identified from the output of a lexical analyzer) can further be analyzed for semantic errors (e.g., logical errors). In one example, the software instructions in a file are parsed (by a parser such as YACC or BISON) to generate a parse tree (2820) that describes various expressions and constructs of a programming language, along with links to other child nodes. For example, an expression like "varname=23;" can generate a tree with a root node of "ASSIGN" and the left child as "IDENTIFIER (varname)" and the right child as "NUMERIC_CONSTANT (23)."

The parse tree can be analyzed to identify semantic errors by first identifying and flagging token sequences that do not have rules in the parser, and those errors flagged for reporting to the end user and/or for automatic correction by the Learning Center Server 12 or other component implementing the functionality of various embodiments. Additionally, the parse tree nodes may be analyzed by traversing the tree using a breadth first iterator pattern, starting at the root node.

This additional analysis can identify errors such as the use of an identifier that doesn't exist, or assigning a value to a variable that doesn't accept the variable type.

The software instructions may be optimized (2815) in various ways. For example, in embodiments where a parse tree is used as described above, the parser can help identify conditions such dead code (e.g., code that is never executed or that is executed but otherwise irrelevant or nonfunctional to the program) and expression collapsing (e.g., converting a mathematical operation into a constant). Inoperable instructions may be eliminated, one or more instructions may be replaced with one or more equivalent (or more efficient) instructions, and function calls in the software instructions can be replaced with alternate function calls. For example, a function call in the software instructions could be replaced with a function call to a previously-defined visual code block, such as a call to one of the code blocks in window 97 in FIG. 3.

Function calls that are found in a mapping table can also be translated into calls to equivalent blocks with parameter matching. For example, in embodiments where a parse tree is used, nodes in the parse tree that correspond to a function call cause the system to determine if there is a corresponding call in the target visual language. Otherwise, the function call may be treated like a function call to a user function. Unmapped function calls (calls that don't exist in both the mapping table and the user's functions) may be treated as no-operations or the system can defer to a system call.

Additionally, various embodiments can collapse various patterns of software instructions into visual code blocks. For example, a javascript expression like: "my_array.length=0" could be converted into "delete <all> of <my_array>," which is associated with a particular visual code block. Patterns of software instructions may be so replaced using a lookup table or other construct.

Optimization of the software instructions may be performed according to one or more user-defined rules (e.g., that the user provides via a user interface of a system operating in conjunction with method 2800). For example, the user may specify that mathematical expressions, like "25*2+3" should be collapsed into a single constant like "53". In a learning system, optimizations such as this are not always desirable, therefore embodiments of the disclosure can be configured to allow the user to selectively enable or disable optimizations (e.g., to keep expressions intact when converting to visual blocks). Similarly, empty statements (like "if" statements with no body) can be optimized out according to the user's input.

Figure 29:
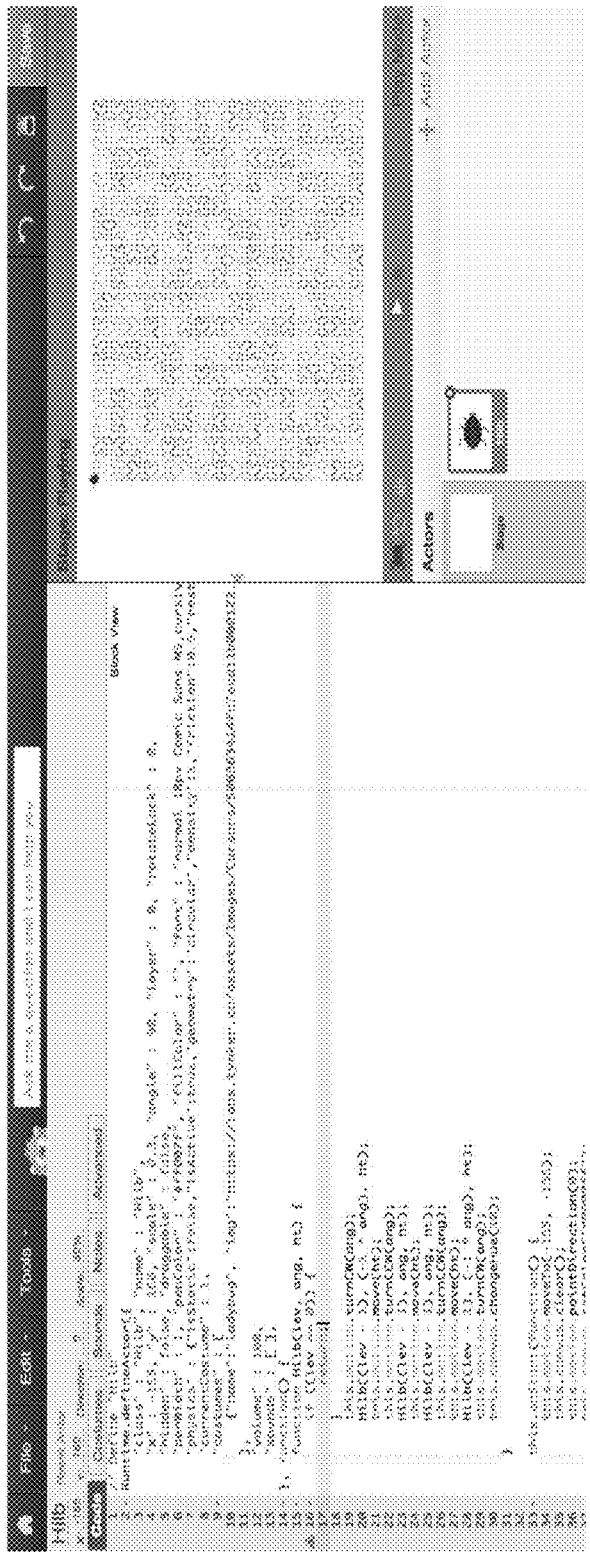
FIGS. 29-35 are screen shots depicting features of an integrated development environment (IDE) according to various aspects of the present disclosure.

The software instructions can be displayed (2825) in an IDE displayed on the display screen of a user's computing device. FIG. 29 illustrates an example of software instructions displayed for a program that maneuvers a bug through a maze. The instructions are displayed on the left side of the screen, while the icon for the bug is shown in the lower-right side of the screen, and the progress of the bug through the maze is shown on the upper-right side of the screen. By clicking the "block view" icon in the middle of the screen, the user can toggle between this view of the software instructions and a view of the visual blocks associated with the individual instructions (See FIG. 30, described below). Additionally, the user can step through each individual instruction (shown by the highlighting currently at line 17) to watch the operation of the program.

The display of the software instructions in the IDE may include the addition, removal, and/or modification of formatting, special characters, colors, fonts, shading, and the like with respect to the software instructions. In FIG. 29, for example, variables can be displayed using a first color, functions displayed using a second color, and so forth. Additionally, formatting such as indentation, spacing, and the insertion of special characters may be performed. Among other things, this not only helps increase the readability of the code, but allows a user to more easily identify code associated with a particular visual code block.

In addition to software instructions, files retrieved in embodiments of the disclosure may also contain information on various lesson modules that can be retrieved (2830). For example, a file may contain information on different frames that are generated by the software instructions as well as information on concepts and goals a student can learn from a software application compiled from such instructions. This additional project data can be either represented in the same file as the software instructions, or even a different file. In one example, where the software instructions are in a source code file written in JavaScript, such additional information can be represented in JSON format and be embedded along with the source code.

Embodiments of the disclosure can generate different visual code blocks (2835), with each block corresponding to one or more software instructions. In this context, the "generation" of visual code blocks may include identifying one or more software instructions that correspond to a preexisting visual code block (such as the code blocks shown in window 97 of FIG. 3) as well as creating new visual code blocks based on one or more instructions.

Visual code blocks may be optimized (2840) in a manner similar to that performed for the optimization of software instructions (2815). For example, a plurality of visual code blocks (e.g., in a series) may be replaced with a single visual code block that is equivalent to, and/or more efficient than, the plurality of blocks. Similarly, a first set of one or more blocks may be replaced with a second set of one or more blocks that perform a function faster, better, more efficiently, etc. than the first set.

In embodiments where a parse tree is used, the parse tree may be modified after analysis and/or optimization. Alternatively, a new tree can be generated. A code generator can walk the new (or modified) tree using a visitor pattern and generate code snippets for each node in the tree. The code snippets may then be stored in buffers to construct the final visual code blocks.

Formatting may be applied to the generated code blocks (2845) to help ensure, for example, that the code blocks displayed in an IDE are organized and positioned correctly, and that code blocks do not overlap. Such formatting may include the application of a layout scheme that defines the position, color, and/or size of one or visual code blocks. Features of layout schemes may be defined by the system implementing the functionality of the IDE, as well as based on input from a user. Application of a layout scheme may likewise be performed in response to user input, as well as automatically by the system in response to detecting various conditions. For example, a layout scheme may be applied to adjust the position and/or size of visual code blocks in response to the system detecting an overlap between two or more code blocks.

The file containing the software instructions (or another file) may include meta-information (such as annotations) about the visual representation of the code blocks. This information can be stored as comments in the source text language where it does not affect the generated code output. This meta-information can include visual information such as position, color, sizing, etc. with regards to the blocks. If this visual information does not exist, the system can use an auto-layout mechanism to rearrange the visual blocks so that they do not overlap. For example, the system could implement a vertical linear layout where scripts go beneath each other or an n-column layout where there are multiple columns of scripts.

Figure 30:
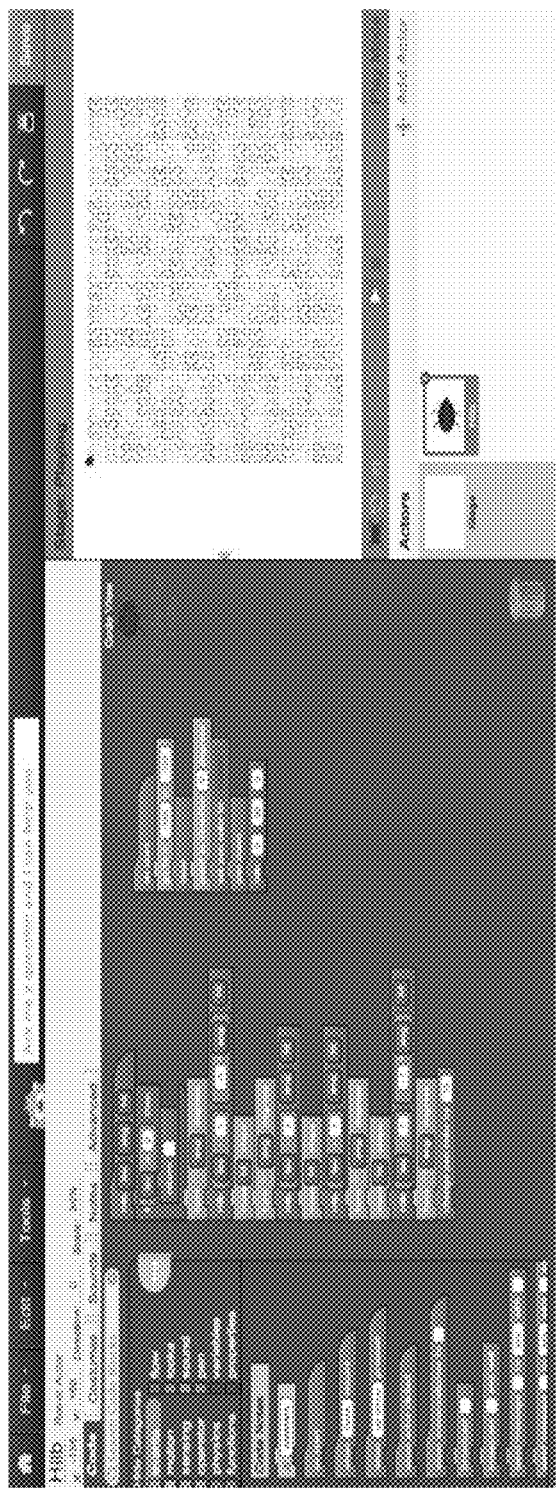

The generated code blocks corresponding to the software instructions may be displayed (2850) in the IDE as shown, for example, in FIG. 30. The visual code blocks in the example shown in FIG. 30 correspond to the software instructions shown in the IDE in FIG. 29. A user may select the "code view" icon in the middle of the screen to toggle to the view shown in FIG. 29, thereby allowing a user to quickly and easily transition back and forth between the text of the source code and the corresponding visual blocks. In some embodiments, the "block view" of FIG. 30 and the "code view" of FIG. 29 can be simultaneously displayed in the IDE to allow the user to see a side-by-side comparison of how the visual code blocks correspond to the source code text.

A user can make various modifications to the software instructions or the visual code blocks via the IDE, such as adding new code blocks or instructions, removing existing code blocks or instructions, or modifying existing code blocks or instructions. Modifications to visual blocks and software instructions may also be performed automatically by the system, such as during a process for compiling or optimizing the code.

As modifications to visual code blocks are received (2855), the system automatically modifies (2860) the software instructions associated with the modified visual code blocks accordingly. Likewise, as modifications to software instructions are received (2855), the visual code blocks associated with the modified instructions are modified (2860).

The visual code blocks and associated software instructions may be so modified in real time or near-real-time, scheduled by an event, and/or driven by user input. In embodiments where real time or near-real-time modifications occur, whenever there is a block change (block dragged around in the visual code area) a compile process can be triggered to generate text. Similarly, the user typing software instruction text via the textual code editor of the IDE can trigger a compile event to generate the blocks. Because the changes typically are localized to a certain area of the code (e.g., only one script is modified at a time), the system may only need to generate the affected script, thus saving compile time. This depends on the target language. For JavaScript, this can be done incrementally since the symbols and bindings are done during runtime rather than statically. Other compiled languages might not be possible to do local compiles, so a full compile is done in those cases.

An example of scheduled compiles includes triggering the compile only after a certain timeout occurs after the user has stopped entering text and a compile is flagged as being necessary. Alternatively, the compile might occur at various time interval.

Code compilation can also be triggered by the user. As shown in FIGS. 29, and 30, for example, the IDE includes a "code view" and "block view," respectively. Clicking on the "code view" tab while in the block view can cause a compile to convert visual code blocks to text source code just prior to displaying the source code. Similarly, clicking on the "block view" tab can cause a compile from text code to visual blocks just prior to showing the block view. Other user actions may likewise cause a compile, such as a project save operation, or a user-initiated script export or import.

When errors occur during the compilation process, the errors may be flagged and/or automatically corrected. The target of the compile (visual blocks for text code or text code for visual blocks) need not be changed from the previous compile so as not to disturb the last successful compile. Successful compiles may thus be shown and errors flagged for the user to address the problems.

Figure 31:
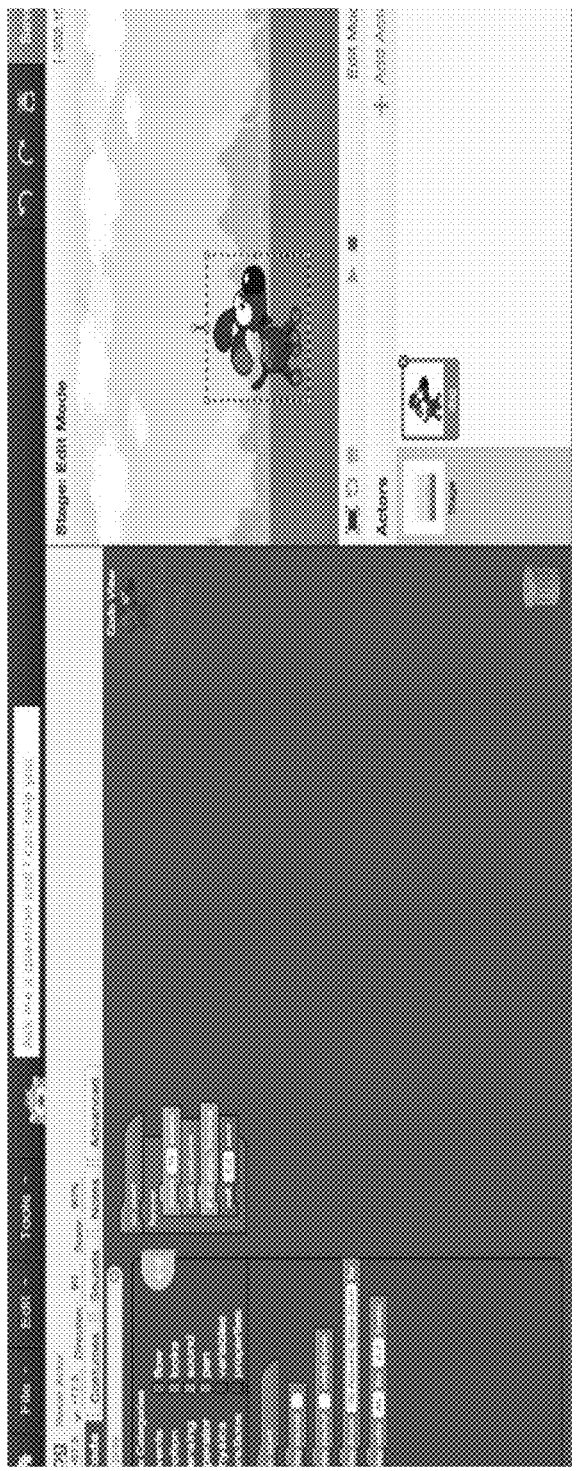
Figure 32:
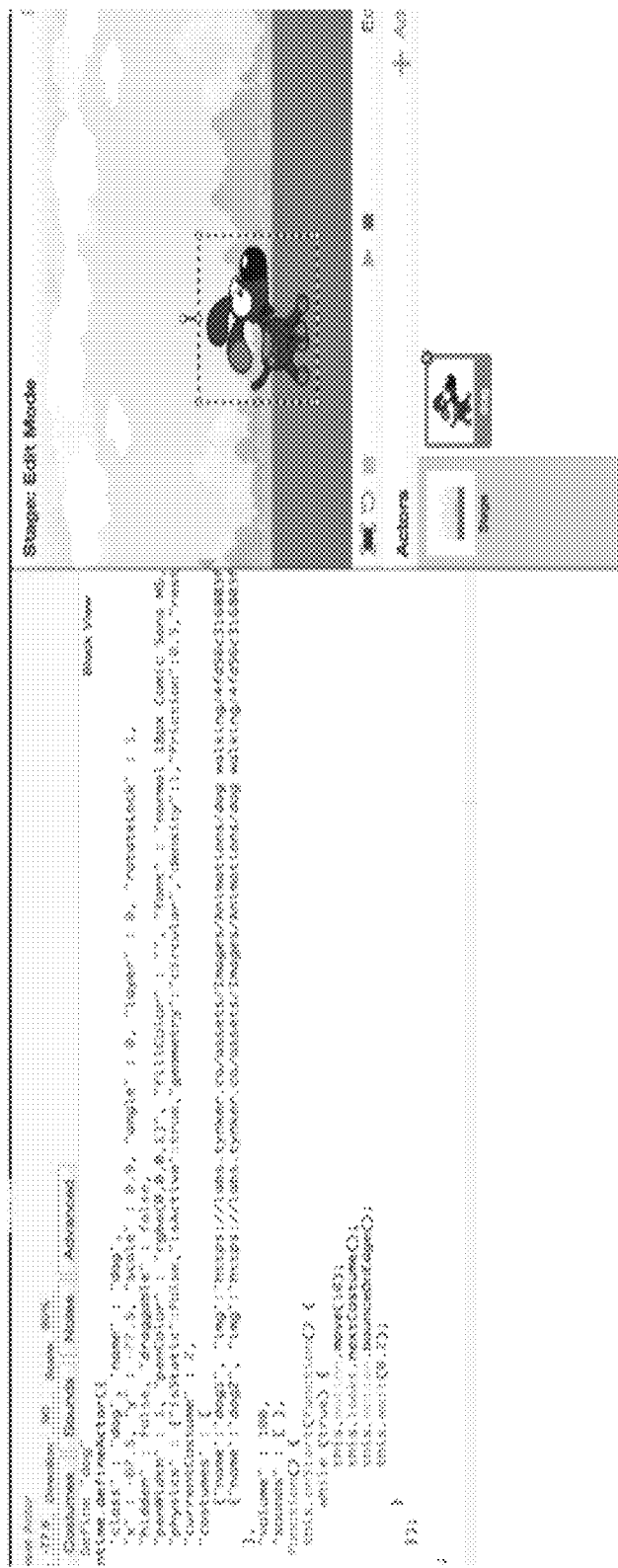

FIGS. 31-35 illustrate an example of how modifications to visual blocks are reflected in the associated source code and vice versa. FIG. 31 depicts the visual code blocks (in the center of the screen) corresponding to a short program for walking an "Actor" (the dog in the lower right portion of the screen) horizontally across a landscape (as shown in the upper right portion of the screen). FIG. 32 shows the corresponding text of the software instructions for the code blocks in FIG. 31.

Figure 33:
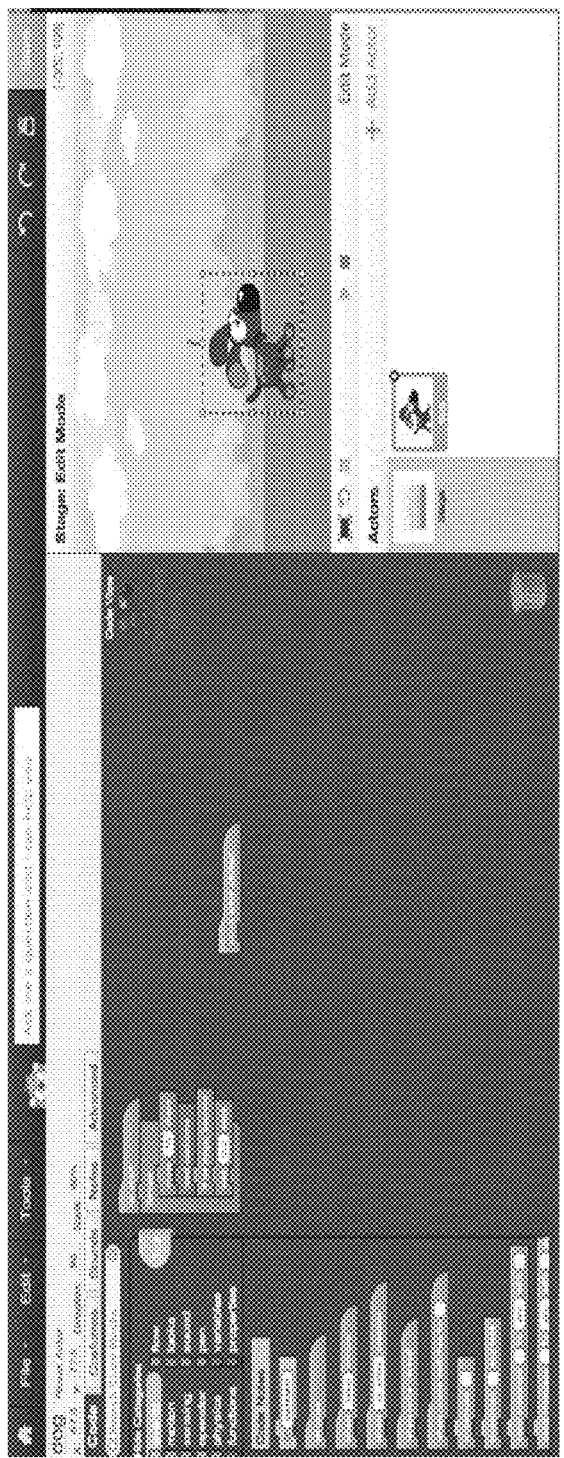
Figure 34:
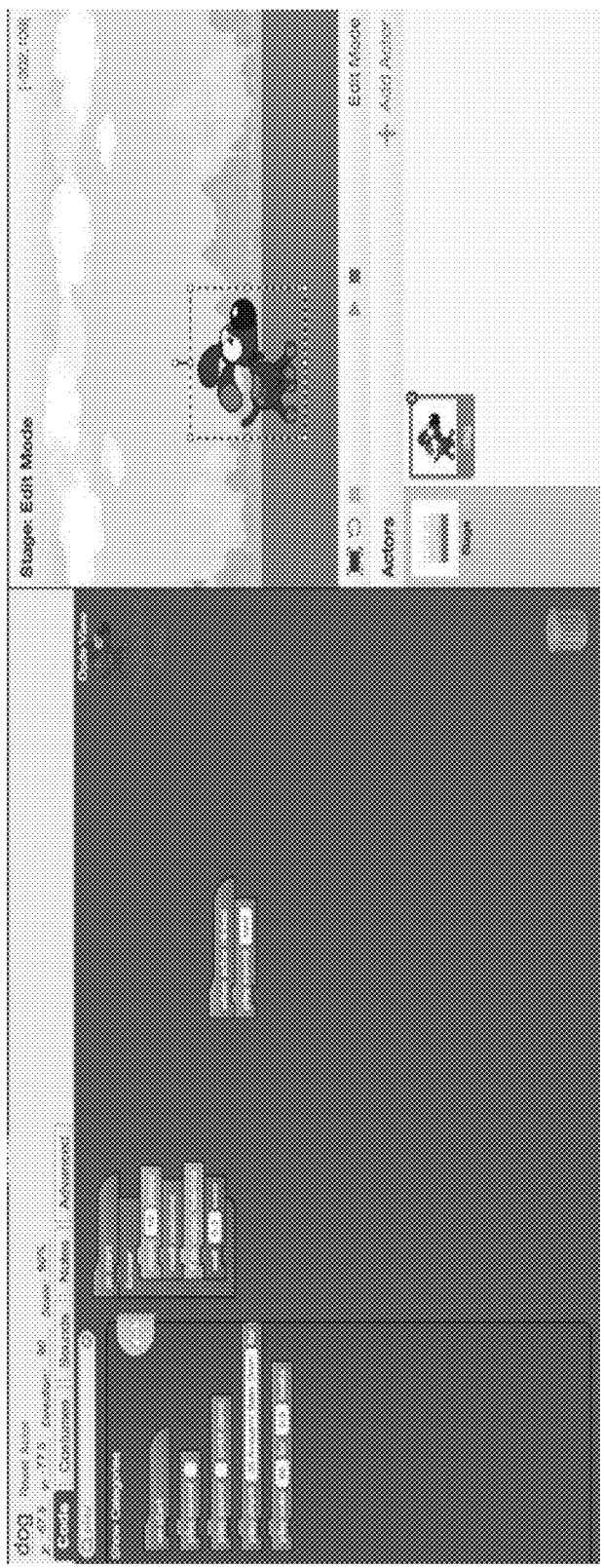

In FIG. 33, a user is modifying the visual code blocks by adding a block titled "when actor clicked" (shown by itself in the center window) to the existing sequence of visual code blocks. FIG. 34 depicts a user adding a second block ("play sound: bark"). Together, the two blocks cause a barking sound to be played by the program when the actor (the dog) is clicked on via the user interface displaying the IDE.

Figure 35:
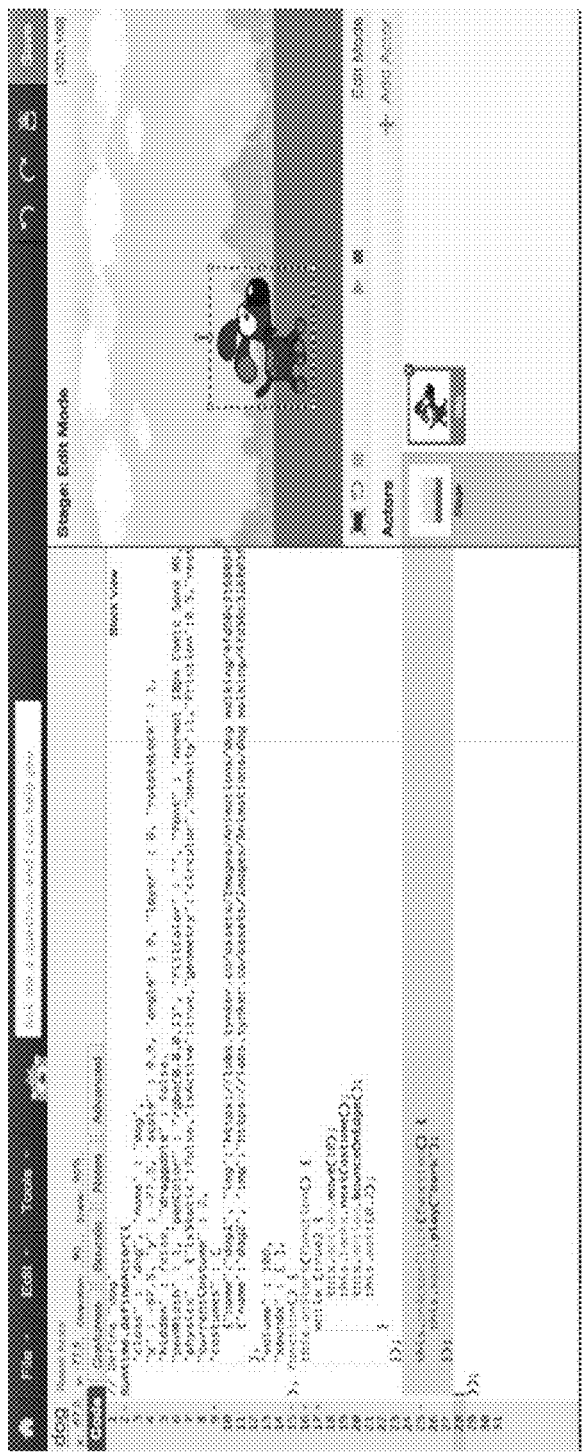

FIG. 35 shows the corresponding text of the software instructions that are added in response to the user adding the visual blocks in FIGS. 33 and 34. The new instructions are shown in the shaded portion at the bottom of the left side of the screen. The user could also add software instructions to the code view (FIG. 35) and the system would add corresponding visual code blocks to the block view (FIG. 34).

In order to determine the appropriate modifications for the software instructions based on changes to visual coding blocks, the visual language may utilize a tree-based data structure that represents the visual blocks. In such cases, each node in the tree can be represented by a graphical element that is shown on the code view. To generate the text equivalent in the target, each node can emit text in the target. The program tree can be parsed using a visitor pattern using breadth first iterator, with text for each node being output to a buffer.

Additionally, each identifier can be validated against the target language to make sure a valid identifier is used. For example, valid javascript identifiers start with a character or underscore. However, in the visual language, the identifier might start with a number or a symbol like an exclamation mark. In such cases, these identifiers can be transformed into valid identifiers in the target language. Also, the target language could have reserved keywords like "this." The "this" text might be used in the source as an identifier. So the reserved keywords can also be transformed and added into a symbol table mapping. After mapping, future references to the symbol may be looked up in the symbol table for the target symbol name.

As described above, embodiments of the disclosure may look up mapping of API calls to typical shortcuts in the target language. For example, the visual code block of "delete <all> from <list>" can be emitted as "list.length=0" in Javascript.

As noted above, embodiments of the disclosure may optimize code blocks and/or text instructions. Certain block sequences can be optionally optimized before emitting the code. For example, expression collapsing can convert "25*2+3" into a single "53" constant. There could be blocks like "if <<isReady>=<true>> then" that can be converted to "if (isReady) { }" in javascript. Furthermore, certain patterns of blocks can be transformed into patterns in the target language. This can be done by comparing block patterns in a lookup table and, if the block pattern exists, a corresponding set of text instructions output.

As described above, various formatting may be applied to the code blocks and/or text to make the text more readable by humans. For example, embodiments may assemble one or more output buffers, with each buffer snippet having a beginning, middle, and end part to the text. Some languages may require correct whitespace indents (like Python) that affect the code execution, and the correct padding can be added in such cases. Comments may also be added to the code for learning purposes, such as to describe the code that gets generated, from which visual code block (or sequence of code blocks) the code was generated from, and the like. Visual aspects of the text code or code blocks, such as colors and positions, can also be included in the comments as meta-information such that they do not affect the actual code but provide a way to convert between text and visual code blocks.

Figure 36:
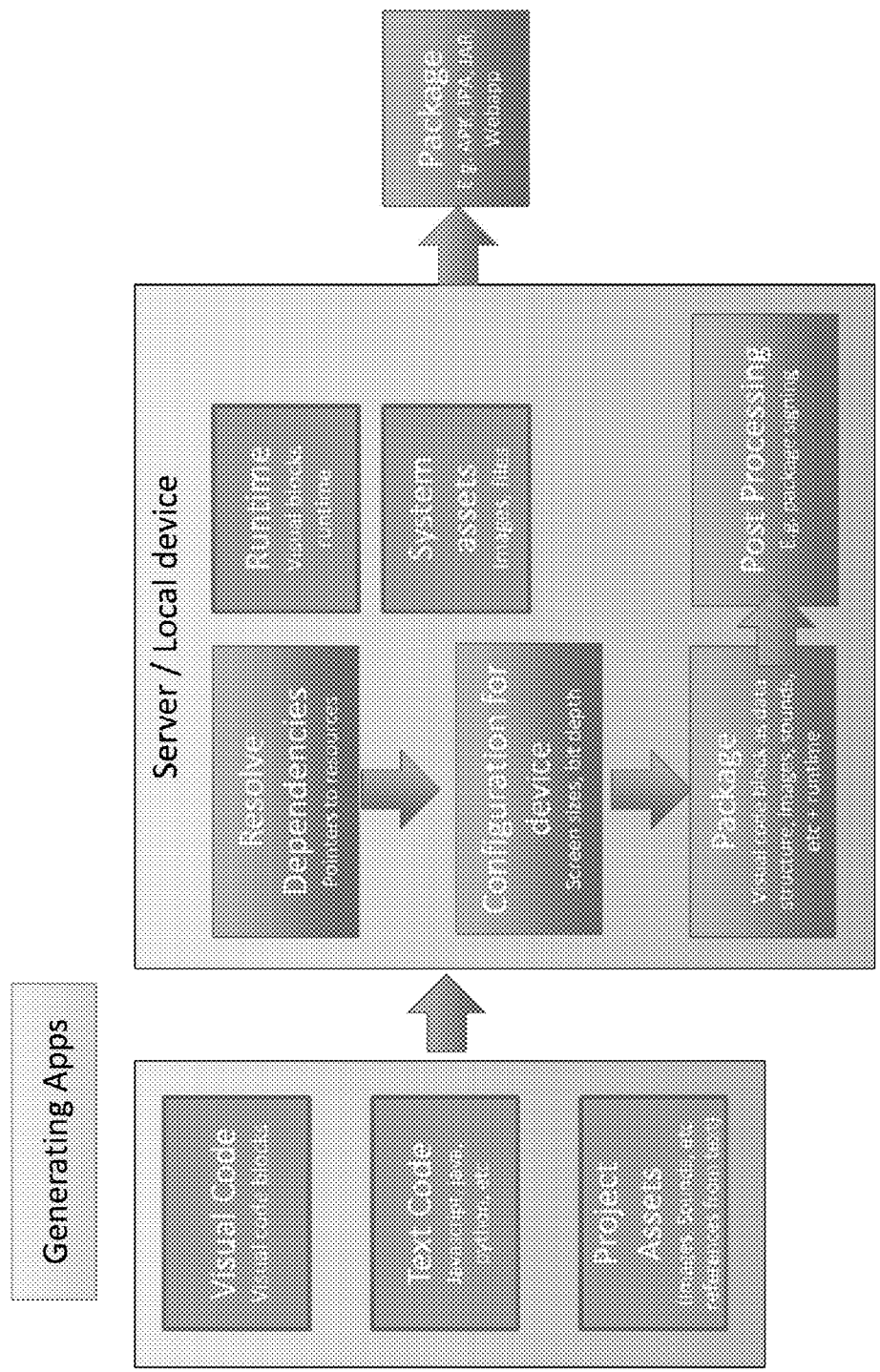
FIG. 36 is a flow diagram of an exemplary process for generating a platform-independent application in accordance with various aspects of the present disclosure.

Embodiments of the present disclosure can be used to generate platform-independent software applications using visual code blocks and/or the textual representation of such blocks (such as in javascript, java, python, and the like). An exemplary flow chart for generating platform-independent applications is shown in FIG. 36. In some embodiments, the visual code blocks and/or text software instructions are packaged for further processing, along with project assets that were used (such as images, sounds, data files), as shown in the left-most block of FIG. 36. For visual code blocks, the blocks can be encoded to a machine-readable format (such as JSON or a binary-encoded data structure) for packaging and transmission.

The combined package may then be sent to either a server or processed on a client device. For server processing, the package can be archived into one or more files that are transmitted to the server, which the server receives and unpacks. Processing software operating on the server or client device determines whether the code blocks are in visual coded format or as text-based source files. For visual coded blocks, visual information (such as positioning, colors, sizes) may be stripped out leaving the byte-code necessary for a pre-built runtime process. For text-based source files, the files may be compiled into visual code blocks using text-to-visual process above and then the byte-code output for the runtime process. The pre-built runtimes are binaries that are built for a particular platform (e.g. iOS, Android, webapp). In this manner, embodiments of the disclosure can identify a target platform to run an application based on a group of visual code blocks, then process the code blocks into application byte-code for execution by a pre-built runtime configured to execute the byte-code on the identified target platform.

The byte-code may then be examined to identify resources used. Pointers to the resources can be resolved so that the paths match the location of the assets in the package. The assets required may then be allocated for the application associated with the byte-code to use.

Additionally, additional configuration information may be added that specifies the application's name, the splash screen image, an application icon, supported resolutions, screen orientations, and other information. The configuration information may platform dependent, and thus may vary depending on the target platform. The configuration information may be stored separate from the application, such as in a text fie.

The code, assets, and pre-built runtime can be packaged together into a system archive (e.g. such as APK, IPA, or EXE files). Further processing of the package may be performed (such as to sign the package) prior to delivery to a target platform. The resulting package can then be sent (e.g., via email or downloaded) to a client device where it may be installed and run as a native application.

In cases where processing takes place on the client device itself, rather than on a server as described above, the package does not need to be archived into a single file, rather the raw files can be used directly. Otherwise, the same process described above for the server may be performed by a client device to generate an application package.

Figure 37:
FIGS. 37-41 are screen shots of an integrated development environment (IDE) according to various aspects of the present disclosure.
Figure 38:
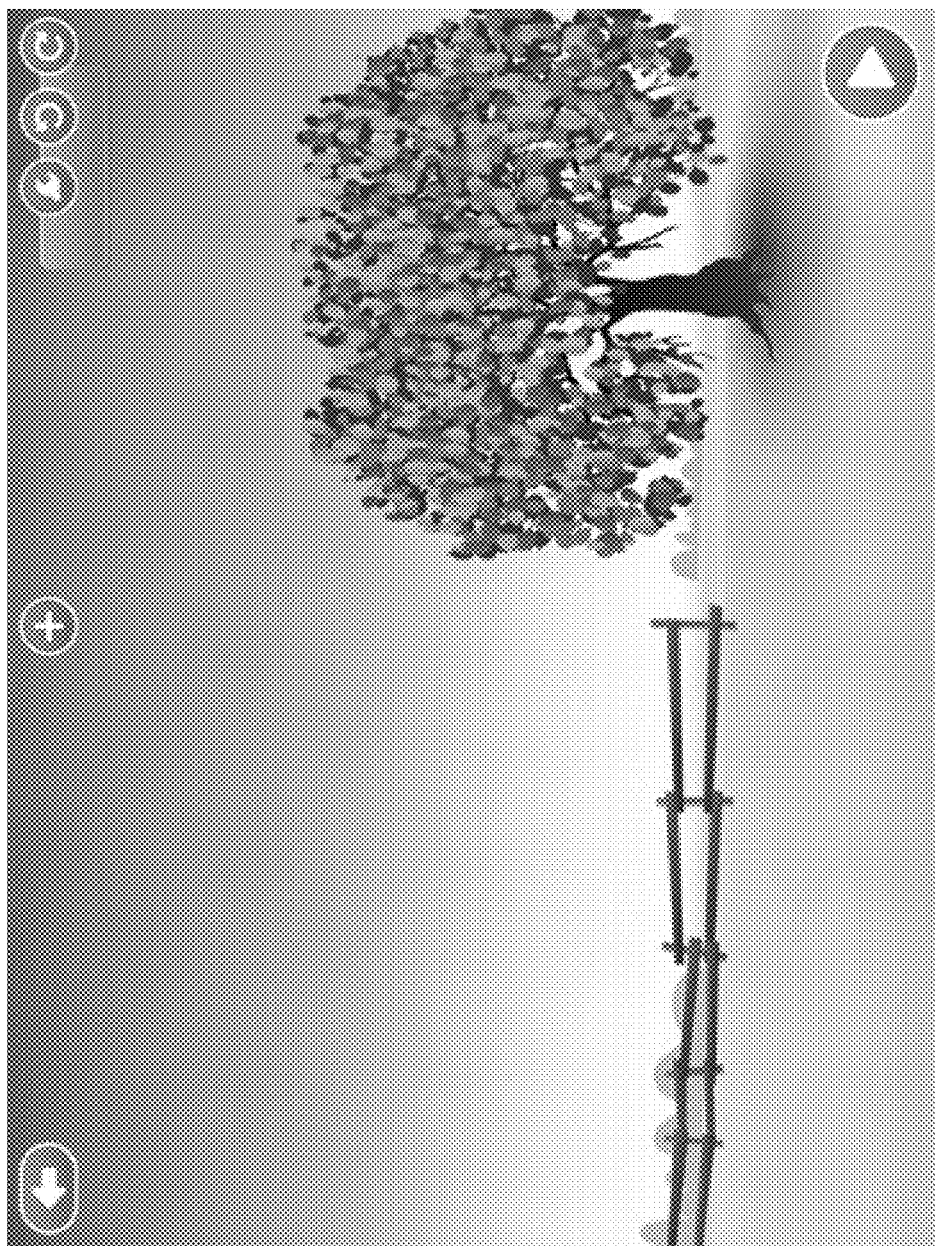
Figure 39:
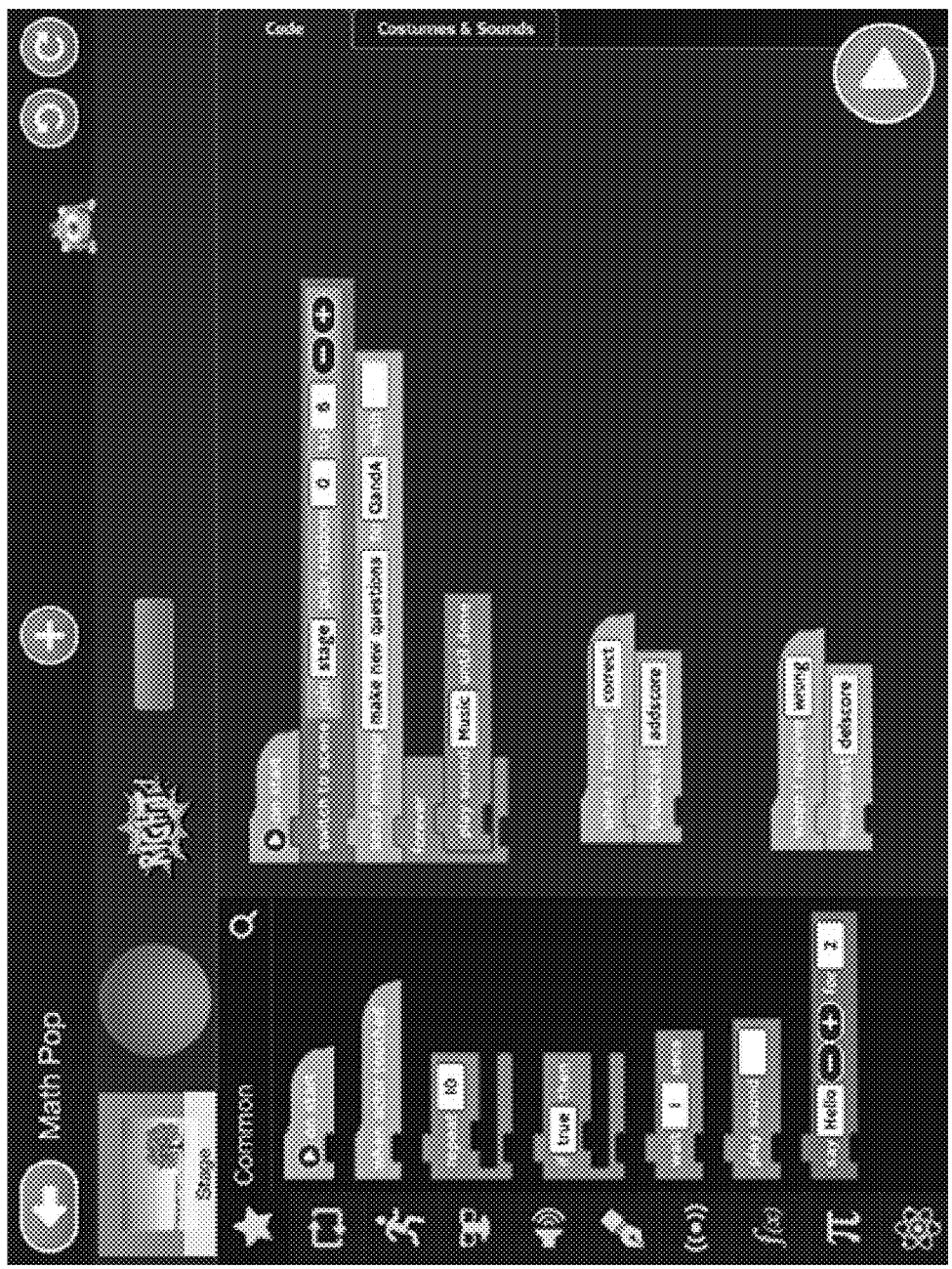
Figure 40:
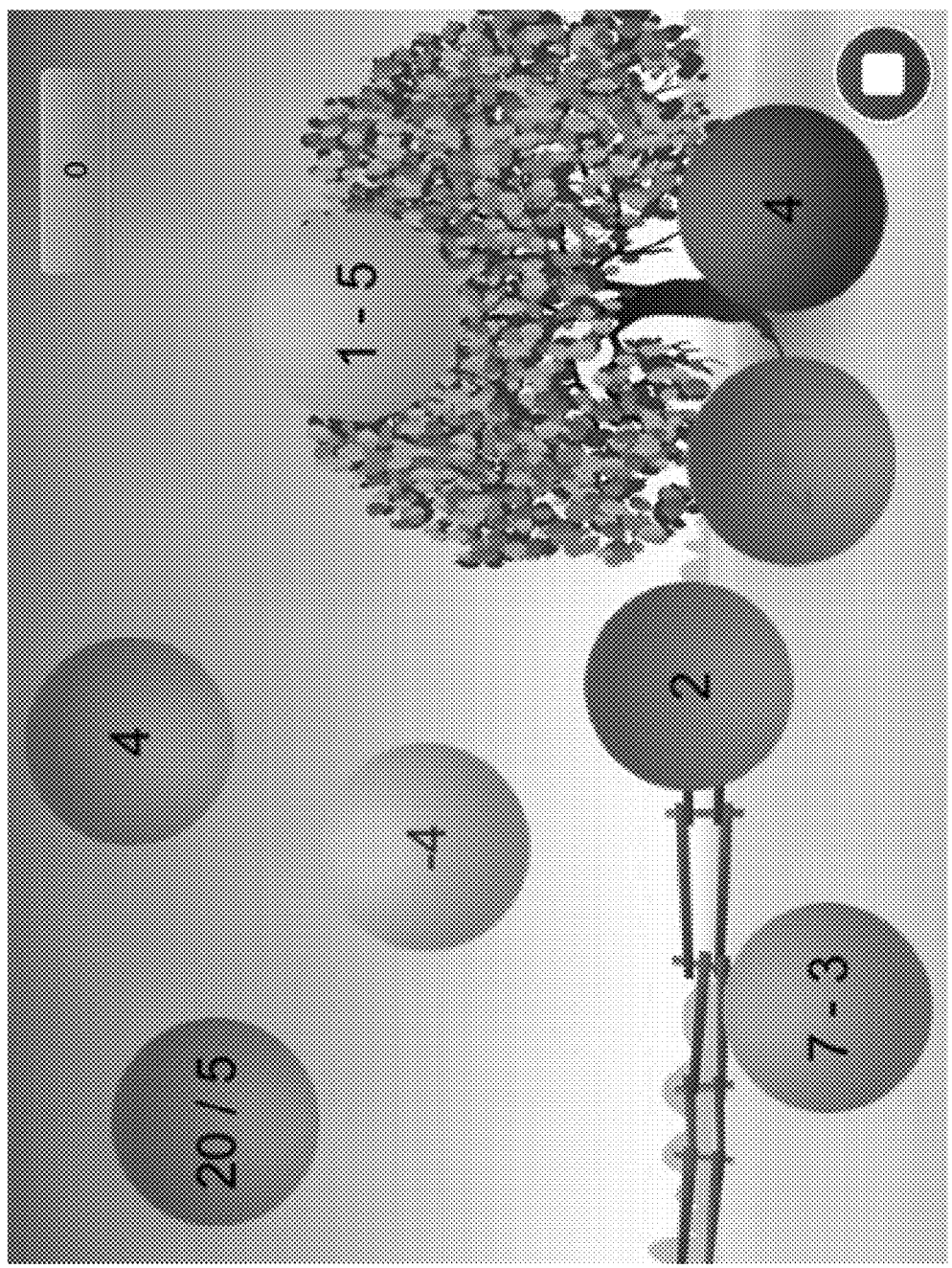
Figure 41:
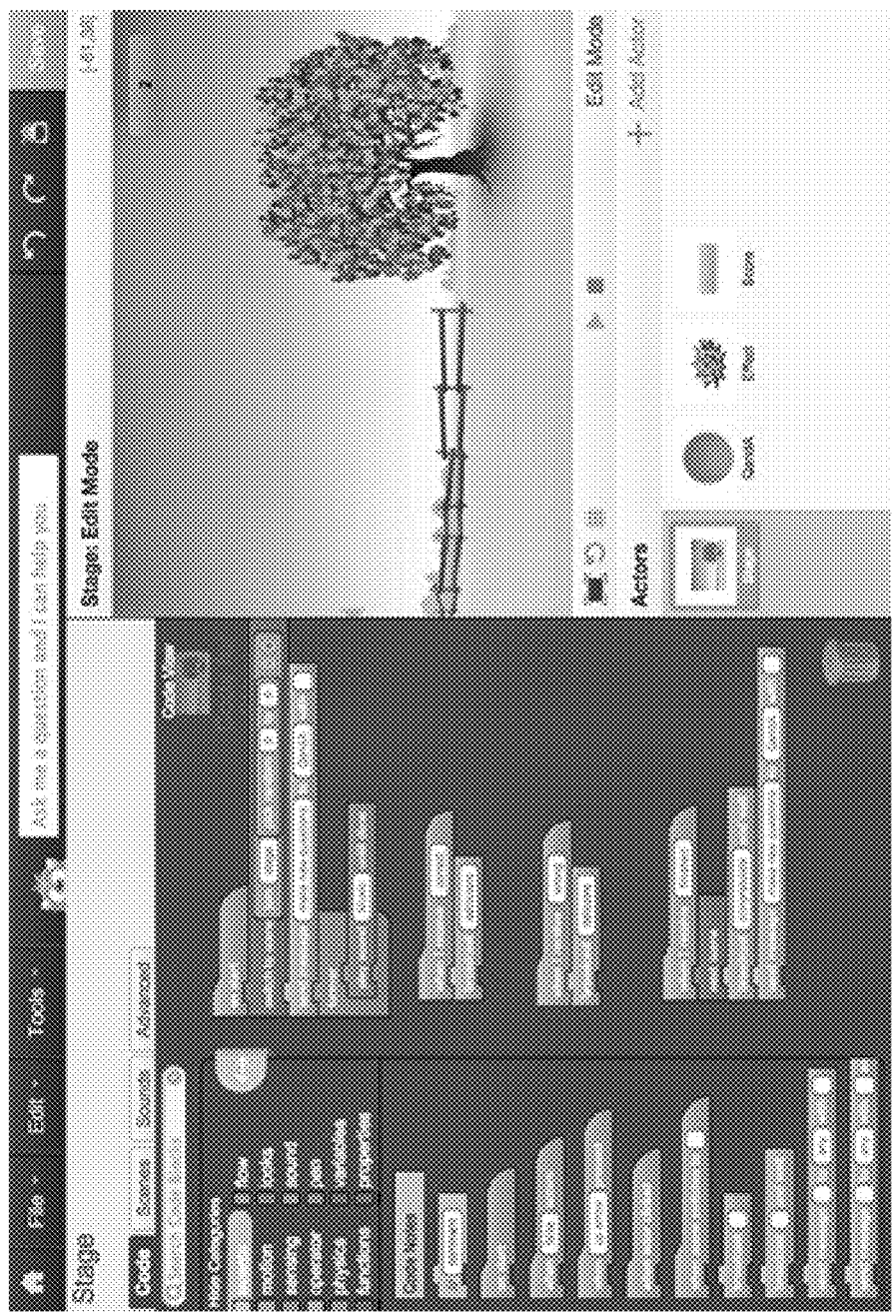

FIGS. 37-41 illustrate exemplary screenshots of a project being created by a student. In FIG. 37, the student selects the "Math Pop" project, which then displays on the student's client device (e.g., the student's laptop, personal computer, tablet, smartphone, or other device) in FIG. 38. FIG. 39 illustrates a view of the code blocks associated with the "Math Pop" project, while FIG. 40 illustrates an application associated with the code blocks running on the student's device. FIG. 41 illustrates a view of the IDE where the student is viewing the visual code blocks of the application on the left of the screen, and details of the background or "stage" of the application on the right side of the screen.

The functionality of various embodiments may be performed via a web browser and/or application interfacing utilizing a web browser. Such browser applications may comprise Internet browsing software installed within a computing unit or a system to perform various functions. These computing units or systems may take the form of a computer or set of computers, and any type of computing device or systems may be used, including laptops, notebooks, tablets, hand held computers, personal digital assistants, set-top boxes, workstations, computer-servers, main frame computers, mini-computers, PC servers, pervasive computers, network sets of computers, personal computers and tablet computers, such as iPads, iMACs, and MacBooks, kiosks, terminals, point of sale (POS) devices and/or terminals, televisions, or any other device capable of receiving data over a network. Various embodiments may utilize Microsoft Internet Explorer, Mozilla Firefox, Google Chrome, Apple Safari, or any other of the myriad software packages available for browsing the internet.

Various embodiments may operate in conjunction with any suitable operating system (e.g., Windows NT, 95/98/2000/CE/Mobile, OS2, UNIX, Linux, Solaris, MacOS, PalmOS, etc.) as well as various conventional support software and drivers typically associated with computers. Various embodiments may include any suitable personal computer, network computer, workstation, personal digital assistant, cellular phone, smart phone, minicomputer, mainframe or the like. Embodiments may implement security protocols, such as Secure Sockets Layer (SSL), Transport Layer Security (TLS), and Secure Shell (SSH). Embodiments may implement any desired application layer protocol, including http, https, ftp, and sftp.

Various components, modules, and/or engines may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, the Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Systems may utilize TCP/IP communications protocols as well as IPX, Appletalk, IP-6, NetBIOS, OSI, any tunneling protocol (e.g. IPsec, SSH), or any number of existing or future protocols. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, satellite networks, ISDN, Digital Subscriber Line (DSL), or various wireless communication methods. It is noted that the network may be implemented as other types of networks, such as an interactive television (ITV) network.

The system may be partially or fully implemented using cloud computing. "Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

Various embodiments may be used in conjunction with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically.

Any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems.

Embodiments may connect to the Internet or an intranet using standard dial-up, cable, DSL or any other Internet protocol known in the art. Transactions may pass through a firewall in order to prevent unauthorized access from users of other networks.

The computers discussed herein may provide a suitable website or other Internet-based graphical user interface which is accessible by users. For example, the Microsoft Internet Information Server (IIS), Microsoft Transaction Server (MTS), and Microsoft SQL Server, may be used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In another example, an Apache web server can be used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL and an IP address. The web server retrieves the appropriate web pages and sends the data or applications for the web pages to the IP address. Web services are applications that are capable of interacting with other applications over a communications means, such as the Internet.

Various embodiments may employ any desired number of methods for displaying data within a browser-based document. For example, data may be represented as standard text or within a fixed list, scrollable list, drop-down list, editable text field, fixed text field, pop-up window, and the like. Likewise, embodiments may utilize any desired number of methods for modifying data in a web page such as, for example, free text entry using a keyboard, selection of menu items, check boxes, option boxes, and the like.

The exemplary systems and methods illustrated herein may be described in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

What is claimed is:

1. A computer-implemented method comprising:
storing, by a computer system in a data store, a file containing a plurality of software instructions;
displaying the plurality of software instructions in an integrated developer environment (IDE) via a display screen of a user interface in communication with the computer system;
receiving, by the computer system via the user interface, a link to a computer program comprising code;
receiving, by the computer system via the user interface, an identification of a first functionality of the computer program;
analyzing, by the computer system, the computer program, wherein the analyzing comprises parsing the code to identify code blocks, and comparing the identified code blocks to known code blocks based on similarity in functionality, wherein the comparing the identified code blocks to known code blocks comprises executing the identified code blocks using a virtual machine to determine functionality of the identified code blocks, wherein the comparing the identified code blocks to known code blocks further comprises comparing functionality including at least one of user input, output to a user, or modification of a state by a user, and wherein executing the identified code blocks using the virtual machine includes analyzing execution of code for different hardware platforms or operating systems;
performing, by the computer system, statistical analysis to determine a probability that the identified code blocks are associated with the first functionality, wherein the statistical analysis is based on comparing the identified code blocks to the known code blocks;
determining, by the computer system, that the probability exceeds a predetermined threshold;
in response to determining that the probability exceeds the predetermined threshold, generating, by the computer system, in accordance with the first functionality and based on comparing the identified code blocks to the known code blocks, one or more visual code blocks, wherein at least one visual code block corresponds to one or more of the plurality of software instructions, and the generated visual code blocks include at least one preexisting visual code block;
in response to detecting an overlap between at least two visual code blocks, automatically applying, by the computer system, a layout scheme to the one or more visual code blocks;
displaying the one or more visual code blocks in the IDE via the display screen;
receiving, via the user interface, a modification to the one or more visual code blocks; and
modifying one or more of the plurality of software instructions to correspond to the modification to the one or more visual code blocks.

2. The method of claim 1, further comprising analyzing, by the computer system, the plurality of software instructions for semantic errors.

3. The method of claim 2, wherein analyzing the software instructions for semantic errors includes automatically correcting one or more identified semantic errors.

4. The method of claim 1, wherein the modification to the one or more visual code blocks includes one or more of: an addition of a visual code block, removal of a visual code block, or a modification to a visual code block.

5. The method of claim 1, further comprising optimizing the plurality of software instructions.

6. The method of claim 5, wherein optimizing the plurality of software instructions includes one or more of: eliminating inoperable instructions, replacing one or more instructions with one or more equivalent instructions, replacing a mathematical expression with a constant, or replacing a function call in the plurality of instructions with an alternate function call.

7. The method of claim 6, wherein the alternate function call corresponds to a predefined visual code block.

8. The method of claim 5, wherein optimizing the software instructions is performed according to one or more rules defined by a user via the user interface.

9. The method of claim 1, further comprising generating a parse tree based on the plurality of software instructions in the file.

10. The method of claim 1, wherein the layout scheme defines a characteristic selected from the group consisting of: a position of a visual code block, a color of a visual code block, and a size of a visual code block.

11. The method of claim 1, further comprising retrieving, from the text file, information regarding a lesson module relating to a computer programming concept associated with the plurality of software instructions.

12. The method of claim 1, further comprising optimizing the one or more visual code blocks.

13. The method of claim 12, wherein optimizing the one or more visual code blocks includes replacing a plurality of code blocks with a single code block equivalent to the plurality of code blocks.

14. The method of claim 12, wherein optimizing the one or more visual code blocks includes replacing a plurality of code blocks with one or more code blocks that perform a function more efficiently than the replaced code blocks.

15. The method of claim 1, further comprising analyzing the plurality of software instructions for syntactical errors.

16. The method of claim 15, wherein analyzing the plurality of software instructions for syntactical errors includes identifying an invalid symbol in the plurality of software instructions and converting the invalid symbol into a valid symbol.

17. The method of claim 1, wherein displaying the plurality of software instructions includes applying formatting to the plurality of software instructions, the formatting including one or more of: indentation, spacing, or insertion of special characters.

18. The method of claim 1, further comprising:
receiving, via the user interface, one or more of the plurality of software instructions; and
storing the one or more of the plurality of software instructions in the file.

19. The method of claim 1, further comprising:
receiving, via the user interface, a modification to the plurality of software instructions; and modifying one or more of the one or more visual code blocks to correspond to the modification to the software instructions.

20. The method of claim 1, wherein generating the one or more visual code blocks further comprises:
identifying a target platform on which to run an application based on the one or more visual code blocks; and
generating byte-code for the application based on the one or more visual code blocks, wherein the application is configured for execution on the target platform as a native application.

21. A tangible, non-transitory computer-readable medium storing instructions that, when executed, cause a computer system to:
store, in a data store, a file containing a plurality of software instructions;
display the plurality of software instructions in an integrated developer environment (IDE) via a display screen of a user interface in communication with the computer system;
receive, by the computer system via the user interface, a link to a computer program comprising code;
receive, by the computer system via the user interface, an identification of a first functionality of the computer program;
analyze, by the computer system, the computer program, wherein the analyzing comprises parsing the code to identify code blocks, and comparing the identified code blocks to known code blocks based on similarity in functionality, wherein the comparing the identified code blocks to known code blocks comprises executing the identified code blocks using a virtual machine to determine functionality of the identified code blocks, wherein the comparing the identified code blocks to known code blocks further comprises comparing functionality including at least one of user input, output to a user, or modification of a state by a user, and wherein executing the identified code blocks using the virtual machine includes analyzing execution of code for different hardware platforms or operating systems;
perform, by the computer system, statistical analysis to determine a probability that the identified code blocks are associated with the first functionality, wherein the statistical analysis is based on comparing the identified code blocks to the known code blocks;
determine, by the computer system, that the probability exceeds a predetermined threshold;
in response to determining that the probability exceeds the predetermined threshold, generate, in accordance with the first functionality and based on comparing the identified code blocks to the known code blocks, one or more visual code blocks, wherein at least one visual code block corresponds to one or more of the plurality of software instructions, and the generated visual code blocks include at least one preexisting visual code block;
in response to detecting an overlap between at least two visual code blocks, automatically apply a layout scheme to the one or more visual code blocks;
display the one or more visual code blocks in the IDE via the display screen;
receive, via the user interface, a modification to the one or more visual code blocks; and
modify one or more of the plurality of software instructions to correspond to the modification to the one or more visual code blocks.

22. A computer system comprising:
a processor; and
memory in communication with the processor and storing instructions that, when executed by the processor, cause the computer system to:
store, in a data store, a file containing a plurality of software instructions;
display the plurality of software instructions in an integrated developer environment (IDE) via a display screen of a user interface in communication with the computer system;
receive, via the user interface, a link to a computer program comprising code;
receive, via the user interface, an identification of a first functionality of the computer program;
analyze the computer program, wherein the analyzing comprises parsing the code to identify code blocks, and comparing the identified code blocks to known code blocks based on similarity in functionality, wherein the comparing the identified code blocks to known code blocks comprises executing the identified code blocks using a virtual machine to determine functionality of the identified code blocks, wherein the comparing the identified code blocks to known code blocks further comprises comparing functionality including at least one of user input, output to a user, or modification of a state by a user, and wherein executing the identified code blocks using the virtual machine includes analyzing execution of code for different hardware platforms or operating systems;
perform statistical analysis to determine a probability that the identified code blocks are associated with the first functionality, wherein the statistical analysis is based on comparing the identified code blocks to the known code blocks;
determine that the probability exceeds a predetermined threshold;
in response to determining that the probability exceeds the predetermined threshold, generate, in accordance with the first functionality and based on comparing the identified code blocks to the known code blocks, one or more visual code blocks, wherein at least one visual code block corresponds to one or more of the plurality of software instructions, and the generated visual code blocks include at least one preexisting visual code block;
in response to detecting an overlap between at least two visual code blocks, automatically apply a layout scheme to the one or more visual code blocks;
display the one or more visual code blocks in the IDE via the display screen;
receive, via the user interface, a modification to the one or more visual code blocks; and
modify one or more of the plurality of software instructions to correspond to the modification to the one or more visual code blocks.

* * * * *